(12) United States Patent
Omori et al.

(10) Patent No.: US 7,966,628 B2
(45) Date of Patent: Jun. 21, 2011

(54) DISK TRANSFER MECHANISM AND DISK RECORDING AND/OR REPRODUCTION APPARATUS

(75) Inventors: Kiyoshi Omori, Tokyo (JP); Katsunori Takahashi, Tokyo (JP); Hideaki Tsutsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 1041 days.

(21) Appl. No.: 11/761,030

(22) Filed: Jun. 11, 2007

(65) Prior Publication Data
US 2007/0300246 A1 Dec. 27, 2007

(30) Foreign Application Priority Data
Jun. 23, 2006 (JP) .................................. 2006-174646

(51) Int. Cl.
*G11B 17/051* (2006.01)
(52) U.S. Cl. ...................................................... 720/623
(58) Field of Classification Search .................. 720/623, 720/620, 619, 617, 600, 638, 631; 369/204, 369/77.11, 30.43, 210, 30.32, 30.55, 30.06
See application file for complete search history.

(56) References Cited

U.S. PATENT DOCUMENTS

| | | | |
|---|---|---|---|
| 6,192,019 B1* | 2/2001 | Kurokawa et al. | 720/623 |
| 7,500,253 B2* | 3/2009 | Inoue | 720/620 |
| 7,840,973 B2* | 11/2010 | Hasegawa et al. | 720/623 |
| 7,856,641 B2* | 12/2010 | Omori et al. | 720/623 |
| 2005/0216925 A1* | 9/2005 | Fujisawa et al. | 720/616 |
| 2007/0277187 A1* | 11/2007 | Fujisawa | 720/623 |
| 2008/0010650 A1* | 1/2008 | Fujisawa | 720/623 |

FOREIGN PATENT DOCUMENTS

| | | |
|---|---|---|
| JP | 2003-109273 | 4/2003 |
| JP | 2005-100595 | 4/2005 |
| JP | 2005-243112 | 9/2005 |
| JP | 2005-259324 | 9/2005 |
| JP | 2005-302188 | 10/2005 |
| JP | 2006-147000 | 6/2006 |

\* cited by examiner

*Primary Examiner* — Julie Anne Watko
(74) *Attorney, Agent, or Firm* — Oblon, Spivak, McClelland, Maier & Neustadt, L.L.P.

(57) ABSTRACT

A disk transfer includes: a transfer arm rotatably supported by an apparatus body to/from which a disk-shaped recording medium is inserted and removed, when the disk-shaped recording medium is inserted, rotated in an insertion direction by being pressed by the disk-shaped recording medium, and when the disk-shaped recording medium is ejected, rotated in an ejection direction to eject the disk-shaped recording medium; and a lift section provided with a rotation axis supported at a tip end portion of the transfer arm rotatably in a direction substantially orthogonal to a main surface of the disk-shaped recording medium, and from the rotation axis, an abutting piece abuts against the disk-shaped recording medium on a front side surface in the insertion direction inserted in the apparatus body. A support piece supports a lower surface portion of the disk-shape recording medium.

12 Claims, 48 Drawing Sheets

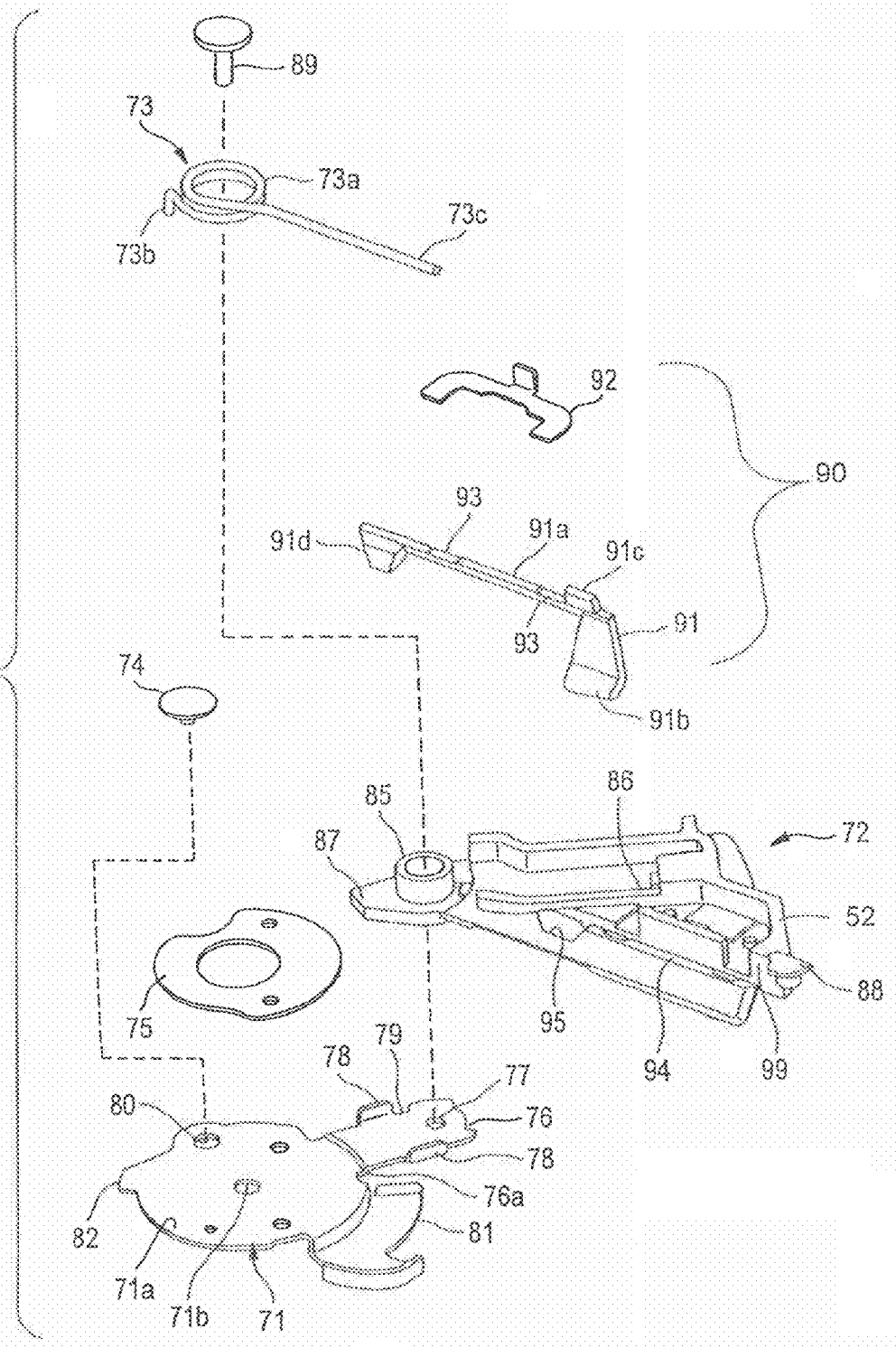

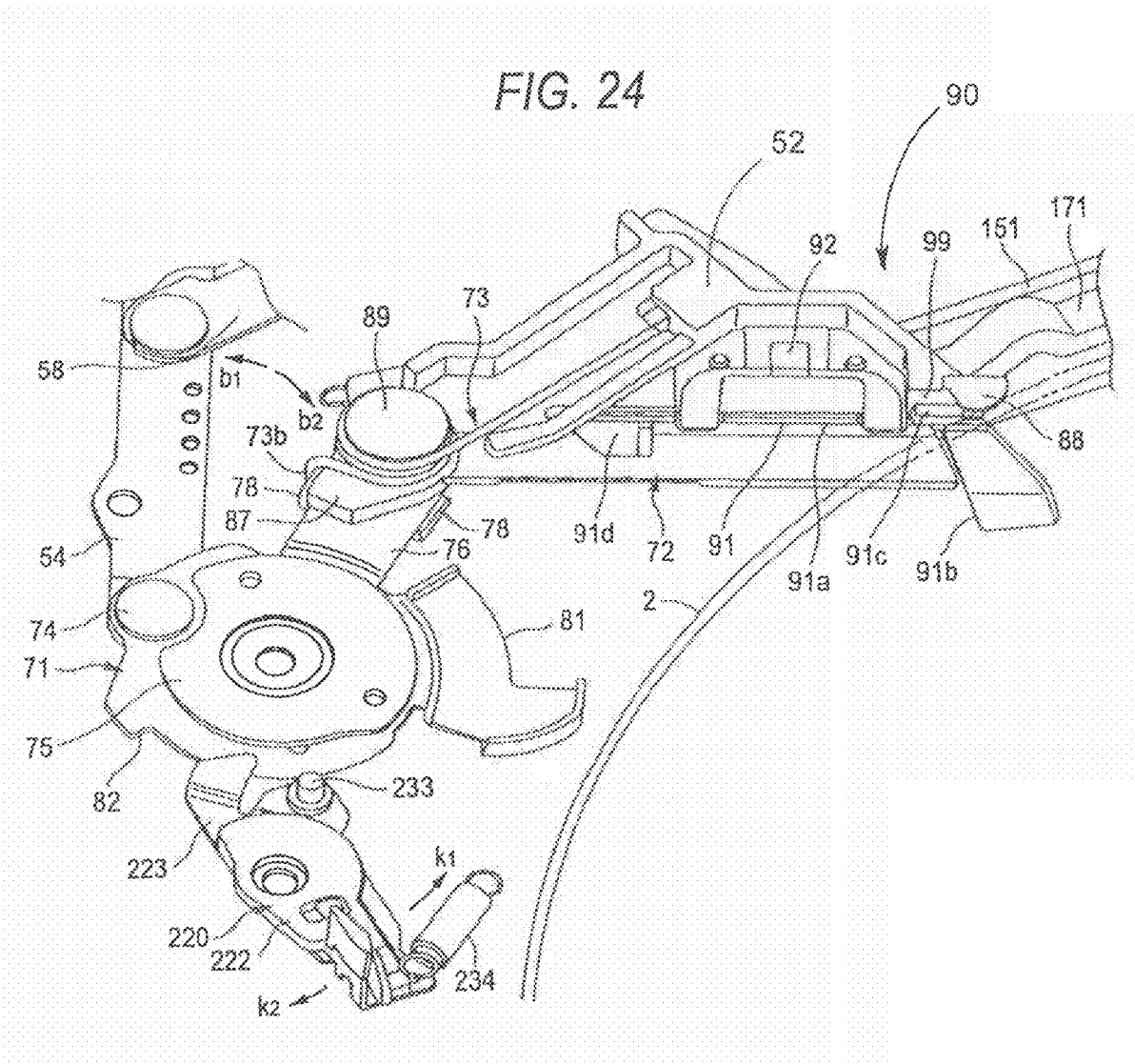

DISK TRANSFER MECHANISM AND DISK RECORDING AND/OR REPRODUCTION APPARATUS

CROSS REFERENCES TO RELATED APPLICATIONS

The present invention contains subject matter related to Japanese Patent Application JP 2006-174646 filed in the Japanese Patent Office on Jun. 23, 2006, the entire contents of which being incorporated herein by reference.

BACKGROUND OF THE INVENTION

1. Field of the Invention

The present invention relates to a disk drive apparatus that records and/or reproduces an information signal to/from an optical disk and, more specifically, to a so-called slot-in-type disk drive apparatus that is automatically loaded with an optical disk by direct insertion thereof into the apparatus body.

2. Description of Related Art

An optical disk has been well known by CD (Compact Disk), DVD (Digital Versatile Disk), BD (Blu-ray Disk), and others, or a magneto-optical disk including MO (Magneto Optical) and MD (Mini Disk), for example. To be ready for these disks, disk cartridges, and others, various types of disk drive apparatuses have been put on the market.

The disk drive apparatus varies in type for disk loading, e.g., a type in which a lid and cover provided to a cabinet are open, and a disk is directly placed on a turntable visible therefrom, a type in which a disk is placed on a disk tray that moves in and out from a cabinet in a horizontal direction so that the disk is automatically loaded on a turntable inside of the cabinet when the disk tray is moved in, a type in which a disk is directly placed on a turntable provided to such a disk tray, or others. The problem here is that all of these types require a user operation of opening and closing a lid or cover, moving in and out a disk tray, loading a disk on a turntable, and others.

There is also a disk drive apparatus of a so-called slot-in type, in which a disk is automatically loaded on a turntable only by inserting the disk from a disk insertion/removal port provided to the front surface of a cabinet. This slot-in disk drive apparatus is provided with a pair of opposing guide rollers for use to sandwich a disk inserted from the disk insertion/removal port. The slot-in disk drive apparatus goes through, by rotating these guide rollers in the opposing directions, a loading operation of retracting the disk inserted from the disk insertion/removal port to the inside of the cabinet, and an ejecting operation of ejecting the disk from the disk insertion/removal port to the outside of the cabinet.

For mobile equipment for mounting of a disk drive apparatus, e.g., notebook personal computer, additional reduction is expected for size, weight, and thickness, and the same expectation is growing also for a disk drive apparatus. To meet such expectations, provided is a slot-in disk drive apparatus provided with a contact section at the tip end portion, and a plurality of rotation arms whose base end portions are rotatably supported. The contact section is abutted against the outer regions of a disk inserted from a disk insertion/removal port formed to a front panel. The disk drive apparatus goes through, while rotating the rotation arms in a plane parallel to the disk, a loading operation of retracting the disk from the disk insertion/removal port to the inside of the cabinet, and an ejecting operation of ejecting the disk from the disk insertion/removal port to the outside of the cabinet. As an example, refer to Patent Document 1 (JP-A-2005-259324). Among such disk drive apparatuses with the attempt of thickness reduction, there is an ultra-thin disk drive apparatus whose thickness is reduced down to 12.7 mm for use with a notebook personal computer, for example, or 9.5 mm equivalent to the thickness of a slim hard disk drive (HDD) unit.

SUMMARY OF THE INVENTION

The problem with such a thickness-reduced disk drive apparatus is that the height of the transfer area for a disk is not enough to secure the thickness substantially equivalent to the disk, and there thus is little margin for a disk if it is diagonally inserted. If with a disk drive apparatus of transferring a disk using rotation arms, the disk is inserted by a user from a disk insertion/removal port until it is grasped by the rotation arms. As such, if the thickness reduction is continued for such a disk drive apparatus equipped with a disk transfer mechanism using rotation arms, if a user inserts a disk diagonally against the transfer direction, components in the cabinet such as optical pickup and turntable may collide with the disk before the disk is grasped by the rotation arms after it is inserted.

It is thus desirable to provide, in a disk recording and/or reproduction apparatus equipped with a disk transfer mechanism using a rotation arm, the disk transfer mechanism and the disk recording and/or reproduction apparatus capable of preventing collision between a disk and components in a cabinet.

According to an embodiment of the present invention, there is provided a disk transfer mechanism, including: a transfer arm that is rotatably supported to an apparatus body to/from which a disk-shaped recording medium is inserted and removed, when the disk-shaped recording medium is inserted, rotated in an insertion direction by being pressed by the disk-shaped recording medium, and when the disk-shaped recording medium is ejected, rotated in an ejection direction to eject the disk-shaped recording medium; and a lift section that is provided with a rotation axis being supported at a tip end portion of the transfer arm rotatably in a direction substantially orthogonal to a main surface of the disk-shaped recording medium, and from the rotation axis, an abutting piece is protruded for abutting against the disk-shaped recording medium, on a front side surface in the insertion direction, inserted in the apparatus body, and a support piece is protruded for supporting a lower surface portion of the disk-shape recording medium. In the disk transfer mechanism, in the lift section, the support piece is tilted to be positioned beneath a transfer area of the disk-shaped recording medium before insertion thereof, and when the abutting piece is abutted against the disk-shaped recording medium on the front side surface in the insertion direction, the rotation axis is rotated and the support piece supports the lower surface portion of the disk-shaped recording medium.

According to another embodiment of the present invention, there is provided a disk recording and/or reproduction apparatus, including: a transfer arm that is rotatably supported to an apparatus body to/from which a disk-shaped recording medium is inserted and removed, when the disk-shaped recording medium is inserted, rotated in an insertion direction by being pressed by the disk-shaped recording medium, and when the disk-shaped recording medium is ejected, rotated in an ejection direction to eject the disk-shaped recording medium; and a lift section, including: a rotation axis being supported at a tip end portion of the transfer arm rotatably in a direction substantially orthogonal to a main surface of the disk-shaped recording medium; an abutting section provided upright on the rotation axis to be abutted against the disk-shaped recording medium, on a front side surface in the insertion direction, inserted in the apparatus body to abut; and a support piece that supports a lower surface portion of the disk-shape recording medium. In the disk recording and/or reproduction apparatus, the lift section is provided with a disk transfer mechanism in which the support piece is tilted to be positioned beneath a transfer area of the disk-shaped recording medium before insertion thereof, when the abutting section is abutted against the disk-shaped recording medium on the front side surface in the insertion direction, the rotation axis is rotated, and the support piece supports the lower surface portion of the disk-shaped recording medium.

According to still another embodiment of the present invention, there is provided a disk transfer mechanism, including: a transfer arm that is rotatably supported to an apparatus body to/from which a disk-shaped recording medium is inserted and removed, when the disk-shaped recording medium is inserted, rotated in an insertion direction by being pressed by the disk-shaped recording medium, and when the disk-shaped recording medium is ejected, rotated in an ejection direction to eject the disk-shaped recording medium; and a lift section including: a rotation axis rotatably attached to the transfer arm, and on one end, provided with a support section for supporting the disk-shaped recording medium at a front side edge in the insertion direction thereof with a tilt, beneath the disk-shaped recording medium, of a support surface being substantially orthogonal, toward a tip end, to a main surface of the disk-shaped recording medium, and on the other end, provided with a slide-in-contact section disposed on a rear surface side of the apparatus body for rotating the support section to derive substantial parallelism to the main surface of the disk-shaped recording medium by sliding in contact with an edge section of a main chassis whose upper surface side is a rotation area of the disk-shaped recording medium and the transfer arm; and a biasing member that biases, to rotate, the rotation axis to make the support surface to be substantially orthogonal to the main surface of the disk-shaped recording medium.

According to still another embodiment of the present invention, there is provided a disk recording and/or reproduction apparatus, including: an apparatus body for insertion and removal to/from a disk-shaped recording medium; a recording/reproduction mechanism that performs recording and/or reproduction to/from the disk-shaped recording medium; a transfer arm that transfers the disk-shaped recording medium; and a main chassis that is disposed inside of the apparatus body on a rear surface side of an insertion direction of the disk-shaped recording medium, and has an upper surface side serving as a movement area for the disk-shaped recording medium and the transfer arm. In the disk recording and/or reproduction apparatus, the transfer arm is provided with a lift section, including: a rotation axis rotatably attached to the transfer arm, and on one end, formed with a support section for supporting the disk-shaped recording medium at a front side edge in the insertion direction thereof with a tilt, beneath the disk-shaped recording medium, of a support surface being substantially orthogonal, toward a tip end, to a main surface of the disk-shaped recording medium, and on the other end, formed with a slide-in-contact section for rotating the support section to derive substantial parallelism to the main surface of the disk-shaped recording medium by sliding in contact with an edge section of the main chassis; and a biasing member that biases, to rotate, the rotation axis to make the support surface to be substantially orthogonal to the main surface of the disk-shaped recording medium.

According to still another embodiment of the present invention, there is provided a disk transfer mechanism, including: a transfer arm that is rotatably supported to an apparatus body to/from which a disk-shaped recording medium is inserted and removed, when the disk-shaped recording medium is inserted, rotated in an insertion direction by being pressed by the disk-shaped recording medium, and when the disk-shaped recording medium is ejected, rotated in an ejection direction to eject the disk-shaped recording medium; and a support member that is disposed at a tip end portion of the transfer arm, and when on standby for insertion of the disk-shaped recording medium, positioned beneath a transfer area of the disk-shaped recording medium, and when the transfer arm is rotated by the disk-shaped recording medium in the insertion direction, supports a lower surface portion of the disk-shaped recording medium to the transfer area.

According to the disk transfer mechanism and the disk recording and/or reproduction apparatus of the embodiments of the invention, even if a user inserts a disk-shaped recording medium with a tilt at the end below a disk transfer area, the disk is supported by a support member that is on standby for insertion thereof by being located in advance below the disk transfer area, thereby preventing a collision of a disk with components in the apparatus body. Moreover, by a transfer arm rotated in the insertion direction, the disk-shaped recording medium is supported by the support member to the disk transfer area so that the disk can be smoothly transferred to inside of the apparatus body.

BRIEF DESCRIPTION OF THE DRAWINGS

FIG. 23 is an exploded perspective view of an ejection arm;

FIG. 24 is a perspective view of the ejection arm;

DETAILED DESCRIPTION OF THE INVENTION

Figure 1:
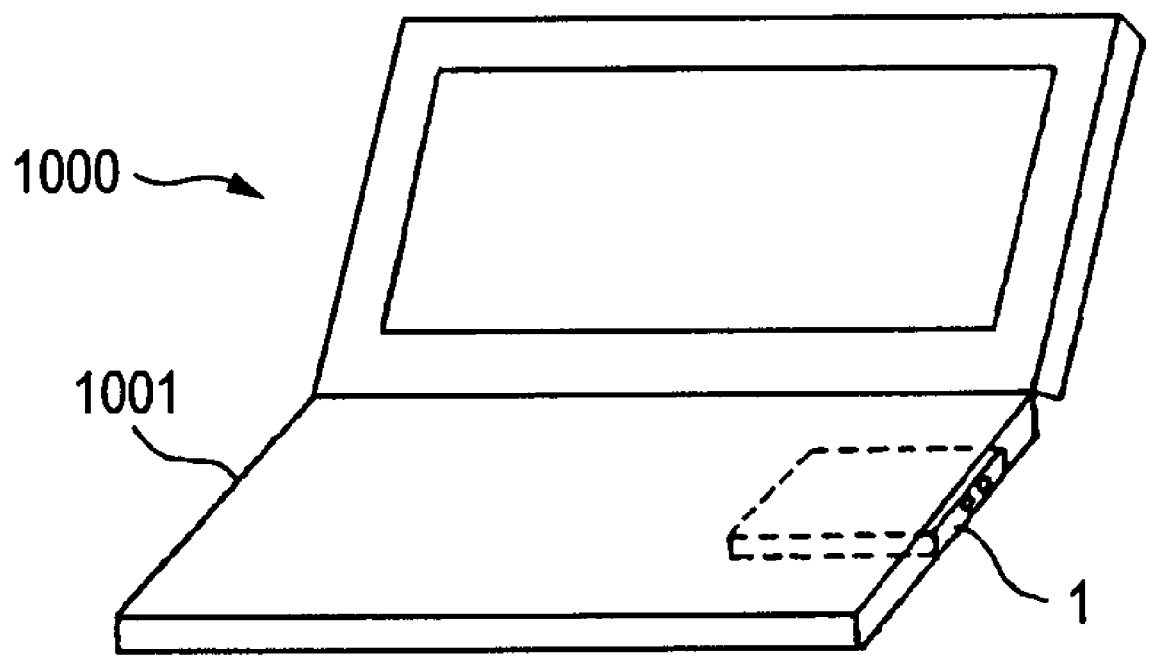
FIG. 1 is an external perspective view of electronic equipment for mounting of a disk drive apparatus to which the invention is applied.
Figure 2:
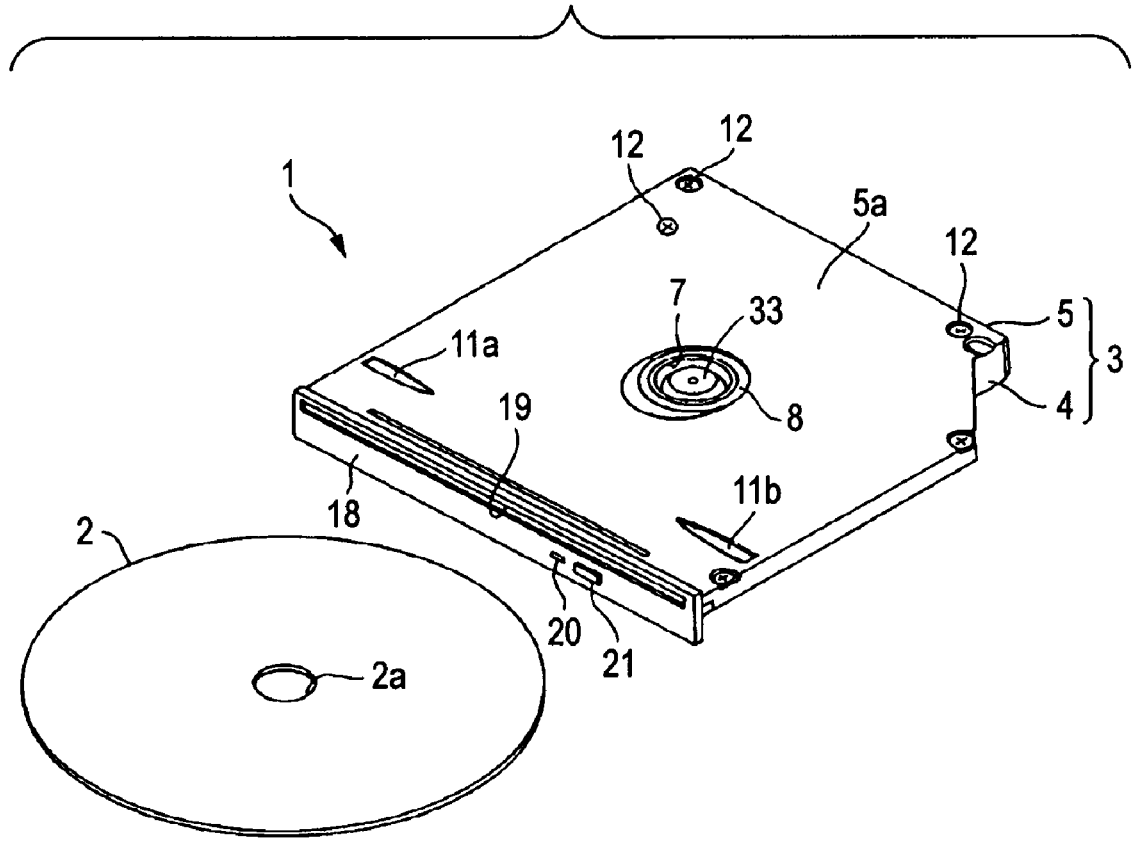
FIG. 2 is an external perspective view of the disk drive apparatus to which the invention is applied.

In the below, a disk drive apparatus to which the invention is applied is described in detail by referring to the accompanying drawings. As shown in FIG. 1, for example, this disk drive apparatus 1 is of a slot-in type mounted on an apparatus body 1001 of a notebook personal computer 1000. As shown in FIG. 2, this disk drive apparatus 1 has the low-profile configuration with the entire thickness of about 12.7 mm, and is capable of recording and reproducing an information signal to/from an optical disk 2, e.g., CD (Compact Disk), DVD (Digital Versatile Disk), and BD (Blu-ray Disc).

Figure 3:
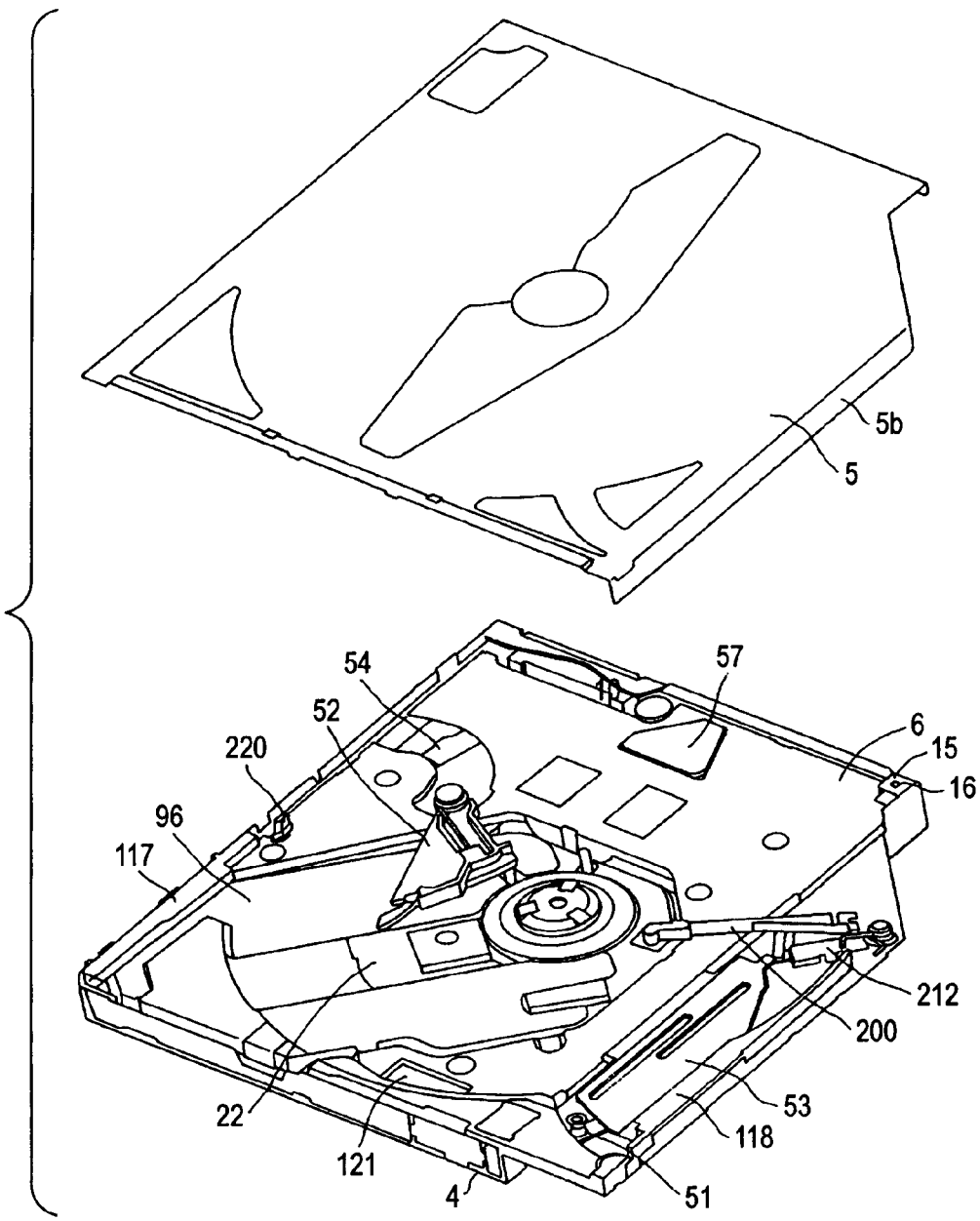
FIG. 3 is a perspective internal view of the disk drive apparatus to which the invention is applied.
Figure 4:
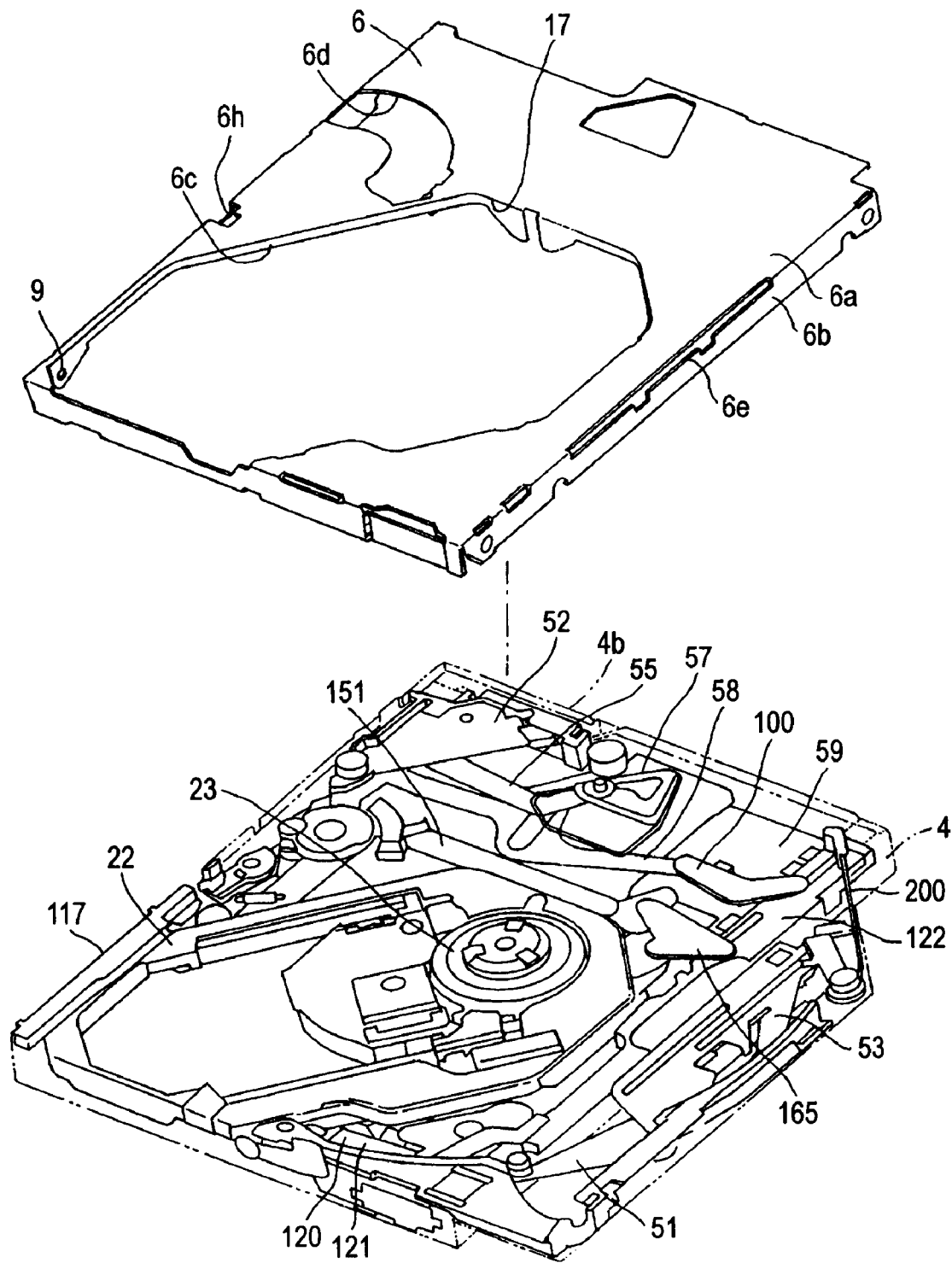
FIG. 4 is a perspective view of the disk drive apparatus from which a main chassis is removed.
Figure 5:
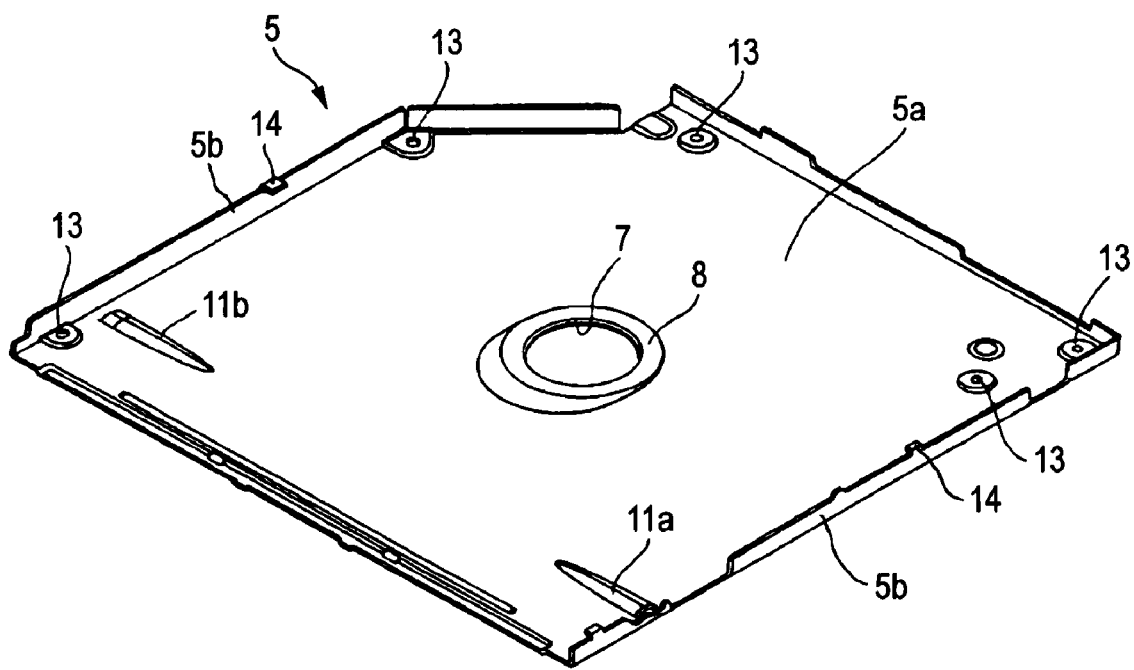
FIG. 5 is an external perspective view of a top cover.

First of all, described is the specific configuration of the disk drive apparatus 1. As shown in FIGS. 3 to 5, this disk drive apparatus 1 is provided with a cabinet 3 being an outer cabinet of the apparatus body. The cabinet 3 is configured to include a bottom case 4 being a lower part of the cabinet shaped substantially like a flat box, and a top cover 5 being a top covering an upper aperture portion of the bottom case 4. The cabinet 3 is provided therein with a main chassis 6 that makes visible from above a base unit 22 that will be described later, and covers a drive mechanism 120 that generates a driving force for disk transfer use, and a disk transfer mechanism 50 receiving the driving force of the drive mechanism 120.

As shown in FIGS. 2 and 5, the top cover 5 is made of a thin sheet metal, and includes a top portion 5a and a pair of side portions 5b. The top portion 5a serves to close the upper aperture portion of the bottom case 4, and the side portions 5b are a part of the rim of the top portion 5a slightly bent along the side surfaces of the bottom case 4. At the substantially center portion of the top portion 5a, a substantially-circular aperture section 7 is formed. This aperture section 7 is provided for making visible from outside an engagement protrusion portion 33a of a turntable 23a that is to be engaged with a center hole 2a of the optical disk 2 at the time of a chucking operation that will be described later. The rim of the aperture section 7 of the top portion 5a is slightly protruded toward inside of the cabinet 3 so that a contact protrusion section 8 is formed. This contact protrusion section 8 is so formed as to come in contact with the area around the center hole 2a of the optical disk 2 kept hold above the turntable 23a.

On the front surface side of the top portion 5a, a pair of guide protrusion portions 11a and 11b are bulged toward inside of the cabinet 3. These guide protrusion portions 11a and 11b are provided for guiding the optical disk 2 inserted from a disk insertion/removal port 19 (will be described later) while controlling the optical disk in the height direction. The guide protrusion portions 11a and 11b are each bulged like an arc in the insertion direction of the optical disk 2 at substantially diametrically opposed positions with respect to a center line passing through the aperture section 7 along the insertion direction of the optical disk 2. The guide protrusion portions 11a and 11b are each partially shaped substantially like a cone extending across the direction substantially orthogonal to the insertion direction of the optical disk 2. The cone-shaped portion is bulged from outside to inside with sequential diameter reduction of the arc. That is, these guide protrusion portions 11a and 11b each have the shape as if a cone is divided along the axial direction, and the resulting two crest portions are both faced inside. The guide protrusion portions 11a and 11b are tapered from outside to inside.

Such a shape of the guide protrusion portions 11a and 11b enables to smoothly guide the optical disk 2 inserted from the disk insertion/removal port 19 into the cabinet 3 while aligning the optical disk 2 in the width direction. With the guide protrusion portions 11a and 11b shaped as such, the top cover 5 can increase the rigidity of the top portion 5a. Note here that the inner main surface of the top portion 5a has been subjected to a process of reducing the friction resistance with the optical disk 2.

The bottom case 4 is made of a sheet metal shaped substantially like a flat box, and has the bottom surface portion shaped substantially like a rectangle. One of the side surface portions of the bottom case 4 is provided with an overhanging deck portion 4a (refer to FIG. 11 and others) at the height higher than the bottom surface portion. The deck portion 4a rotatably supports a loading arm 51, a deck arm 200, and a restriction arm 212. The loading arm 51 serves to retract the optical disk 2 into the cabinet 3 (will be described later). The deck arm 200 serves to prevent the erroneous insertion of a small-diameter optical disk 101, and to center the large-diameter optical disk 2. The restriction arm 212 serves to control the biasing force of the deck arm.

The bottom surface portion of the bottom case 4 is attached with, by screws or others, a circuit board 59 carrying thereon electronic components such as IC chip configuring a drive control circuit, connectors for establishing an electrical connection for the components, a detection switch for detecting the operation of the components, and others. At apart of the outer edge wall of the bottom case 4, a connector aperture portion 4b is provided to make visible outside the connectors mounted to the circuit board 59.

The bottom case 4 is also attached with the top cover 5 by screws. To be specific, as shown in FIG. 5, the top portion 5a of the top cover 5 is formed with, at the outer edge regions, a plurality of through holes 13 to make screws 12 (not shown) go therethrough. The side portions 5b on the sides of the top cover 5 are each provided with a guide piece 14, which is bent inward substantially at right angles. On the other hand, as shown in FIG. 3, the bottom case 4 is formed with, at the outer edge regions, a plurality of fixing pieces 15 each bent inward at substantially right angles. These fixing pieces 15 are each formed with a screw hole 16 to correspond to the through holes 13 of the top cover 5. The bottom case 4 is also formed with, on the both side surface portions, a plurality of guide slits for use to prevent the guide pieces 14 of the top cover 5 from becoming disengaged. The guide slits are not described in detail here.

For attachment of the top cover 5 to the bottom case 4, the guide pieces 14 of the top cover 5 are first engaged with the guide slits of the bottom case 4, and then the top cover 5 is moved to slide from the front surface side to the rear surface side. As a result, the top portion 5a of the top cover 5 closes the upper aperture portion of the bottom case 4. In this state, the screw 12 is screwed into each of the screw holes 16 of the bottom case 4 via any corresponding through hole 13 formed to the top cover 5. In this manner, the cabinet 3 of FIG. 2 is configured.

As shown in FIG. 2, the front surface of the cabinet 3 is attached with a front panel 18, which is shaped substantially like a rectangular flat plate. This front panel 18 is provided with the rectangular-shaped disk insertion/removal port 19 to/from which the optical disk 2 is inserted/removed in the horizontal direction. That is, the optical disk 2 is allowed to be inserted into the cabinet 3 from this disk insertion/removal port 19, or ejected from this disk insertion/removal port 19 to the outside of the cabinet 3. The disk insertion/removal port 19 is formed with a panel curtain (not shown) at both side portions in the direction orthogonal to the longitudinal direction. The panel curtain is made of a nonwoven fabric cut long in length, and is attached to the rear surface side of the front panel 18 using an adhesive, for example. As such, the panel curtain can protect the cabinet 3 from dust, and remove any dust attached to the optical disk 2 by sliding in contact with the disk surface when the optical disk 2 is inserted and removed thereto/therefrom.

The front surface of the front panel 18 is also provided with a display section 20, and an ejection button 21. The display section 20 indicates, by being illuminated, the access state with respect to the optical disk 2, and the ejection button 21 is depressed when the optical disk 2 is to be ejected.

Figure 9:
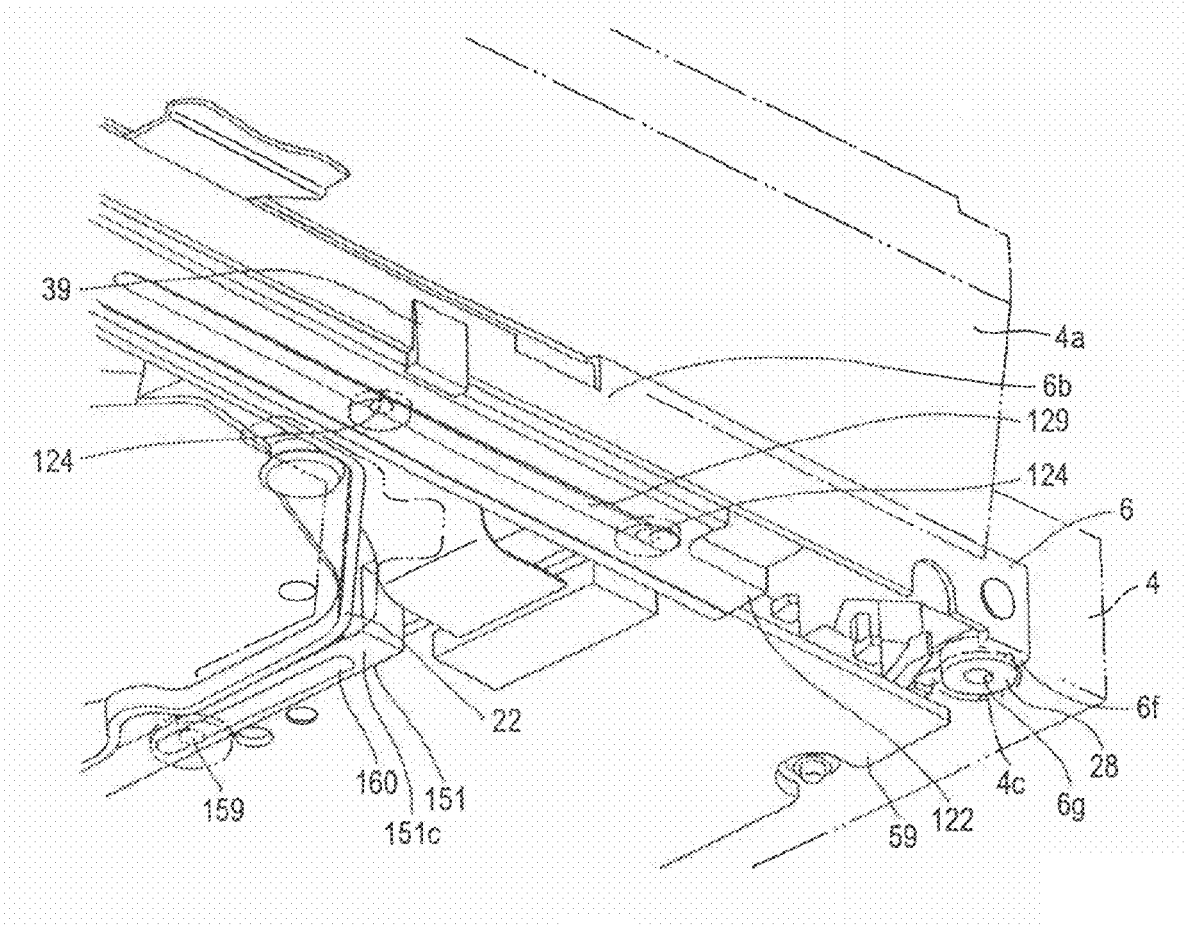
FIG. 9 is a perspective view of another exemplary disk drive apparatus.

Note here that, in the vicinity of the side surface of the bottom case 4 provided with the deck portion 4a, a pair of guide protrusions 124 and 124 are so provided as to protrude along the side surface with a space therebetween (refer to FIG. 9). The guide protrusions 124 and 124 are used to slide a slider 122 of the drive mechanism 120 (will be described later) along the side surface.

As shown in FIGS. 3 and 4, the bottom surface portion of the bottom case 4 is attached with the main chassis 6 by screws. This main chassis 6 is disposed above the circuit board 59 so as to partition, vertically into two, inside of the bottom case 4 at substantially the same height as the deck portion 4a described above. As such, in the cabinet 3, the area partitioned by the main chassis 6 located closer to the top cover 5 is made a disk transfer area where the loading arm 51, an ejection arm 52, and the deck arm 200 are present in a rotatable manner. The area portioned by the main chassis 6 located closer to the bottom case 4 is a placement area for the drive mechanism 120, and the components of the disk transfer mechanism 50, i.e., first and second link arms 54 and 55, an operation arm 58, and a loop cam 57. The drive mechanism 120 includes a drive motor 121 and the slider 122, and the disk transfer mechanism 50 is the one transferring the driving force of the drive motor 121 to the ejection arm 52.

The main chassis 6 is made of a sheet metal shaped substantially like a flat plate, and has an upper surface 6a and a pair of side portions 6b. The upper surface 6a covers the bottom case 4 from the rear surface portion side thereof to the side surface portion formed with the deck portion 4a. The side portions 6b are apart of the rim of the upper surface 6a slightly bent along the side surfaces of the bottom case 4. In the main chassis 6, the upper surface 6a is formed with a base aperture portion 6c and an ejection arm aperture portion 6d for use to make visible components, i.e., the base unit 22 and the ejection arm 52 of the disk transfer mechanism 50, onto the transfer area of the optical disk 2. The side portion 6b on the side formed with the deck portion 4a is formed with a side aperture portion 6e through which a loading cam plate 53 is inserted. The loading cam plate 53 is being coupled with the slider 122 that is moved to slide by the drive motor 121.

At the upper surface 6a of this main chassis 6, on the side of the bottom case 4, the components are latched, i.e., the ejection arm 52 of the disk transfer mechanism 50 that transfers the optical disk 2 across inside and outside of the cabinet 3, the operation arm 58 that operates the ejection arm 52 through transmission of the driving force of the drive mechanism 120, and the loop cam 57 that guides the movement of the second link arm 55. The upper surface 6a is adjacent to the base unit 22, and the side edge opposing the disk insertion/removal port 19 serves as an edge section 17 along which a lift section 90 and a second lift section 250 provided to the ejection arm 52 that will be described later slide.

The main chassis 6 is formed with a latch section 98 on the side wall in the vicinity of a corner portion on the rear surface side of the cabinet 3 latched with the loop cam 57, and on the side surface side provided with the ejection arm 52 and the first and second link arms 54 and 55. At the latch section 98, latched is an extension spring 56 for biasing the ejection arm 52 in the direction of ejecting the optical disk 2 via the first link arm 54.

Note that the main chassis 6 is provided with a plurality of guide pieces 6f on the side portions 6b, and a through hole 6g for fixation with the bottom case 4. On the other hand, the bottom case 4 is formed with a screw hole 4c at the position corresponding to the through hole 6g, and this screw hole 4c is screwed with the through hole 6g so that the main chassis 6 is fixed.

The main chassis 6 is formed with, in the vicinity of the ejection arm aperture portion 6d, a centering guide aperture portion 6h from which a guide piece 221 of a centering guide 220 (will be described later) is to be protruded.

Figure 6:
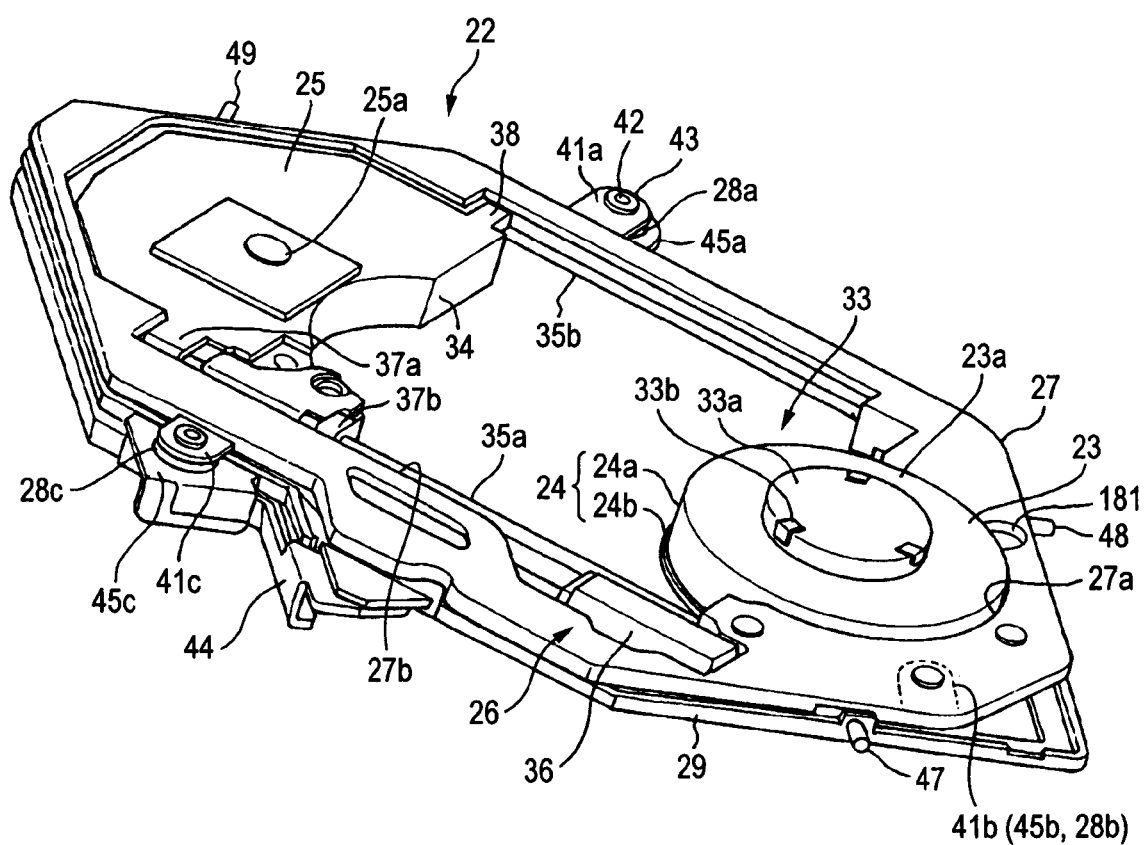
FIG. 6 is a perspective view of a base unit.

This disk drive apparatus 1 is provided with, at the bottom surface portion of the bottom case 4, the base unit 22 configuring the drive body. As shown in FIG. 6, the base unit 22 has a base chassis 27 being a substantially rectangular frame body, and the base chassis 27 is supported by a sub chassis 29 via a plurality of dampers 28a to 28c. The base unit 22, i.e., one end side in the longitudinal direction, is positioned substantially at the center of the cabinet 3 by the base chassis 27 being disposed to the bottom case 4 via the sub chassis 29. The base unit 22 is provided with, on the end side in the longitudinal direction, a disk loading section 23 and a disk rotation drive mechanism 24. The disk loading section 23 is loaded with the optical disk 2 inserted from the disk insertion/removal port 19 to/from the inside of the cabinet 3. The disk rotation drive mechanism 24 drives, to rotate, the optical disk 2 loaded to the disk loading section 23. The base unit 22 includes an optical pickup 25 and a pickup feed mechanism 26, which are provided to the base chassis 27 as a piece therewith. The optical pickup 25 is in charge of signal writing or reading to/from the optical disk 2 to be driven, to rotate, by the disk rotation drive mechanism 24. The pickup feed mechanism 26 transfers the optical pickup 25 across the longitudinal direction, and goes through a feed operation of the optical disk 2 in the radius direction. By the base chassis 27 being supported by the sub chassis 29, the base unit 22 is moved up and down, with respect to the optical disk 2, with the sub chassis 29 by a base moving mechanism 150 that will be described later.

This base unit 22 is made visible on the disk transfer area from the base aperture portion 6c of the main chassis 6 in such a manner that the disk loading section 23 is located at substantially the center in the bottom surface portion of the bottom case 4. The base unit 22 is allowed to move up and down by the base moving mechanism 150 that will be described later. In the initial state, the base unit 22 is positioned below the optical disk 2 that is to be inserted from the disk insertion/removal port 19 into the cabinet 3, and is moved upward with the loading operation of the optical disk 2 so that the optical disk 2 is engaged with the base unit 22 with possible rotation. After the recording/reproduction operation, the base unit 22 is moved down by the base moving mechanism 150 so that the engagement with the optical disk 2 is released. Also at the same time, the base unit 22 is moved away from the transfer area of the optical disk 2.

The base chassis 27 is formed by stamping a sheet metal into a predetermined shape, and by bending downward the rim of the stamped result. The base chassis 27 is formed with, on the main surface, a table aperture portion 27a and a pickup aperture portion 27b in a sequential manner. The table aperture portion 27a is shaped substantially like a semicircle, and from which the turntable 23a of the disk loading section 23 (will be describe later) is visible upward. The pickup aperture portion 27b is shaped substantially like a rectangle, and from which an objective lens 25a of the optical pickup 25 (will be described later) is visible upward. Note here that, as shown in FIG. 3, the base chassis 27 is attached with, on the upper surface portion, a face plate 30 formed with aperture sections corresponding to the aperture portions 27a and 27b, respectively.

The base chassis 27 is also formed with, at an end portion opposite to the disk loading section 23, a guide plate 32 for use to protect the optical disk 2 not to come in contact with the base chassis 27, and to guide the optical disk 2 to a support section 88 of the ejection arm 52. The guide plate 32 is affixed with a fiber sheet that is not shown, and this protects the signal recording surface of the optical disk 2 from scratches even when the optical disk 2 is slid in contact therewith.

The base chassis 27 is formed with, on the side surfaces in the longitudinal direction, coupling pieces 41a and 41b for coupling with the sub chassis 29 via the dampers 28a and 28b. These coupling pieces 41a and 41b are each drilled to form an insertion hole 43 continuously to the corresponding coupling piece, i.e., 45a or 45b, formed to the sub chassis 29. The coupling pieces 41a and 41b are each inserted with a stepped screw 42.

The disk loading section 23 includes the turntable 23a that is driven, to rotate, by the disk rotation drive mechanism 24. At the center portion of this turntable 23a, a chucking mechanism 33 is provided for loading of the optical disk 2. This chucking mechanism 33 has an engagement protrusion portion 33a for engagement with the center hole 2a of the optical disk 2, and a plurality of latch lugs 33b for latching the area around the center area 2a of the optical disk 2 being engaged with the engagement protrusion portion 33a. As such, the optical disk 2 is kept hold on the turntable 23a.

The disk rotation drive mechanism 24 has a flat-shaped spindle motor 24a that drives, to rotate, the optical disk 2 as a piece with the turntable 23a. This spindle motor 24a is screwed to the lower surface of the base chassis 27 via a support plate 24b in such a manner that the turntable 23a provided to the upper surface portion slightly protrudes from the table aperture portion 27a of the base chassis 27.

The optical pickup 25 includes an optical block that gathers light beams coming from a semiconductor laser being a light source using the objective lens 25a for irradiation onto the signal recording surface of the optical disk 2, and detects the returned light beams being the reflection results on the signal recording surface of the optical disk 2 using a photodetector configured by a light reception device or others. Using such an optical block, signal writing or reading is performed with respect to the optical disk 2.

The optical pickup 25 also includes an objective lens drive mechanism such as two-axis actuator for use to drive the objective lens 25a to displace in two directions, i.e., an optical axis direction (focusing direction), and a direction orthogonal to a recording track of the optical disk (tracking direction). Using the two-axis actuator, the optical pickup 25 displaces the objective lens 25a in the focusing and tracking directions based on a detection signal from the optical disk being the detection result of the above-described photodetector. With such lens displacement, the optical pickup 25 adjusts the focus of the objective lens 25a on the signal recording surface of the optical disk 2, i.e., focus servo, and exercises drive control to make a spot of the light beams gathered by the objective lens 25a to follow the recording track, i.e., tracking servo. Alternatively, for such an objective lens drive mechanism, a three-axis actuator may be used to enable tilt (skew)

adjustment of the objective lens 25a with respect to the signal recording surface of the optical disk 2, i.e., the light beams gathered by the objective lens 25a are directed vertically to the signal recording surface of the optical disk 2 in addition to focusing and tracking control as above.

The pickup feed mechanism 26 includes a pickup base 34, a pair of guide axes 35a and 35b, and a displacement drive mechanism 36. The pickup base 34 is mounted with the optical pickup 25, and the guide axes 35a and 35b support the pickup base 34 to be able to slide in the radius direction of the optical disk 2. The displacement drive mechanism 36 serves to drive, to displace, the pickup base 34 supported by the guide axes 35a and 35b in the radius direction of the optical disk 2.

From one side surface of the pickup base 34, a pair of guide pieces 37a and 37b are protruded with a guide hole for insertion of one of the guide axes 35a and 35b, i.e., the guide axis 35a. From other side surface of the pickup base 34 formed with the guide pieces 37a and 37b as such, a guide piece 38 is protruded with a guide groove for gripping thereby the remaining guide axis, i.e., the guide axis 35b. With such a configuration, the pickup base 34 is supported by the guide axes 35a and 35b to be able to slide.

The guide axes 35a and 35b are disposed on the lower surface of the base chassis 27 so as to be both parallel to the radius direction of the optical disk 2. The guide axes 35a and 35b guide, in and out along the radius of the optical disk 2, the pickup base 34 in which the optical pickup 25 is visible from the pickup aperture portion 27b of the base chassis 27.

The displacement drive mechanism 36 converts the rotation drive of a drive motor 31 equipped to the base chassis 27 into linear drive via a gear and rack (not shown), and drives the pickup base 34 to displace in the direction along the guide axes 35a and 35b, i.e., the radius direction of the optical disk 2. The displacement drive mechanism 36 is a stepping motor equipped with a lead screw, for example.

Described next is the sub chassis 29 serving to support such a base chassis 27 via the dampers 28. The sub chassis 29 is moved up and down by the base moving mechanism 150 (will be described later) in response to the transfer of the optical disk 2 so that the base chassis 27 is moved close to or away from the optical disk 2. This sub chassis 29 has substantially the same shape as the outside shape of the base chassis 27, and is a substantially rectangular frame body being slightly larger than the base chassis 27. The sub chassis 29 is coupled with the base chassis 27, thereby configuring the base unit 22 as a piece with the base chassis 27. The sub chassis 29 is provided along the side surface portion provided with the guide axis 35a, and is attached as a piece with a reinforcing chassis 44 for use for reinforcement of the sub chassis 29. The sub chassis 29 is formed with coupling pieces 45a and 45b for coupling with the base chassis 27. The coupling pieces 45a and 45b are attached with the dampers 28a and 28b, respectively. The coupling piece 45a is disposed at the position corresponding to a coupling piece 41a of the base chassis 27 on one side surface in the longitudinal direction of the sub chassis 29. The coupling piece 45b is protruded from an end portion on the side of the disk loading section 23 corresponding to a coupling piece 41b of the base chassis 27 on the remaining side surface in the longitudinal direction of the sub chassis 29.

Figure 7:
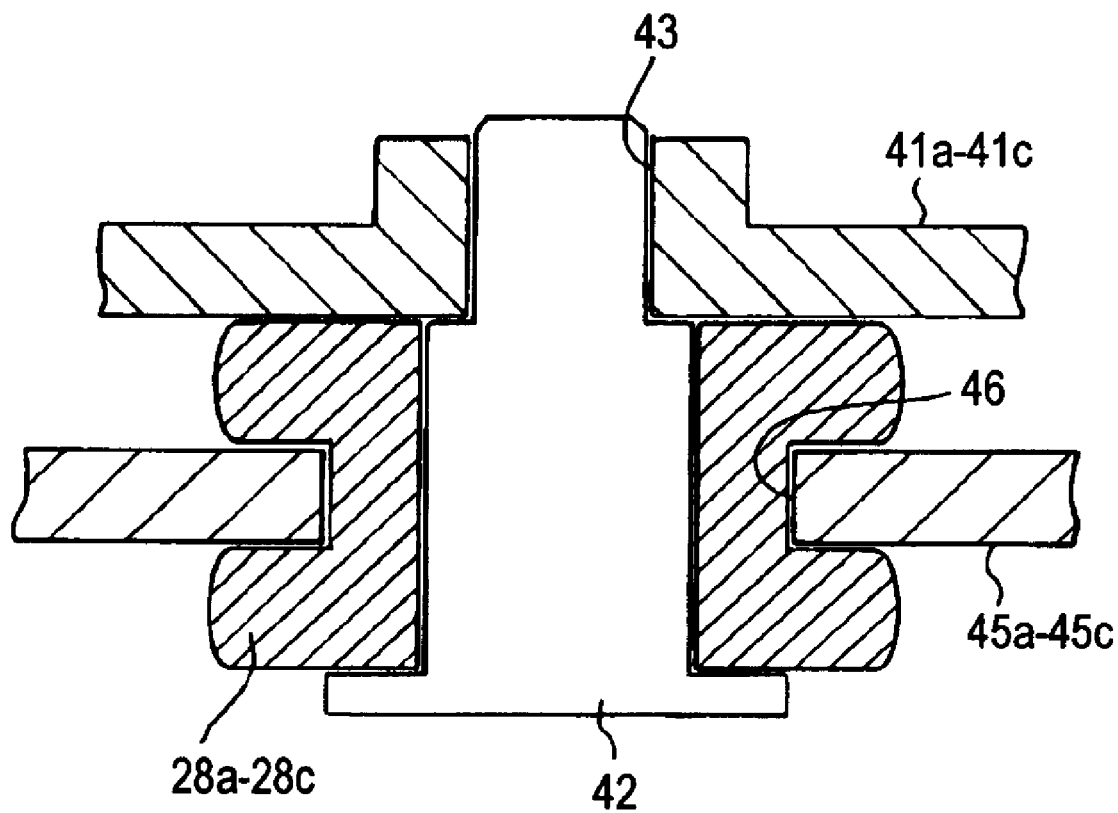
FIG. 7 is a cross sectional view of a coupling portion between a base chassis and a sub chassis.

Note that at an end portion of the remaining side surface in the longitudinal direction opposite to the disk loading section 23, the sub chassis 29 is provided with no coupling piece, and the reinforcing chassis 44 fixed to the sub chassis 29 is provided with a coupling piece 45c corresponding to a coupling piece 41c of the base chassis 27. As shown in FIG. 7, the coupling pieces 45a to 45c are each drilled to form an insertion hole 46 sequentially to the insertion hole 43 of any of the corresponding coupling pieces 41a to 41c of the base chassis 27. The coupling pieces 45a to 45c are respectively attached with the dampers 28a to 28c, and are respectively coupled to the coupling pieces 41a to 41c of the base chassis 27 via these dampers 28a to 28c so that the stepped screw 42 is each inserted through the insertion holes 43 and 46.

As shown in FIG. 6, the sub chassis 29 includes first to third spindles 47 to 49. The first spindle 47 is disposed on the side of the disk loading section 23 on the side surface opposing the slider 122 that will be described later, and is supported through engagement with a first cam slit 130 of the slider 122. The second spindle 48 is disposed on the side of the disk loading section 23 on the side surface opposing a sub slider 151, and is supported through engagement with a second cam slit 170 of the sub slider 151. The third spindle 49 is disposed on the front side surface opposite to the side surface opposing the slider 122, and is rotatably supported by an axis hole 9 provided to each of the side portions 6b of the main chassis 6.

As such, in the sub chassis 29, in response to the sliding movement of the slider 122 and the sub slider 151, the first spindle 47 slides inside of the first cam slit 130, and the second spindle 48 slides in the second cam slit 170 so that the side of the disk loading section 23 is rotated about the third spindle 49. In this manner, the base chassis 27 is allowed to move up and down.

As shown in FIG. 3, the bottom surface portion of the bottom case 4 is provided with a support pin 10 (not shown) being upright to prevent the ejection arm 52 (will be described later) from sagging when it rotates in the vicinity of the disk loading section 23. The support pin 10 is provided to protect the optical disk 2 from damage by possible collision with the disk loading section 23 as a result of sagging of the ejection arm 52. This support pin 10 is positioned in the vicinity of the disk loading section 23 of the base unit 22, and is protruding upward from the bottom surface portion of the bottom case 4. The support pin 10 is inserted through an insertion hole 30a drilled to the face plate 30 so that the pin is visible from the disk transfer area.

Figure 8:
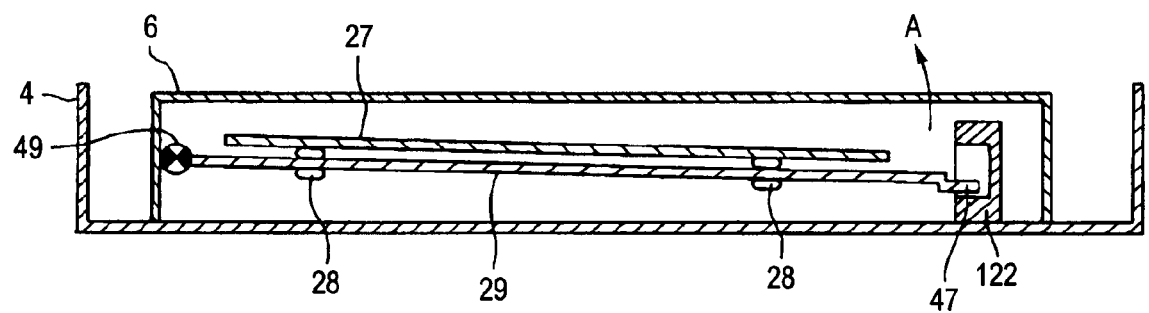
FIG. 8 is a diagram for illustrating the support configuration in the base unit by a damper disposed between the base chassis and the sub chassis.

As schematically shown in FIG. 8, the base unit 22 configured as such is moved up and down in the direction of an arrow A and in the direction opposite to the arrow A. At this time, the base chassis 27 is supported only by the sub chassis 29 via the dampers 28. It means that any vibration coming from outside is entirely transmitted via the damper 28—attached sub chassis 29 so that the impact resistance is favorably increased. What is more, any excess weight including the weight of the dampers 28 is removed from the base chassis 27, i.e., the total weight of an object for impact transfer is light with no damper, whereby the impact resistance can be increased to a further degree.

Note here that, in the disk drive apparatus 1, the main chassis 6 may be fixed to the bottom case 4 via dampers. Specifically, as shown in FIG. 9, the main chassis 6 may be provided with the damper 28 between each of the guide pieces 6f and the screw hole 4c of the bottom case 4, and a stepped screw is used for screwing.

Figure 10:
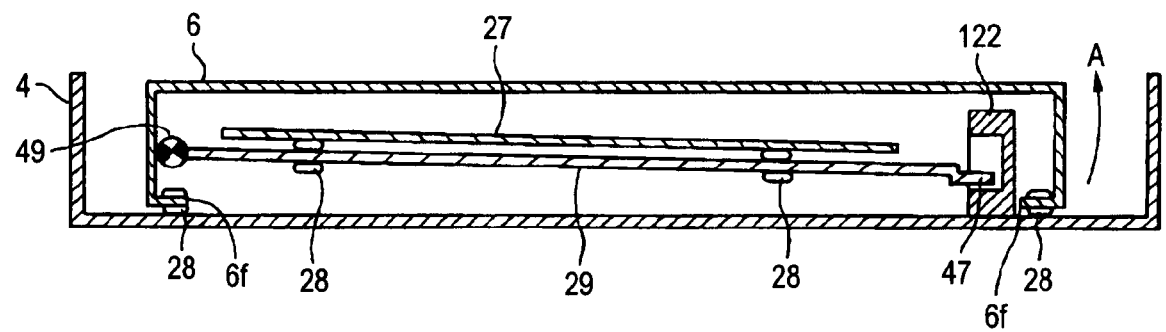
FIG. 10 is a cross sectional view of the disk drive apparatus of FIG. 9.

As schematically shown in FIG. 10, in the base unit 22 fixed as such, the sub chassis 29 is supported by the main chassis 6, and this main chassis 6 is fixed to the bottom case 4 via the dampers 28. In this configuration, the base chassis 27 is supported only by the sub chassis 29 via the dampers 28a to 28c, and this sub chassis 29 is supported by the main chassis 6 so that the main chassis 6 is fixed to the bottom case 4 via the dampers 28. Accordingly, any vibration coming from outside is transmitted through the main chassis 6 attached with the dampers 28 and then the sub chassis 29 attached with the dampers 28a to 28c, i.e., vibration is transmitted through dampers disposed in two stages, so that the impact resistance can be increased to a further degree.

As shown in FIG. 9, a shock absorber 39 may be provided between the bottom case 4 and the substantially middle portion of the side portions 6b of the main chassis 6. The shock absorber 39 is made of an elastic material such as thin rubber piece for the aim of blocking the path of impact transmission, which is formed by direct contact between the bottom case 4 and the side portions 6b by the vibration amplitude of the impact. The shock absorber 39 is formed with an adhesive layer in its entirety, and this adhesive layer is affixed to the side portions 6b of the main chassis 6.

The shock absorber 39 accordingly contributes to reduce the clearance between the bottom case 4 and the main chassis 6. The shock absorber 39 also contributes to prevent, when the main chassis 6 is connected to the inside of the bottom case 4 via the dampers 28, the side portions 6b of the main chassis 6 from coming in contact with the bottom case 4, and any disturbance from being transmitted to the main chassis 6 and the base chassis 27 via the contact portion.

As shown in FIGS. 11 to 19, the disk drive apparatus 1 includes the disk transfer mechanism 50, which transfers the optical disk 2 between a disk insertion/removal position and a disk loading position. At the disk insertion position, the optical disk 2 is inserted and removed to/from the disk insertion/removal port 19, and at the disk loading position, the optical disk 2 is loaded to the turntable 23a of the disk loading section 23.

This disk transfer mechanism 50 includes support members to be operated to move between the upper surface 6a of the main chassis 6 and the main surface of the top portion 5a opposing the disk loading section 23. The support members include the loading arm 51 and the ejection arm 52, the loading cam plate 53, the first link arm 54, the second link arm 55, the extension spring 56, the loop cam 57, and the operation arm 58. The loading arm 51 and the ejection arm 52 are allowed to swing in the plane parallel to the main surface of the optical disk 2. The loading cam plate 53 transfers the driving force from the drive mechanism 120 (will be described later) to the loading arm 51. The first link arm 54 is engaged with the ejection arm 52, and rotates the ejection arm 52 in the direction of ejecting the optical disk 2. The second link arm 55 is coupled to the first link arm 54. The extension spring 56 is placed across the first link arm 54 and the main chassis 6. The loop cam 57 is engaged with a guide convex section 113 of the second link arm 55, and guides the second link arm 55. The operation arm 58 is operated, through coupling with the drive mechanism 120, to move the first link arm 54 in the direction for the ejection arm 52 to insert or eject the optical disk 2.

When the ejection arm 52 is rotated to any predetermined position with the optical disk 2 inserted from the disk insertion/removal port 19, using the loading arm 51, the disk transfer mechanism 50 automatically retracts the optical disk 2 to the disk loading section 23. When the ejection arm 52 is rotated to the front side surface of the cabinet 3, the disk transfer mechanism 50 ejects the optical disk 2. More in detail, after the insertion of the optical disk 2 but before the retraction operation with the ejection arm 52 rotated to any predetermined position, a rotation support member 71 of the ejection arm 52 is rotated to the side of a left guide wall 117 of the cabinet 3, and the guide convex section 113 formed to the tip end portion of the second link arm 55 is guided by the loop cam 57. In response thereto, the disk transfer mechanism 50 is moved in a direction different from the rotation direction of an engagement hole 80 engaged with the first link arm 54 of the rotation support member 71. Such movement of the disk transfer mechanism 50 restricts the movement of the first link arm 54 coupled to the rotation support member 71 and the second link arm 55, and allows the extension of the extension spring 56 placed across the first link arm 54 and the main chassis 6. As a result, the ejection arm 52 is rotated in the insertion direction while being biased in the ejection direction.

During the retraction operation of the optical disk 2, the guide convex section 113 of the second link arm 55 is guided by the loop cam 57 so that the disk transfer mechanism 50 is moved in the direction same as the rotation direction of the engagement hole 80 engaged with the first link arm 54 of the rotation support member 71. Such movement of the disk transfer mechanism 50 compresses the extension spring 56 that has been extended so that the biasing force of the ejection arm 52 is reduced in the ejection direction.

For ejection of the optical disk 2, the guide convex section 113 of the second link arm 55 is guided by the loop cam 57, and thus the disk transfer mechanism 50 is moved in the direction same as the rotation direction of the engagement hole 80 engaged with the first link arm 54 of the rotation support member 71 of the ejection arm 52, which is rotated in the direction of ejecting the optical disk 2. With such movement of the disk transfer mechanism 50, the ejection arm 52 is rotated with no biasing force by the extension spring 56 so that the optical disk 2 is directed to be ejected.

As such, in the process of a user inserting the optical disk 2 to any predetermined position, the extension spring 56 is extended so that the biasing force is exerted in the ejection direction. This enables to prevent, even if a user stops insertion of the optical disk 2 in the middle of the operation, the optical disk 2 being inserted halfway through and left in the cabinet 3. In the process of retracting the optical disk 2 by the loading arm 51, the biasing force on the ejection arm 52 is not exerting in the ejection direction with the compression of the extension spring 56 so that the optical disk 2 can be retracted smoothly. In the process of ejection the optical disk, the first link arm 54 comes closer to the latch portion of the main chassis 6, and thus the extension spring 56 remained compressed so that the biasing force of the extension spring 56 having been exerted on the ejection arm 52 does not act in the ejection direction. The ejection arm 52 is thus rotated in response to the operation of the operation arm 58 that has been received the driving force of the drive mechanism 120, thereby enabling to eject the optical disk 2 in a stable manner to any predetermined stop position without relying on the elastic force. At the stop position, the center hole 2a of the optical disk 2 is ejected to the outside of the cabinet 3.

In the below, components of such a disk transfer mechanism 50 are described in detail.

Figure 20:
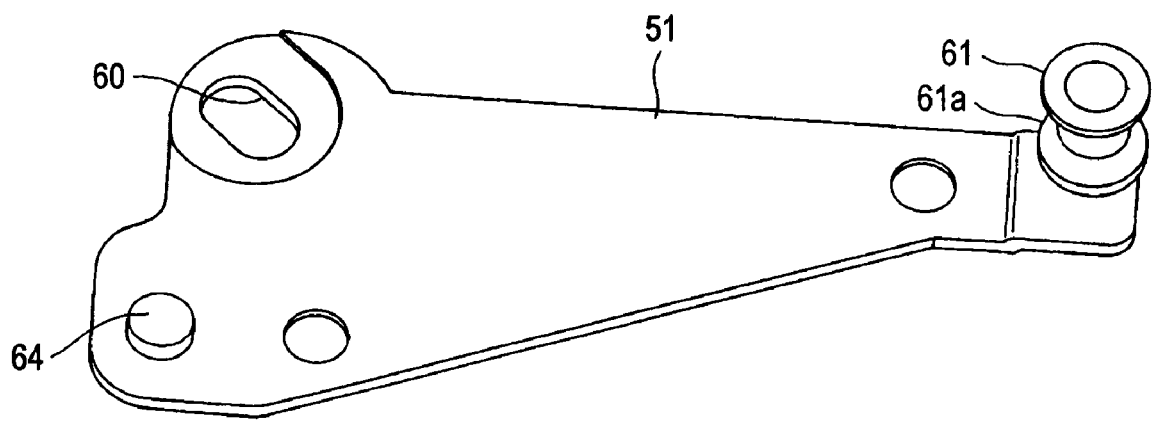
FIG. 20 is a perspective view of the loading arm.
Figure 21:
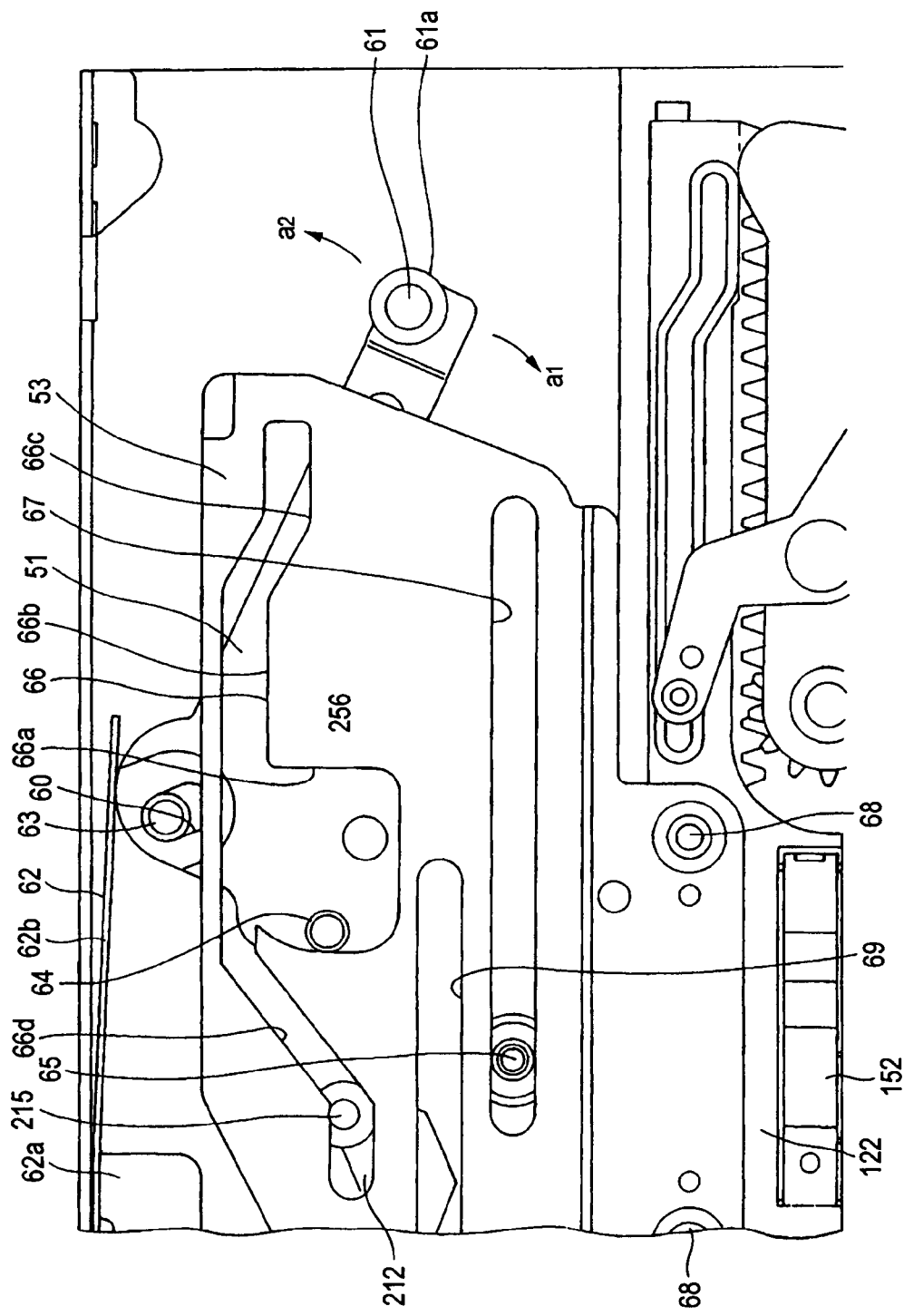
FIG. 21 is a plan view of the loading arm.

The loading arm 51 is used to retract the optical disk 2 onto the disk loading section 23. The base end portion of the loading arm 51 is rotatably supported above the deck portion 4a of the bottom case 4 to the side closer to the disk insertion/removal port 19 than the disk loading section 23. The tip end portion of the loading arm 51 is allowed to rotate in the directions of arrows $a_1$ and $a_2$ of FIG. 11. Specifically, as shown in FIGS. 20 and 21, the loading arm 51 is provided with an arm body 51a being a flat sheet metal, and from one end portion of this arm body 51a, an insertion hole 60 is protruded. This insertion hole 60 is engaged with a rotation support member 63 protruded from the deck portion 4a with the shape of, substantially, a cylinder. Through such engagement, the loading arm 51 is supported rotatably about the rotation support member 63 above the deck portion 4a in the direction of the arrow $a_1$ of FIG. 21 of loading the optical disk 2, and in the direction of the arrow $a_2$ of FIG. 21 of ejecting the optical disk 2.

The insertion hole 60 is shaped long in length. The loading arm 51 is thus rotated in the directions of the arrows $a_1$ and $a_2$ in the drawing while moving along the insertion hole 60. As will be described later in detail, in the processes of insertion, retraction, and ejection of the optical disk 2, this enables to absorb any difference of rotation timing with the ejection arm 52 in accordance with the stroke of the slider 122 so that the loading arm 51 becomes capable of performing insertion and ejection of the optical disk 2 in a smooth manner.

The loading arm 51 is provided with an abutting section 61 at the tip end portion of the arm body 51a. The abutting section is protruded upward to abut against the outer regions of the optical disk 2 inserted from the disk insertion/removal port 19. The abutting section 61 is attached with a small-diameter rotation roller 61a to allow it to rotate. The abutting section 61 is made of a resin softer than the optical disk 2, and is shaped substantially like an hourglass, i.e., the center portion abutting the outer regions of the optical disk 2 inserted from the disk insertion/removal port 19 is curved inward, and the end portions are increased in diameter to serve as flange portions to restrict the movement of the optical disk 2 in the height direction.

By the biasing force of a spring leaf 62, i.e., by the area in the vicinity of the insertion hole 60 being pressed against the leaf spring 62, the loading arm 51 is always biased to rotate in the direction of the arrow $a_1$ of FIG. 21 about the insertion hole 60, i.e., in the direction that the optical disk 2 is biased to the side of the disk loading section 23 from the side of the disk insertion/removal port 19. The leaf spring 62 biasing the loading arm 51 as such is configured to include a base portion 62a fixed onto the deck portion 4a, and an arm portion 62b extended from one end of the base portion 62a for biasing the loading arm 51.

The loading arm 51 is also provided with an engagement convex section 64, which is protruded for insertion to and engagement with a first cam groove 66 of the loading cam plate 53 that will be described later. With the engagement convex section 64 moved along the first cam groove 66 of the loading cam plate 53, the loading arm 51 is rotated while restricting the biasing force of the leaf spring 62.

The loading cam plate 53 is a flat sheet metal, and is engaged with the slider 122 of the drive mechanism 120 (will be described layer), thereby moving back and forth on the deck portion 4a in response to the movement of the slider 122. This movement rotates the restriction arm 212 that restricts the biasing force of the loading arm 51 and the deck arm 200 that will be described later. The loading cam plate 53 is placed over the loading arm 51 and the restriction arm 212 that are rotatably supported above the deck portion 4a, and is inserted with the engagement convex section 64 of the loading arm 51 and a rotation guide section 215 of the restriction arm 212. With such a configuration, the loading cam plate 53 restricts the rotation of the loading arm 51 and the restriction arm 212 in accordance with the operation of inserting and ejecting the optical disk 2.

Figure 22A:
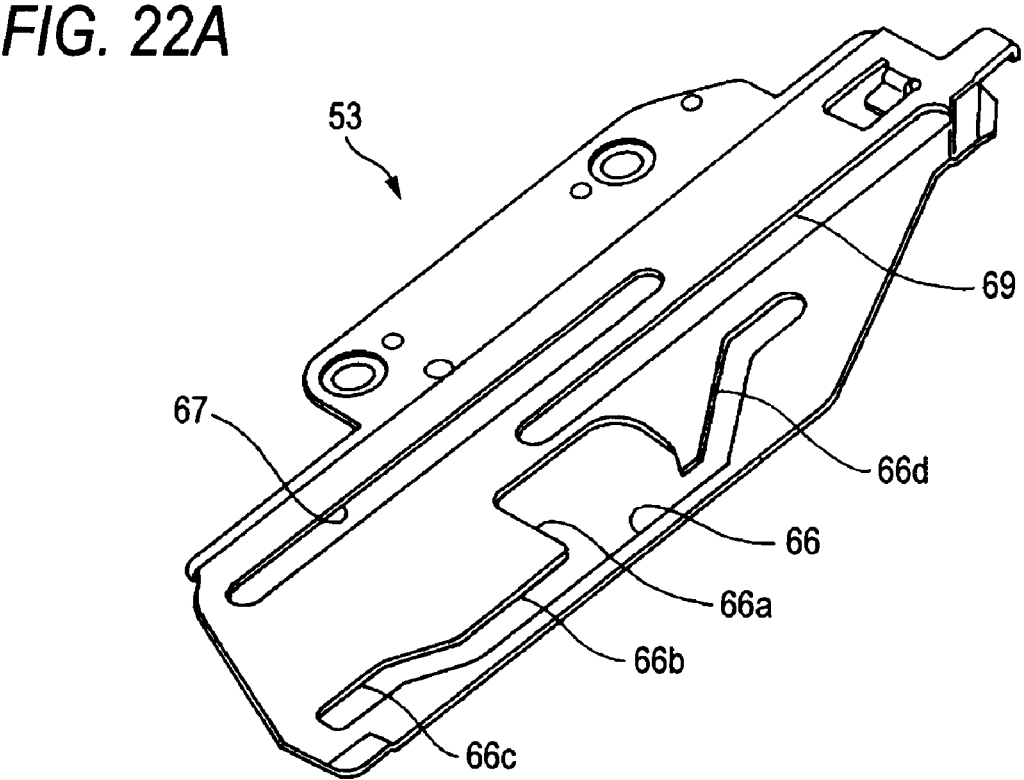
FIG. 22A is a perspective view of a loading cam plate showing the front surface side.
Figure 22B:
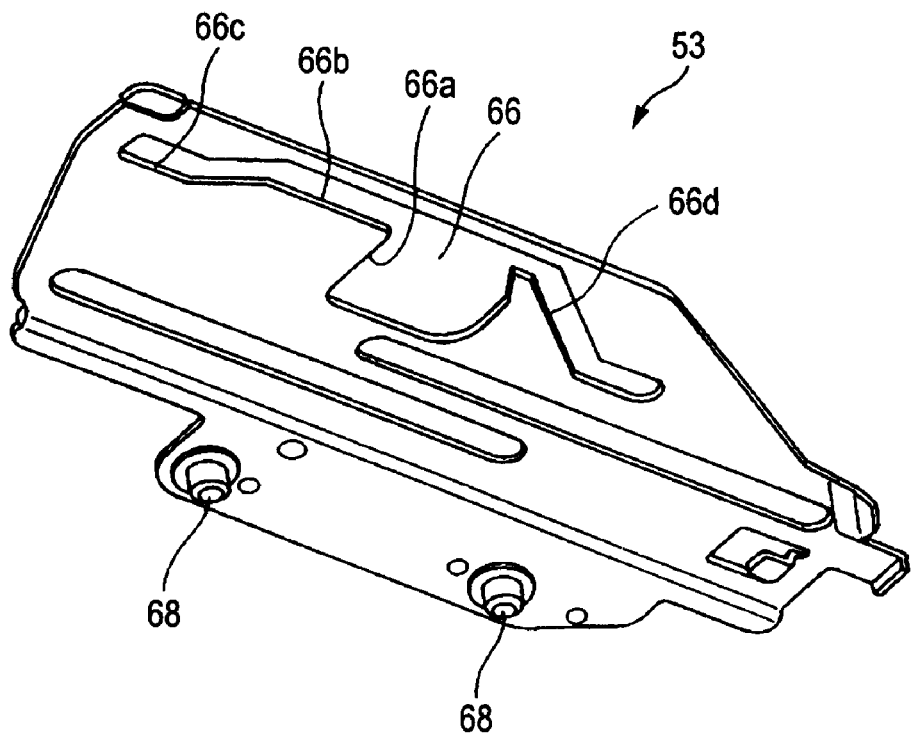
FIG. 22B is a perspective view of the loading cam plate showing the back surface side.

As shown in FIGS. 22A and 22B, such a loading cam plate 53 is formed with the first cam groove 66, a second cam groove 67, a pair of engagement protrusions 68 and 68, and a third cam groove 69. The first cam groove 66 is inserted with the engagement convex section 64 protruding from the loading arm 51, and the rotation guide section 215 of the restriction arm 212. The second cam groove 67 is inserted with a guide convex section 65 protruding from the deck portion 4a. The engagement protrusions 68 and 68 are engaged with the slider 122. The third cam groove 69 is inserted with a rotation support pin 217 that rotatably supports the restriction arm 212 above the deck portion 4a.

The first cam groove 66 restricts, when the engagement convex section 64 slides in contact therewith, the rotation of the loading arm 51 that is biased in the direction of loading the optical disk 2 by the leaf spring 62. The first cam groove 66 also controls, when the rotation guide section 215 slides in contact therewith, the biasing force of a coil spring 203 latched to the deck arm 200 through rotation of the restriction arm 212.

Figure 11:
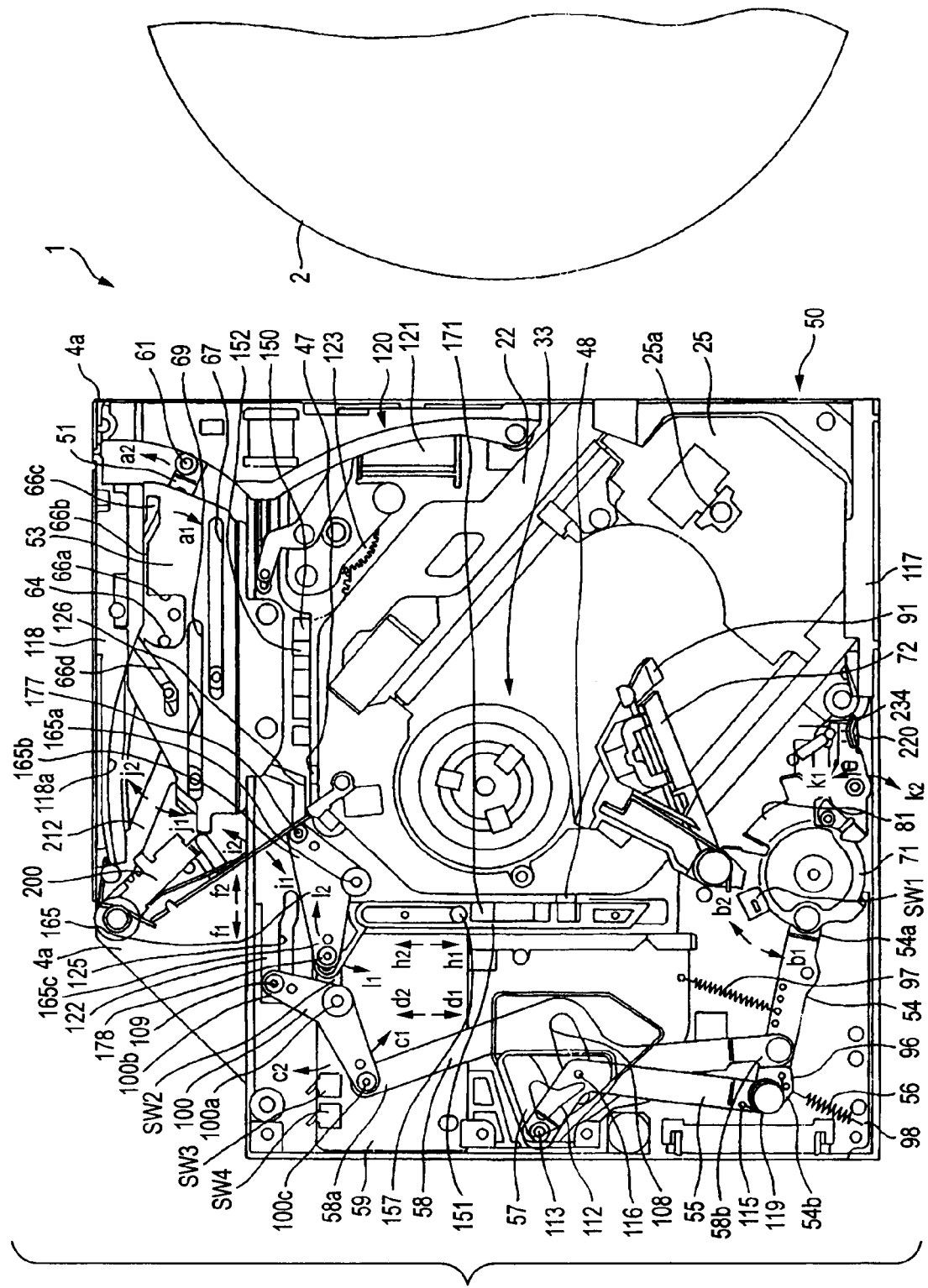
FIG. 11 is a plan view of the disk drive apparatus being on standby for insertion of an optical disk.

As shown in FIGS. 11 and 21, the first cam groove 66 is configured to include first to fourth guide portions 66a to 66d. The first guide portion 66a restricts the engagement convex section 64, and rotates the loading arm 51 in the direction of the arrow $a_1$ of FIG. 11, i.e., the direction of retracting the optical disk 2. The second guide portion 66b is formed sequentially adjacent to the first guide portion 66a, and restricts the rotation position of the loading arm 51 so that the optical disk 2 is supported at the centering position. The third guide portion 66c is formed sequentially to the second guide portion 66b, and guides the engagement convex section 64 in the direction of the arrow $a_2$ of FIG. 11, i.e., the direction of rotating the loading arm 51 to move away from the outer regions of the optical disk 2 loaded to the disk loading section 23. The fourth guide portion 66d is disposed on the side opposite to the second guide portion 66b via the first guide portion 66a, and guides the rotation guide section 215 so that the restriction arm 212 is rotated.

The first guide portion 66a is formed in the direction substantially orthogonal to the movement direction of the loading cam plate 53, and is abutted against the engagement convex section 64 from the front surface side by the loading cam plate 53 being moved in the direction of an arrow $f_1$, i.e., on the rear surface side of the cabinet 3, so that the loading arm 51 is rotated in the direction of the arrow $a_1$ of FIG. 11. The second guide portion 66b is formed to be substantially parallel to the movement direction of the loading cam plate 53, and restricts the rotation of the loading arm 51 rotated by the first guide portion 66a in the direction of the arrow $a_1$, the direction of retracting the optical disk 2, so that the optical disk 2 is centered. The third guide portion 66c is bent toward the inner radius of the cabinet 3 than the second guide portion 66b, and guides the engagement convex section 64 to move the loading arm 51 away from the side surface of the optical disk 2 loaded to the disk loading section 23, thereby enabling the optical disk 2 to rotate. The fourth guide portion 66d is used to guide the rotation guide section 215 of the restriction arm 212, and rotates the restriction arm 212 in response to the sliding movement of the loading cam plate so that the biasing force of the deck arm 200 (will be described later) is controlled.

Figure 14:
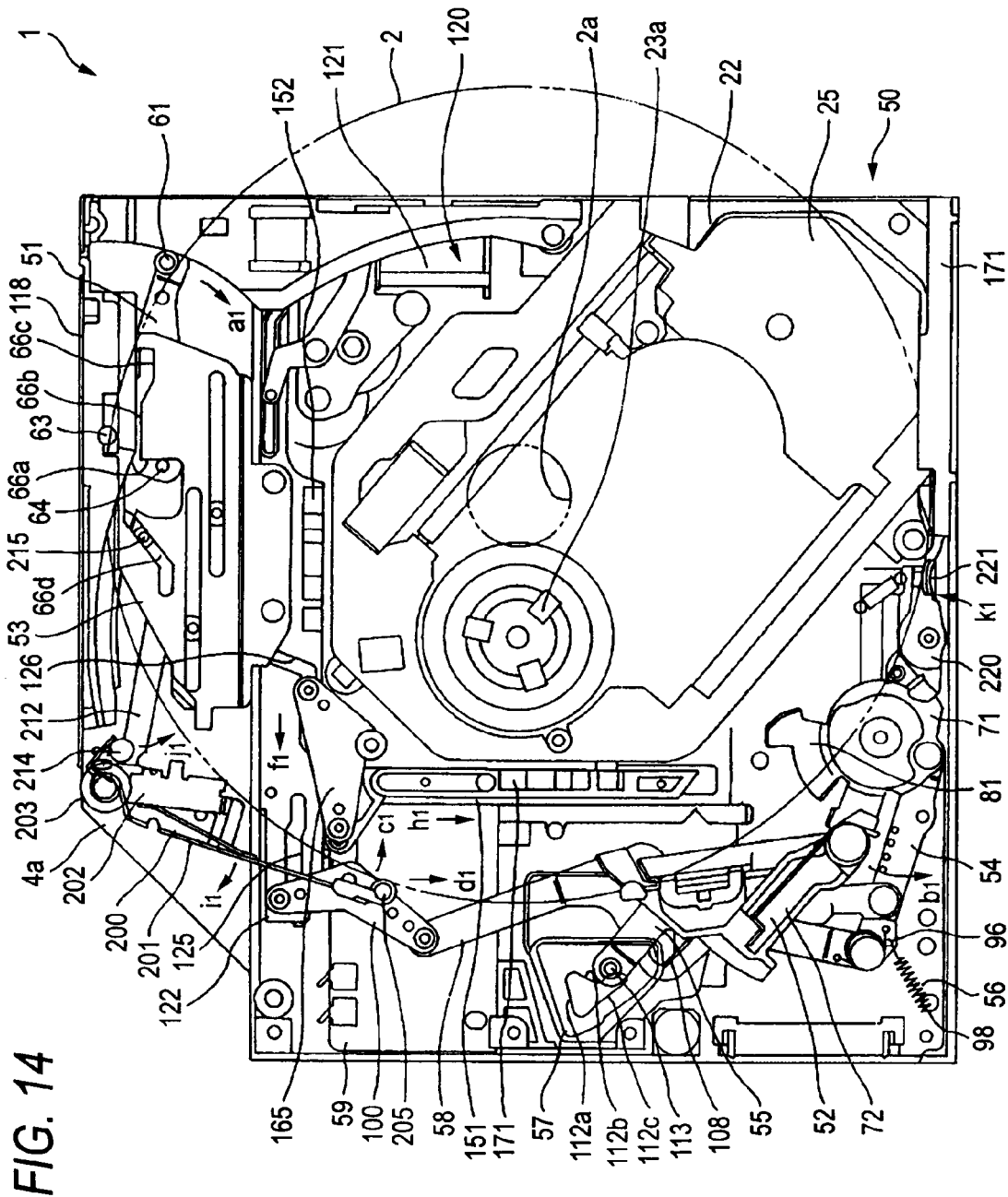
FIG. 14 is a plan view of the disk drive apparatus being in operation of retracting the optical disk.

When the first cam groove 66 is on standby for insertion of the optical disk 2, as shown in FIG. 11, the first guide portion 66a and the engagement convex section 64 are moved away from each other, and the engagement convex section 64 of the loading arm 51 being biased by the leaf spring 62 to rotate in the direction of the arrow $a_1$ is abutted against the side surface opposing the first guide portion 66a. This enables the loading cam plate 53 to position the loading arm 51 in the state of standby for insertion of the optical disk 2. When the optical disk 2 is inserted into the cabinet 3, and when the loading cam plate 53 is moved by the slider 122 to the rear surface side of the cabinet 3, as shown in FIG. 14, the engagement convex section 64 is abutted against the first guide portion 66a, and the first cam groove 66 rotates the loading arm 51 in the direction of the arrow $a_1$ of FIG. 14, i.e., the direction of retracting the optical disk 2.

Figure 15:
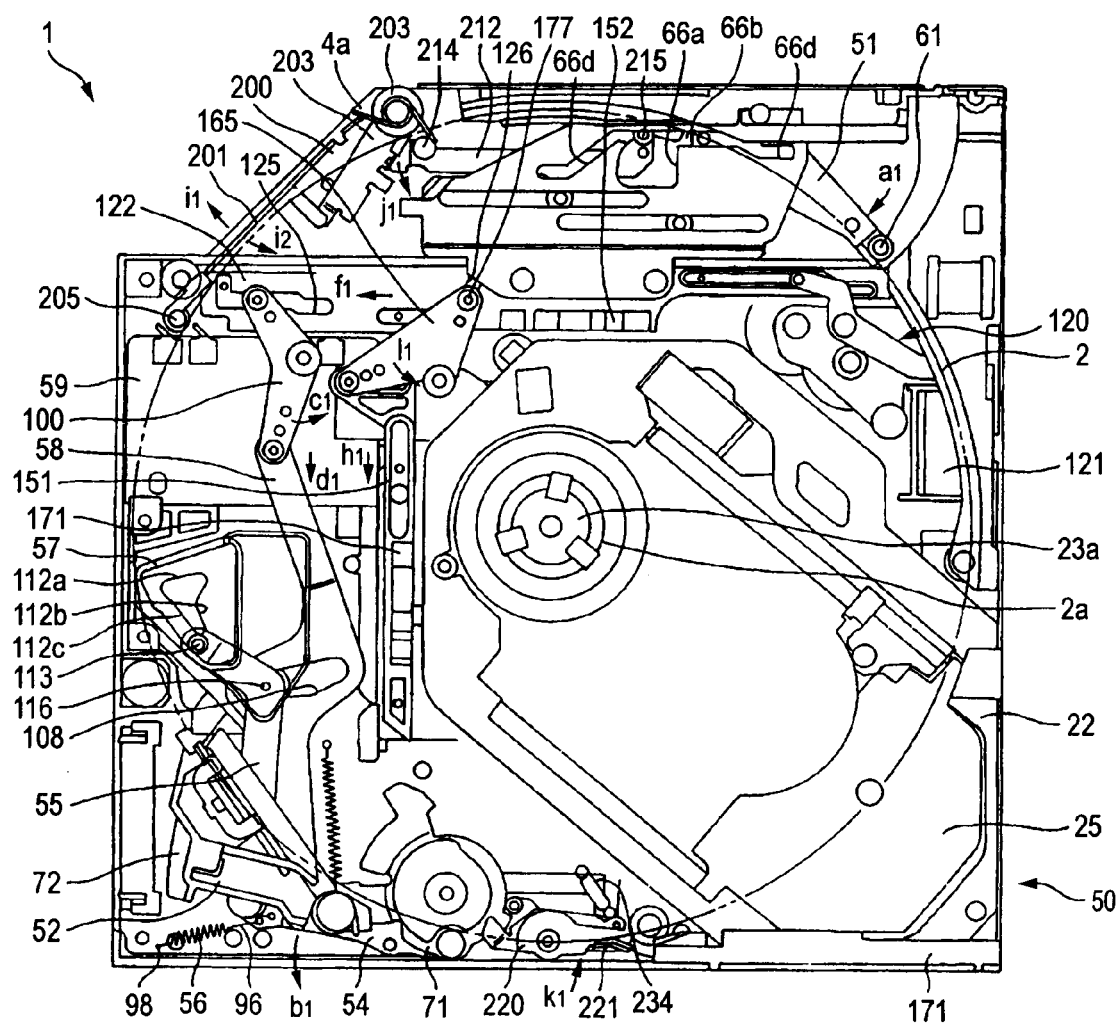
FIG. 15 is a plan view of the disk drive apparatus through with retraction of the optical disk to a centering position.
Figure 16:
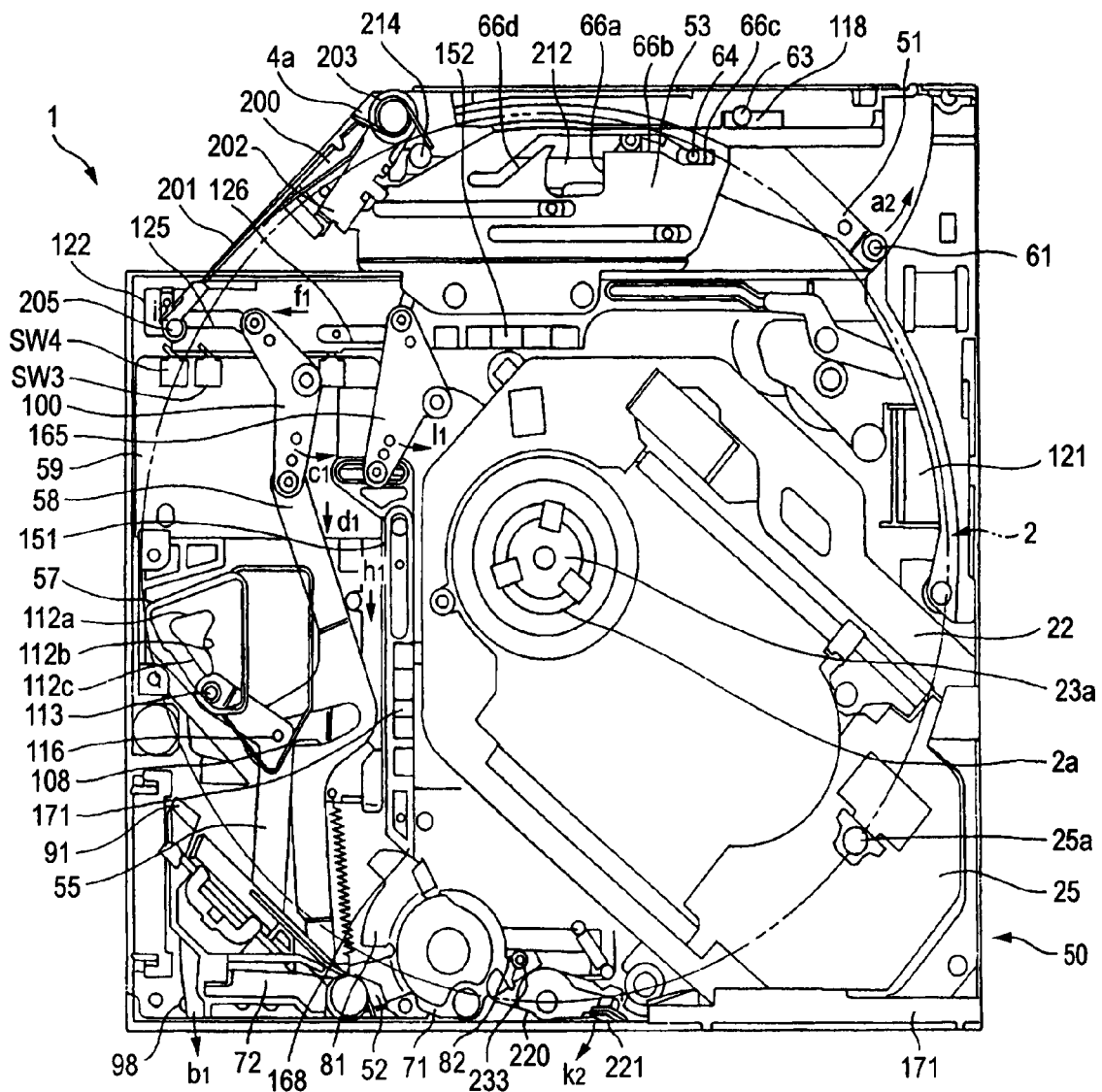
FIG. 16 is a plan view of the disk drive apparatus being in operation of recording/reproduction to/from the optical disk.

In the first cam groove 66, when the optical disk 2 is transferred to the position at which the center hole 2a is positioned above the turntable 23a of the disk loading section 23, as shown in FIG. 15, the engagement convex section 64 enters the second guide portion 66b. At the second guide portion 66b, the relative angle remains the same between the engagement convex section 64 and the insertion hole 60. Therefore, the abutting section 61 is not rotated in the direction of the arrow $a_1$ so that the loading arm 51 supports the optical disk 2 at the centering position. Thereafter, when the optical disk 2 is through with chucking, as shown in FIG. 16, the engagement convex section 64 is guided by the third guide portion 66c, and the first cam groove 66 rotates the loading arm 51 in the direction of the arrow $a_2$ of FIG. 16, i.e., the direction of moving away from the optical disk 2.

When the loading cam plate 53 is moved to the rear surface side of the cabinet 3, the first cam groove 66 is moved to swing by the rotation guide section 215 of the restriction arm 212 being guided by the fourth guide portion 66d. Such swinging movement moves a spring latch section 214 at which an end 203b of the coil spring 203 biasing the deck arm 200 to rotate is latched, and prevents the increase of the biasing force as the optical disk 2 enters deeper in the cabinet 3.

Figure 17:
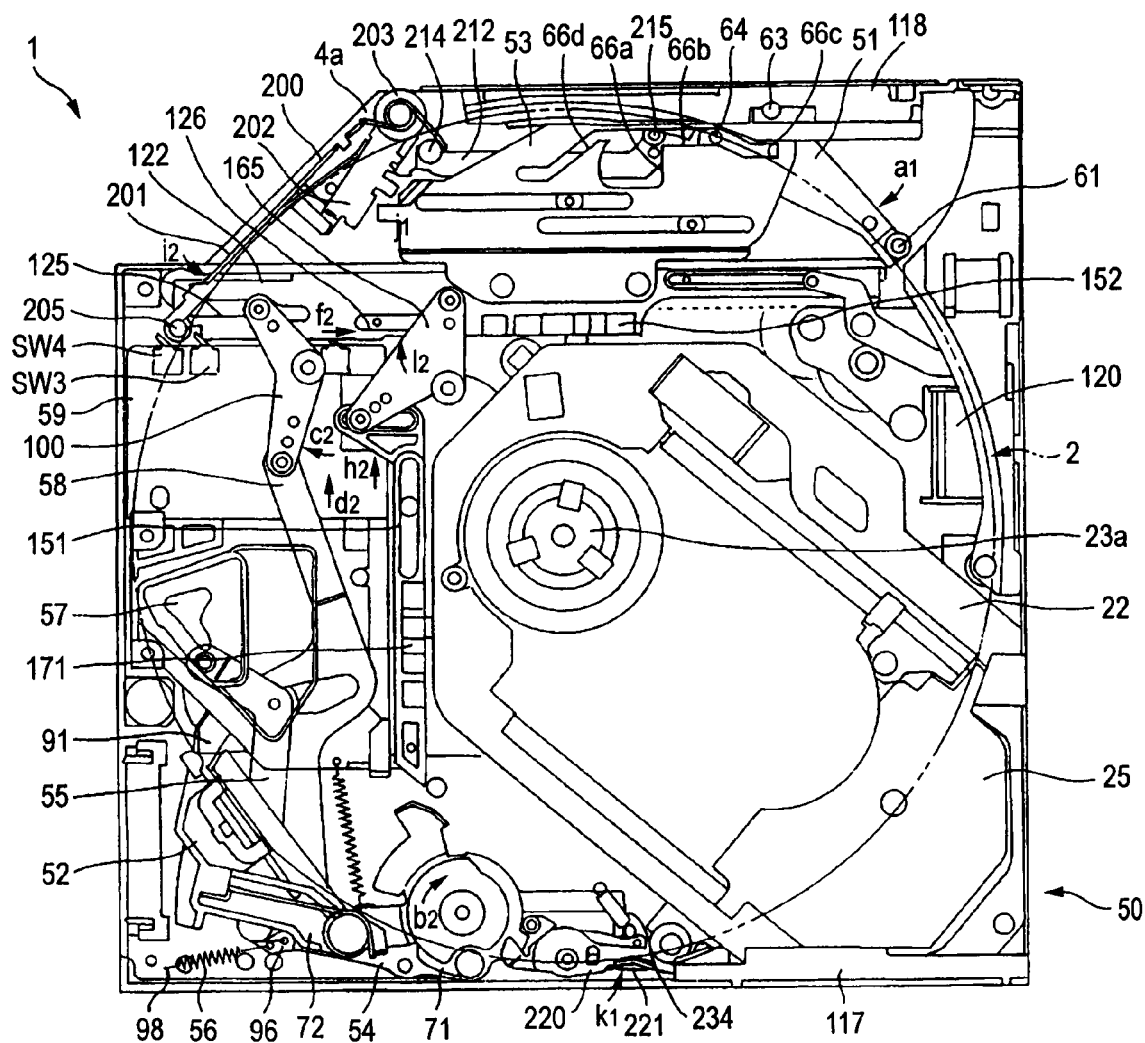
FIG. 17 is a plan view of the disk drive apparatus supporting the disk on the side surface using various types of arms in an optical disk ejection process.

For ejection of the optical disk 2, when the loading cam plate 53 is moved in the direction of an arrow $f_2$ in response to the movement of the slider 122 in the same direction, i.e., to the front surface side, as shown in FIG. 17, the engagement convex section 64 moves from the third guide portion 66c to the second guide portion 66b. This accordingly rotates the loading arm 51 in the direction of the arrow $a_1$ of FIG. 17, i.e., the direction of loading the optical disk 2, and the abutting section 61 is abutted against the side surface of the optical disk 2 from the front surface side.

Figure 18:
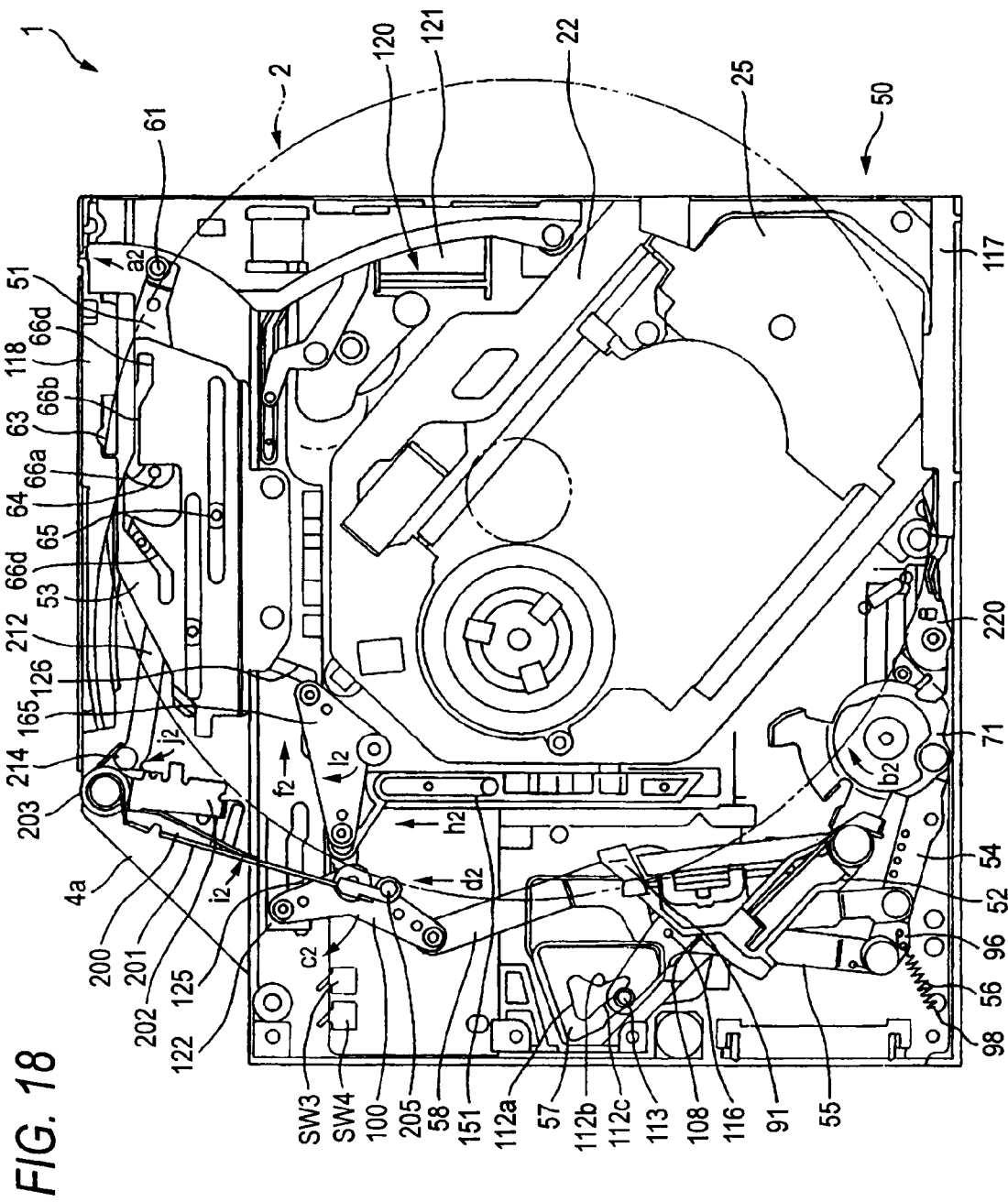
FIG. 18 is a plan view of the disk drive apparatus ejecting the optical disk.

When the loading cam plate 53 is moved in the direction of the arrow $f_2$, and when the engagement convex section 64 is moved from the second guide portion 66b to the first guide portion 66a, as shown in FIG. 18, the abutting section 61 of the loading arm 51 is allowed to move in the direction of the arrow $a_2$ as the first guide portion 66a is moved in the direction of the arrow $f_2$. The ejection arm 52 is rotated in the direction of an arrow $b_2$, i.e., the direction of ejecting the optical disk 2, in response to the driving force of the drive mechanism 120. As such, the loading arm 51 is rotated in the direction of the arrow $a_2$ by being pressed by the optical disk 2 on the way to the ejection direction.

At this time, the loading arm 51 is rotated while being biased by the leaf spring 62 in the direction of the arrow $a_1$, i.e., the direction of inserting the optical disk 2. With such rotation, for ejection of the optical disk 2, the disk transfer mechanism 50 pushes the optical disk 2 to any predetermined ejection position while gripping the optical disk 2 using the loading arm 51 and the ejection arm 52 so that the loading arm 51 prevents the optical disk 2 from being abruptly ejected.

Note that, when ejection of the optical disk 2 is complete, as shown in FIG. 11, the engagement convex section 64 is latched at the side surface opposing the first guide portion 66a of the first cam groove 66 of the loading cam plate 53 so that the rotation of the loading arm 51 is restricted in the direction of the arrow $a_1$, and is put in the state of standby for insertion of the optical disk 2.

The second cam groove 67 is inserted into the guide convex section 65 being a protrusion from the deck portion 4a, thereby guiding the movement of the loading cam plate 53. The second can groove 67 is formed linear to be parallel to the movement direction of the slider 122, and in response to the sliding movement of the guide convex section 65 with the movement of the slider 122, guides the loading cam plate 53 in the movement direction of the slider 122.

A pair of engagement protrusions 68 and 68 to be engaged with the slider 122 are formed to one side surface side of the loading cam plate 53 with a space therebetween. These engagement protrusions 68 and 68 are both protruded downward, and are bulged to the side of the bottom surface portion of the bottom case 4, thereby engaged with engagement concave sections 127 and 127 of the slider 122 disposed along the side surface of the bottom case 4. Through such engagement, the loading cam plate 53 and the slider 122 become a piece, and the loading cam plate 53 is also moved to slide with the movement of the slider 122.

Note here that the loading cam plate 53 is prevented from being isolated, upward, from the deck portion 4a by the side surface opposite to the side surface formed with such engagement protrusions 68 and 68 is inserted, to be able to freely slide, into the clearance formed between a right guide wall 118 and the deck portion 4a.

The third cam groove 69 is provided upright on the deck portion 4a, and is inserted into the rotation support pin 217, which supports the restriction arm 212 to be able to rotate against the deck portion 4a. Similarly to the second cam groove 67 described above, the third cam groove 69 is formed linear to be parallel to the movement direction of the slider 122, and guides the loading cam plate 53 in the movement direction of the slider 122 by being moved to slide against the rotation support pin 217 with the movement of the slider 122.

The ejection arm 52 serving to eject the optical disk 2 from the disk loading section 23 to the outside of the disk insertion/removal port 19 is disposed to the side surface opposite to the side surface formed with the loading arm 51, and to the rear surface side closer to the cabinet 3 than the disk loading section 23. While being operated by the first and second link arms 54 and 55 and the operation arm 58 that will be described later, the ejection arm 52 is rotated in the direction of the arrow $b_1$ of FIG. 11, i.e., the direction of transferring the optical disk 2 to the side of the disk loading section 23, and the direction of the arrow $b_2$ of FIG. 11, i.e., the direction of ejecting the optical disk 2 to the side of the disk insertion/removal port 19. As shown in FIGS. 23 and 24, this ejection arm 52 is provided with the rotation support member 71 that is rotatably supported by the main chassis 6, a push-out arm 72 that is rotatably engaged to the rotation support member 71 and pushes out the optical disk 2, and a coil spring 73 that biases the push-out arm 72 in the direction of ejecting the optical disk 2.

The rotation support member 71 is a sheet metal shaped substantially like a circle, and is rotatably attached to the upper surface 6a of the main chassis 6 from the side opposite to the disk transfer area of the upper surface 6a. At substantially the center of a main surface 71a of the rotation support member 71, a mounting port 71b is drilled for mounting to the main chassis 6. The rotation support member 71 is rotatably mounted to the main chassis 6 via a spacer 75 provided therebetween.

The rotation support member 71 is formed with an engagement piece 76 for engagement with the push-out arm 72 and the coil spring 73. The engagement piece 76 is formed by bending the tip end of an upright wall 76a being a part of the main surface 71a, and thus is located above the main surface 11a and protruding closer to the side of the upper surface 6a than the ejection arm aperture portion 6d of the main chassis 6. This engagement piece 76 is formed with an aperture section 77, a pair of rotation restriction walls 78 and 78, and an engagement concave section 79. The aperture section 77 is sequentially formed to an engagement convex section 85 of the push-out arm 72, and is rotatably crimped there together by a crimp shaft 89. The rotation restriction walls 78 and 78 restrict the rotation area of the push-out arm 72 by being abutted by the side surface portion of the push-out arm 72. At the engagement concave section 79, one of two arms, i.e., arm 73*b*, of the coil spring 73 is latched. The rotation restriction walls 78 and 78 are formed to stand from right and left sides of the engagement piece 76, respectively, and therebetween, a restriction protrusion section 87 formed to the push-out arm 72 is disposed so that the rotation area of the push-out arm 72 is restricted.

The rotation support member 71 is also formed, on the main surface 71*a*, with the engagement hole 80 for engagement with the first link arm 54 (will be described later) to be able to freely rotate. The engagement hole 80 is linked to an insertion hole formed at one end 54*a* of the first link arm 54, and is rotatably coupled to the first link arm 54 by a screw 74.

The rotation support member 71 is formed with a bending piece 81 at one side surface portion of the main surface 71*a*. The bending piece 81 is bent downward from the main surface 71*a* to be abutted as an abutting piece to the sub slider 151 of the base moving mechanism 150 that will be described later. In response to the insertion of the optical disk 2, when rotated in the direction of the arrow $b_1$ of FIG. 11, i.e., the direction of transferring the inserted optical disk 2 to the side of the disk loading section 23, the bending piece 81 depresses a first switch SW1 equipped to the circuit board 59. This enables the disk drive apparatus 1 to detect that the ejection arm 52 is pushed by the optical disk 2, and is rotated to the rear surface side of the cabinet 3, thereby detecting the timing of driving the drive mechanism 120.

The rotation support member 71 is also provided with a rotation piece 82, which serves to rotate the centering guide 220 (will be described later) to move it away from the side surface of the optical disk 2 being in the disk loading section 23. After reaching the centering position at which the optical disk 2 can be loaded to the disk loading section 23, the rotation piece 82 is made to abut against a cam axis 233 of the centering guide 220 as the rotation support member 71 is rotated. The rotation piece 82 thus rotates the centering guide 220 in the direction of moving away from the optical disk 2, and allows the optical disk 2 to freely rotate.

The push-out arm 72 that is rotatably engaged with the engagement piece 76 is a resin-made member shaped substantially like a triangle, and includes the engagement convex section 85, a latch wall 86, and the support section 88. To the engagement convex section 85, the aperture section 77 of the engagement piece 76 is inserted for engagement. At the latch wall 86, one of the arms, i.e., the arm 73*c*, of the coil spring 73 is latched. The support section 88 serves to support the side surface of the optical disk 2, i.e., the side of an insertion end. The engagement convex section 85 is a hollow cylindrical body formed at one vertex of the substantial triangle. The hollow portion of the engagement convex section 85 is linked to the aperture section 77 drilled to the engagement piece 76 of the rotation support member 71, is inserted into a cylindrical portion 73*a* of the coil spring 73, and is crimped by the crimp shaft 89 with the engagement piece 76. This accordingly allows the push-out arm 72 to freely rotate about the engagement convex section 85 on the engagement piece 76.

The coil spring 73 to be engaged with the engagement piece 76 with the push-out arm 72 by the crimp shaft 89 biases the push-out arm 72 to rotate about the engagement convex section 85 in the direction of ejecting the optical disk 2. The push-out arm 72 is currently supported by the engagement piece 76 to be able to freely rotate. Such bias is applied by the cylindrical portion 73*a* being inserted through the engagement convex section 85, by the arm 73*b* being latched by the latch concave section 79 formed to the engagement piece 76, and by the arm 73*c* being latched by the latch wall 86 formed to the push-out arm 72.

The push-out arm 72 is formed with the restriction protrusion section 87 in the vicinity of the engagement convex section 85 for use to define the rotation area on the engagement piece 76. The restriction protrusion section 87 is disposed between the rotation restriction walls 78 and 78 provided upright on the engagement piece 76, and when the push-out arm 72 is rotated on the engagement piece 76, moves back and forth between the rotation restriction walls 78. As such, the rotation of the push-out arm 72 is restricted by the restriction protrusion section 87 being abutted against one of the rotation restriction walls 78 so that the rotation area is defined on the engagement piece 76.

Figure 25:
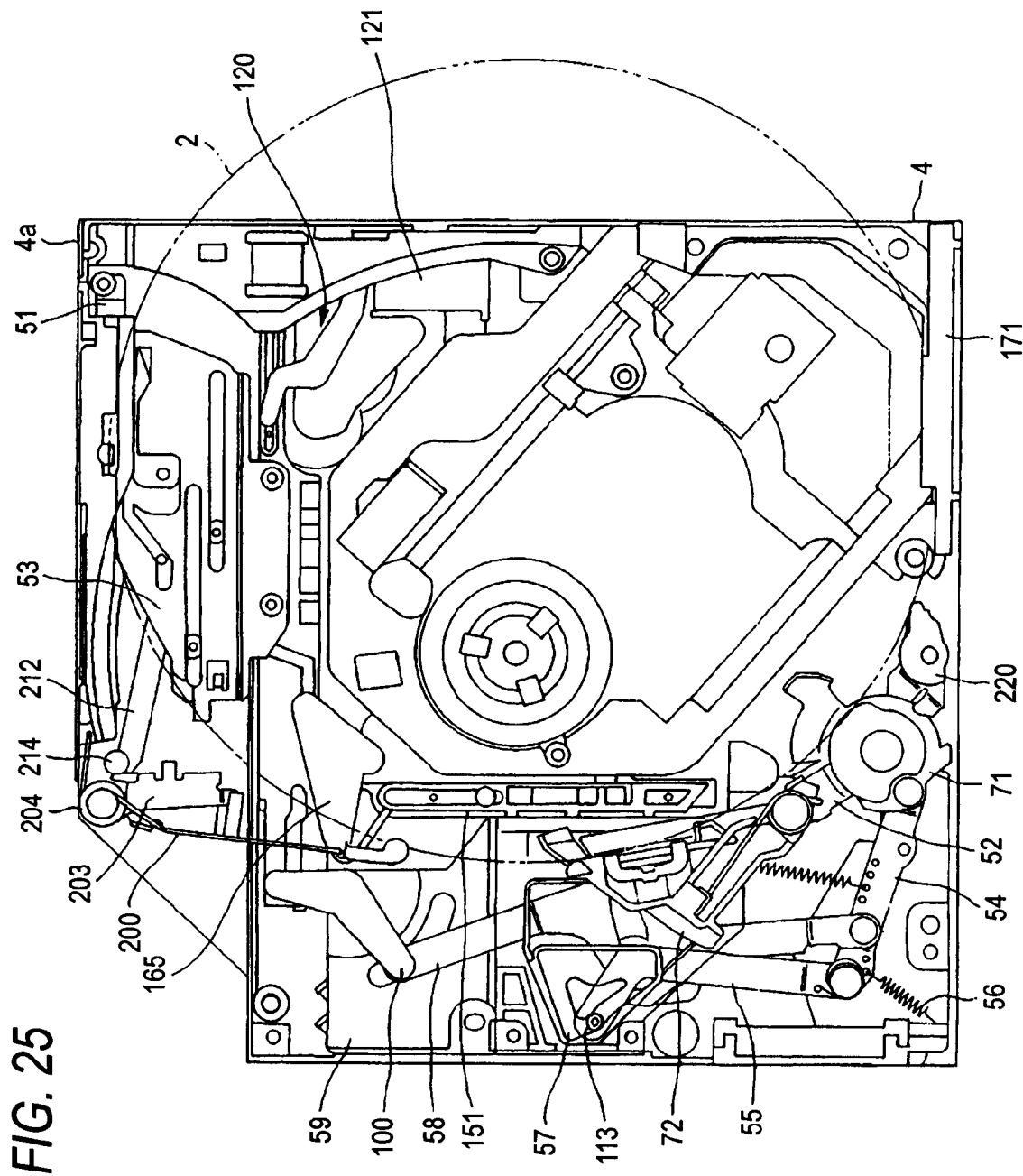
FIG. 25 is a plan view for illustrating the operation of the ejection arm in a process of ejecting the disk when there is any obstacle on a disk transfer area.

Such a push-out arm 72 is rotatably engaged with the rotation support member 71, and is biased by any predetermined spring force of the coil spring 73 to rotate to the side of the disk insertion/removal port 19. As such, considered is a case where the ejection arm 52 is operated by the first link arm 54 and the operation arm 58 receiving the driving force of the drive mechanism 120 (will be described later) to rotate in the direction of the arrow $b_2$ of FIG. 25, i.e., the direction of ejecting the optical disk 2 to the outside of the cabinet 3. In such a case, even if some force acts in the direction of the arrow $b_1$, e.g., there is an obstacle on the transfer area of the optical disk 2, against the biasing force of the coil spring 73, the push-out arm 72 receiving the force of the direction opposite to the direction of ejecting the optical disk 2 is rotated in the direction of the arrow $b_1$ about the aperture section 77 of the rotation support member 71. As such, the driving force of rotating the ejection arm 52 in the direction of the arrow $b_2$ does not oppose any force acting in the direction opposite thereto. Accordingly, to rotate the ejection arm 52 in the direction of the arrow $b_2$ of FIG. 25, no extra load is imposed on the motor or others of the drive mechanism 120 that drives the first link arm 54 and the operation arm 58. Moreover, the optical disk 2 is protected from damage by being gripped by the biasing force of the ejection arm 52 in the ejection direction and the force acting in the direction opposite thereto.

As shown in FIGS. 23 and 24, the push-out arm 72 is provided with, at the tip end portion, the lift section 90 for preventing the optical disk 2 from descending toward the side of the bottom case 4. The lift section 90 includes a lift arm 91 for supporting the optical disk 2 from below, and a press member 92 for pressing the lift arm 91 to enable catching of the optical disk 2.

The lift arm 91 includes a rod-shaped axis portion 91*a*, a support piece 91*b*, an abutting piece 91*c*, and a slide piece 91*d*. The support piece 91*b* is provided at one end side of the axis portion 91*a* for supporting the optical disk 2. The abutting piece 91*c* is provided upright in the vicinity of the support piece 91*b*, and is abutted against the outer surface of the optical disk 2 inserted into the cabinet 3. The slide piece 91*d* is provided at the other end of the axis portion 91*a*, is moved to slide over the upper surface 6*a* of the main chassis 6 as the ejection arm 52 is rotated, and rotates the axis portion 91*a* in the direction of moving upward the support piece 91*b*.

The axis portion 91*a* is shaped substantially like a cylinder, and from one end portion, the support piece 91*b* and the abutting piece 91*c* are protruded, and from the other end, the slide piece 91*d* is protruded. The axis portion 91*a* is rotatably supported by a bearing section 94 formed to the push-out arm 72. The support piece 91*b* supports, at the outer regions on the insertion end side, the optical disk 2 inserted with a tilt toward the side of the bottom case 4, thereby preventing a collision between the optical disk 2 and the optical pickup 25 or others, and bringing the optical disk 2 back to its normal transfer area. The support portion 91*b* is shaped substantially like a rectangular plate, and is reduced in thickness and sloped toward the tip end side in the longitudinal direction. When abutted against the outer surface of the optical disk 2, the abutting piece 91*c* is supported by a support wall 99 provided upright on the push-out arm 72 so that the rotation of the axis portion 91*a* is restricted. The abutting piece 91*c* is provided upright and substantially orthogonal, from the axis portion 91*a*, to the direction along which the support piece 91*b* is disposed. When the abutting piece 91*c* is supported by the support wall 99, the support piece 91*b* is rotated above the normal transfer area of the optical disk 2. The slide piece 91*d* is protruded from the axis portion 91*a*, thereby being visible from an aperture 95 on the lower surface side of the push-out arm 72. The aperture 95 is the one drilled to the push-out arm 72. The slide piece 91*d* is moved to slide on the upper surface of the main chassis 6, thereby rotating, for retention, the support piece 91*b* to the normal transfer area of the optical disk 2.

The axis portion 91*a* is formed with pressing sections 93 and 93 to be pressed by the press member 92. The pressing sections 93 and 93 are each made flat with the axis portion 91*a* shaped to have a substantially D-shaped cross section, and to be pressed by the plate-like press member 92. The press member 92 for pressing the pressing sections 93 and 93 is a leaf spring member shaped substantially like a square bracket, and is attached to the push-out arm 72, thereby biasing the axis portion 91*a* to rotate in such a manner that the support piece 91*b* of the lift arm 91 is always tilted downward. At this time, the press member 92 presses the flat portions of the pressing sections 93 and 93 each shaped to have a substantially D-shaped cross section, thereby being able to bias the lift arm 91 to rotate in such a manner that the support piece 91*b* is directed downward without fail. As a result, the slide piece 91*d* of the lift arm 91 is protruded from the aperture 95 formed to the push-out arm 72 on the lower surface side of the push-out arm 72, and when the push-out arm 72 is rotated to the rear surface side of the cabinet 3, is allowed to come in contact with the edge section 17 of the main chassis 6.

In such a lift arm 91, when on standby for insertion of the optical disk 2, because the ejection arm 52 is rotated to the front surface side of the cabinet 3, the slide piece 91*d* is moved away from the edge section 17 of the main chassis 6. When the axis portion 91*a* is biased by the press member 92, the support piece 91*b* is tilted downward. When the optical disk 2 is inserted, the abutting piece 91*c* is abutted against the outer surface of the optical disk so that the axis portion 91*a* is rotated against the biasing force of the press member 92, and the support piece 91*b* is moved upward to the side of the top cover 5. As a result, the lift arm 91 is rotated to the rear surface side of the cabinet 3 while the support piece 91*b* supporting the lower surface side of the optical disk 2. Thereafter, when the push-out arm 72 is rotated above the upper surface of the main chassis 6, in the lift arm 91, the support piece 91*b* remains on the side of the top cover 5 after being moved upward. This is because the slide piece 91*d* being visible from the aperture 95 toward below the push-out arm 72 is moved to slide in contact over the upper surface 6*a* from the edge section 17 of the main chassis 6. As such, after the optical disk 2 is transferred to the disk loading section 23, even if the push-out arm 72 is moved away from the optical disk 2, the biasing force of the press member 92 rotates the support piece 91*b* to the side of the bottom case 4, whereby no sliding movement is observed over the upper surface of the main chassis 6.

When the insertion end of the optical disk 2 is inserted with a tilt toward the side of the bottom case 4, the outer surface of the optical disk 2 at the insertion end is supported by the support piece 91*b* having been rotated to the side of the bottom case 4 in the state of standby. This accordingly prevents the optical disk 2 from colliding with the components disposed on the side of the bottom case 4, e.g., the turntable 23*a* and the optical pickup 25.

When the optical disk 2 is inserted with a tilt, the ejection arm 52 and the push-out arm 72 are rotated in the direction of the arrow $b_1$. In response to the rotation of the arms, in the lift arm 91, the slide piece 91*d* is made to slide in contact with the edge section 17 of the main chassis 6 so that the axis portion 91*a* is rotated against the biasing force of the press member 92, and the support piece 91*b* is rotated to the side of the top cover 5. Note here that the rotation area for the support piece 91*b* is restricted by the abutting piece 91*c* provided to the axis portion 91*a* being supported by the support wall 99 provided upright on the push-out arm 72. When the support piece 91*b* is rotated, the outer regions of the optical disk 2 are abutted against the abutting piece 91*c*. This allows the lift arm 91 to bring, back to the normal transfer area, the optical disk 2 inserted to the side of the bottom case 4 with a tilt.

Note that, from the push-out arm 72, a grip piece 88 is protruded, in the vicinity of the support piece 91*b* of the lift arm 91, for gripping the outer regions of the optical disk 2 with the support piece 91*b*. The grip piece 88 is provided to extend from the tip end of an upright wall in the same direction as the support piece 91*b*. The upright wall is being upright from the main surface of the push-out arm 72. The push-out arm 72 receives the optical disk 2 at the side surface on the insertion end by the abutting piece 91*c* and the upright wall of the grip piece 88, and grips the optical disk 2 at the insertion end side by the grip piece 88 and the support piece 91*b*. As such, the push-out arm 72 is rotated to the rear surface side of the cabinet 3 for insertion and retraction of the optical disk 2, and for ejection thereof, pushes the optical disk 2 to the front surface side of the cabinet 3.

The distance from the grip piece 88 to the support piece 91*b* rotated onto the normal transfer area is so set as to be slightly larger than the thickness of the optical disk 2, and the optical disk 2 is not firmly gripped thereby. As such, the ejection arm 52 prevents the optical disk 2 from tilting using the grip piece 88 and the support piece 91*b* with the rotation in the directions of the arrows $b_1$ and $b_2$. The ejection arm 52 also can smoothly release the optical disk 2, and grip the disk when it is ejected.

Alternatively, the push-out arm and the lift section related to the ejection arm 52 may be formed as below.

Figure 26:
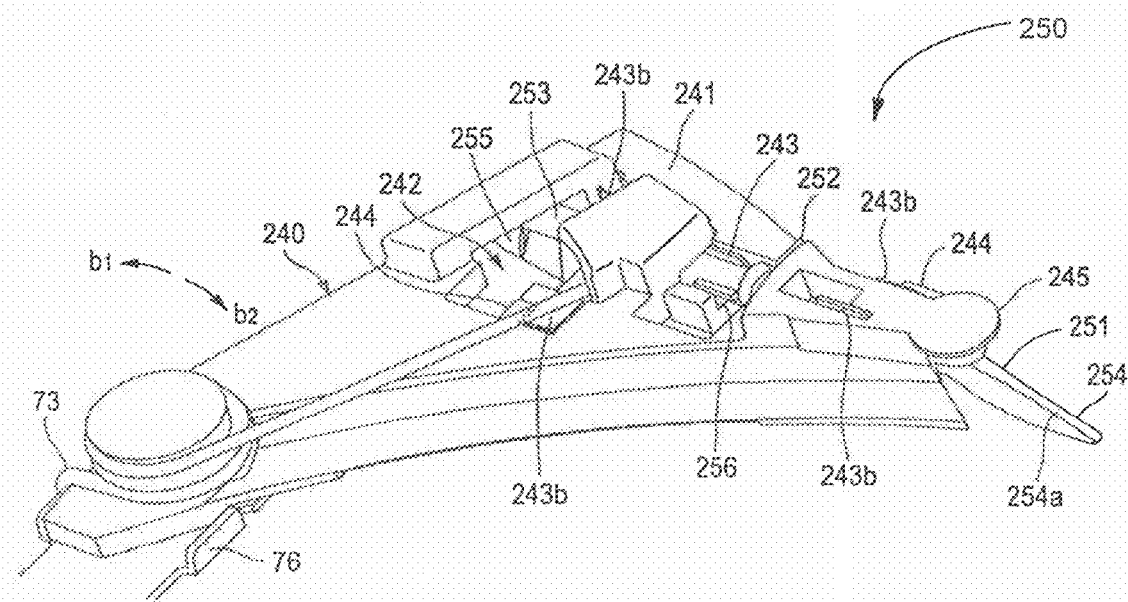
FIG. 26 is a perspective view of another ejection arm.
Figure 27:
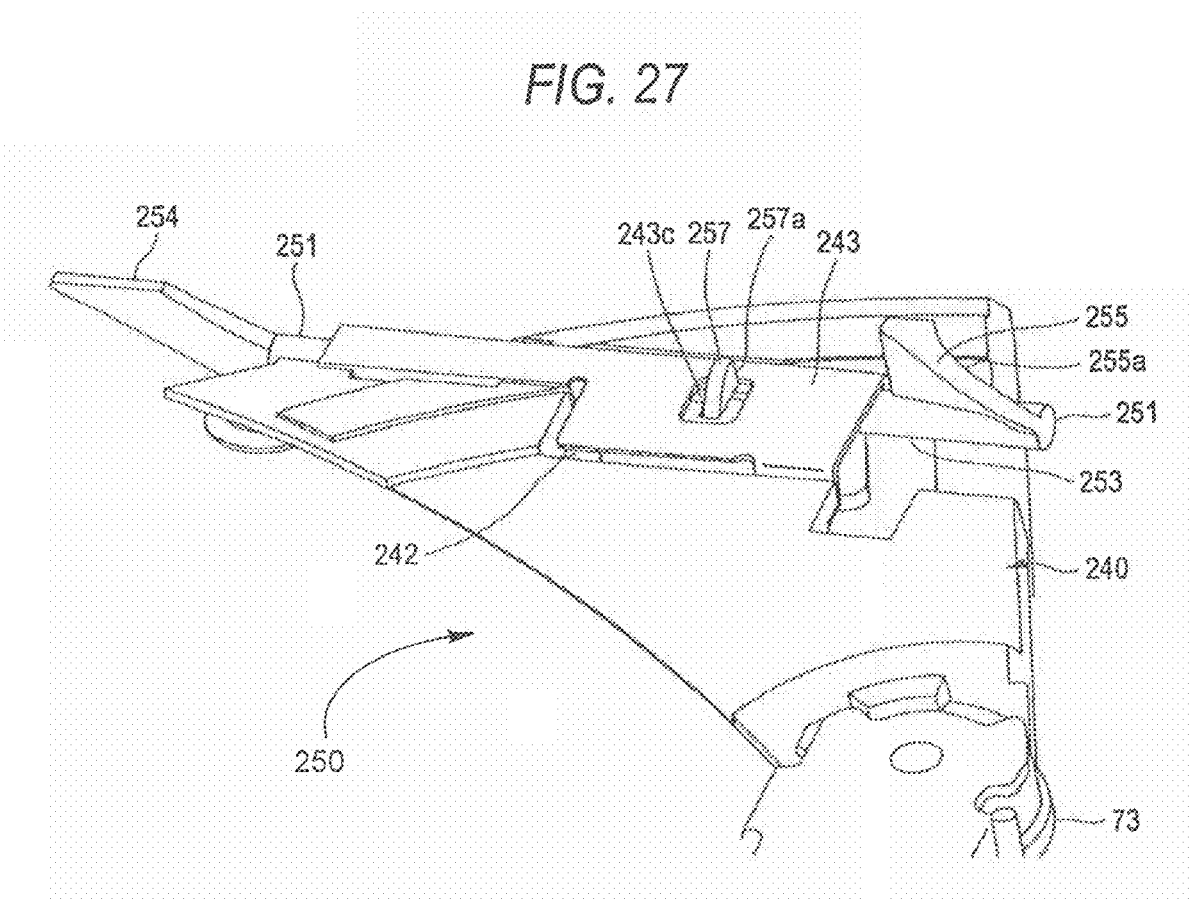
FIG. 27 is a perspective view of the ejection arm of FIG. 26 viewed from the back surface side.

As shown in FIGS. 26 and 27, similarly to the push-out arm 72 attached to the ejection arm 52, this second push-out arm 240 is rotatably attached to the aperture section 77 and is biased by the coil spring 73 to rotate in the direction of the arrow $b_2$ of FIG. 26, i.e., the direction of ejecting the optical disk 2. The aperture section 77 is the one drilled to the engagement piece 76 of the rotation support member 71. The second push-out arm 240 is a resin-made member shaped substantially like a triangle, and is formed with a lift support section 241 and a grip piece 245. The lift support section 241 is provided with a second lift section 250 on the side opposite to the vertex portion supported by the engagement piece 76. The grip piece 245 serves to grip the optical disk 2 at the side surface on the insertion end with the lift arm 251 of the second lift section 250.

The lift support section 241 is provided with a housing concave section 242 for rotatably housing therein the lift arm 251, and a latch section 244 at which a support plate 243 is latched. The support plate 243 is the one supporting the lift arm 251 to the housing concave section 242. The housing concave section 242 is disposed along one side of the second push-out arm 240 in accordance with the rod-shaped lift arm 251, and supports, in an intermittent manner, the upper portion of the lift arm 251 along the longitudinal direction. When a plurality of latch pieces 243b formed to the support plate 243 are latched, the latch section 244 makes the support plate 243 latch the lift support section 241 from the back surface side of the housing concave section 242.

Figure 28:
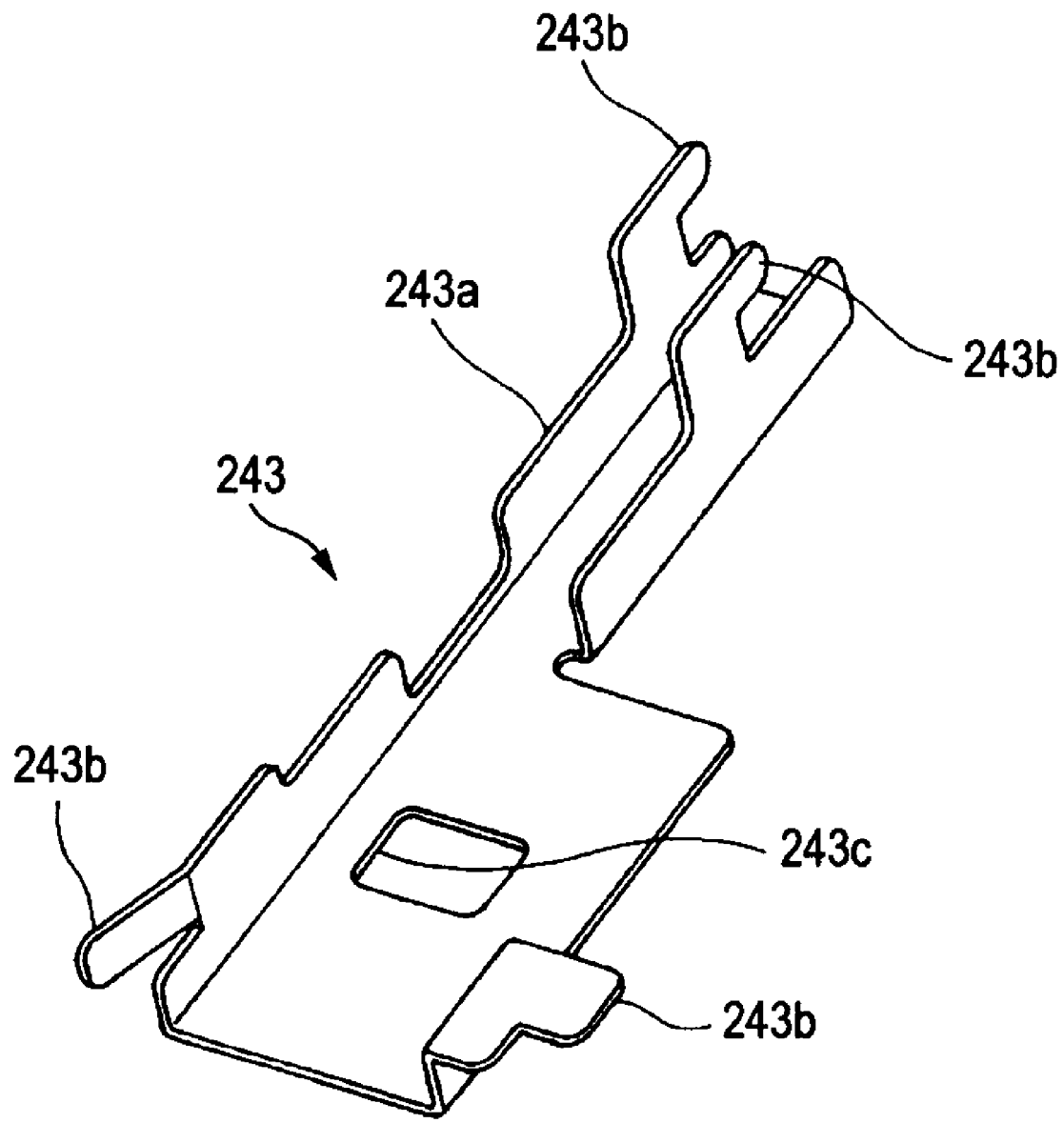
FIG. 28 is a perspective view of a support plate for use with the ejection arm of FIG. 26.

The support plate 243 serves to rotatably support the lift arm 251 to the lift support section 241 by being latched by the lift support section 241 from the back surface side of the second push-out arm 240. As shown in FIG. 28, this support plate 243 is provided with a housing portion 243a, and a plurality of latch pieces 243b. The housing portion 243a is formed by shaping a metal plate to look substantially like a square bracket, and houses therein the lift arm 251. The latch pieces 243b are latched to a plurality of latch sections 244 provided to the lift support section 241. The housing portion 243a houses therein the lift arm 251, and the latch pieces 243b are latched by the latch sections 244 so that the support plate 243 is prevented from coming off from the lift support section 241. To the support plate 243, a latch hole 243c is drilled for restricting the rotation area for the lift arm 251. This latch hole 243c is inserted with a latch protrusion section 257 being a protrusion of the lift arm 251, and when a latch surface 257a of the latch protrusion section 257 is latched, the rotation area can be defied for the support section 254 of the lift arm 251.

Similarly to the grip piece 88 of the above-described push-out arm 72, the grip piece 245 serves to grip the optical disk 2 at the outer regions with the lift arm 251. The grip piece 245 is formed to bulge in the direction same as the support section 254 of the lift arm 251 from the tip end of an upright wall provided upright on the main surface of the second push-out arm 240.

As shown in FIGS. 26 and 27, the second lift section 250 is provided with the lift arm 251, and a coil spring 252 for biasing the lift arm 251 to rotate. The lift arm 251 serves to support the outer regions of the optical disk 2 inserted with a tilt, and guides the optical disk 2 to the normal transfer area while protecting the optical disk 2 from collision with the optical pickup 25 and others. As shown in (a) to (c) of FIG. 29, the second lift section 250 is provided with an arm body 253 shaped like a cylinder, the support section 254, a slide section 255, a spring latch section 256, and the latch protrusion section 257. The support section 254 is formed at the tip end of the arm body 253 for supporting the optical disk 2 at the outer regions. The slide section 255 is formed at the rear end of the arm body 253, and rotates the arm body 253 by sliding over the upper surface 6a of the main chassis 6. The spring latch section 256 is protruded from the outer regions of the arm body 253 for latching by an end of the coil spring 252. The latch protrusion section 257 is protruded from the outer regions of the arm body 253 for insertion through the latch hole 243c of the support plate 243.

The arm body 253 is housed in the housing concave section 242 provided to the second push-out arm 240, and is rotatably retained by the housing portion 243a of the support plate 243. From the outer regions of this arm body 253, the spring latch section 256 and the latch protrusion section 257 are protruded.

Figure 29A:
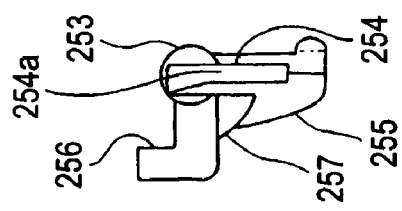
FIG. 29 is a diagram of a lift arm in a second lift section.
Figure 29B:
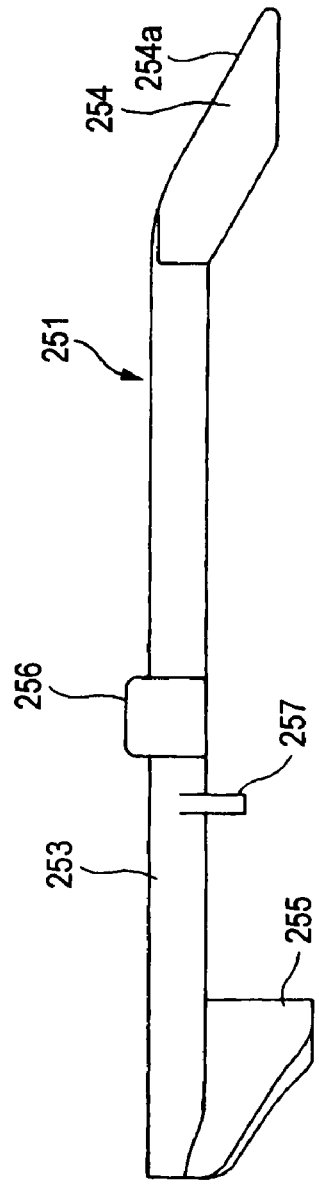
Figure 29C:
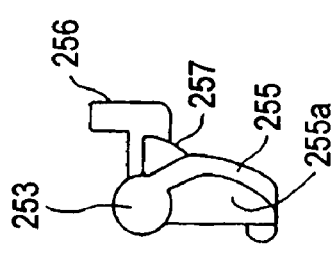

The support section 254 formed at the tip end of the arm body 253 is formed like a flat plate in its entirety, and as shown in (a) of FIG. 29, forms an acute angle toward the tip end when viewed from the side. When on standby for insertion of the optical disk 2, the support section 254 supports a main surface 254a by making it upright substantially orthogonal to the main surface of the optical disk 2. At this time, when the main surface 254a is tilted toward the side of the bottom case 4, and when the optical disk 2 is inserted with a tilt toward the side of the bottom case 4, the support section 254 can support the optical disk 2 at the side surface on the insertion end.

The slide section 255 formed at the rear end of the arm body 253 is a wall with a curved surface provided upright by the arm body 253. As shown in (c) of FIG. 29, this slide section 255 has a curved surface 255a being the side surface abutted against the edge section 17 of the main chassis 6 when the ejection arm 52 is rotated in the arrow of $b_1$. The slide section 255 rotates the arm body 253 and the support section 254 by being abutted against the edge section 17 of the main chassis 6 when the ejection arm 52 is rotated in the direction of the arrow $b_1$. In response to the rotation of the arm body 253 as a result of the slide section 255 abutting against the main chassis 6, in the support section 254, the main surface 254a having been rotated in the direction substantially orthogonal to the main surface of the optical disk 2 becomes substantially parallel to the main surface of the optical disk 2.

The coil spring 252 biasing the lift arm 251 to rotate is inserted with a winding section by the arm body 253. One end of the coil spring 252 is latched by the main surface portion of the second push-out arm 240, and the other end thereof is latched by the spring latch section 256 provided to the arm body 253 of the lift arm 251. By the latching of the coil spring 252 as such, i.e., one end is latched by the push-out arm 240, and the other end is latched by the spring latch section 256 of the lift arm 251, the lift arm 251 is biased to rotate.

Figure 30:
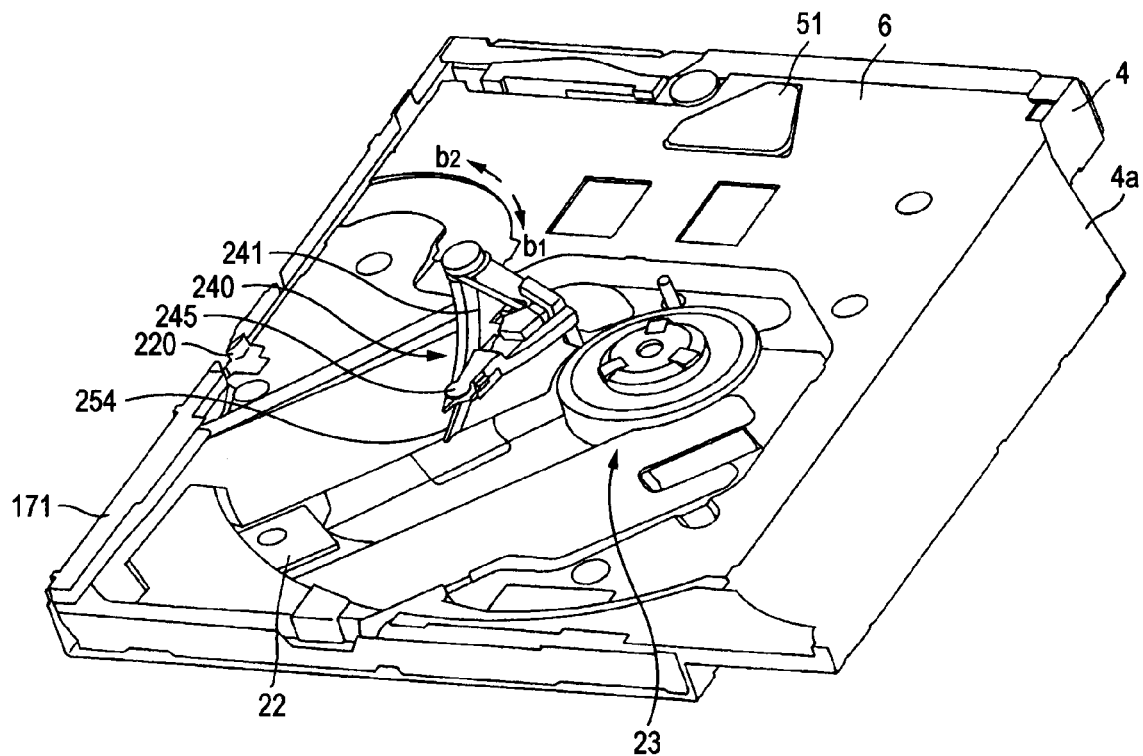
FIG. 30 is a perspective view of the disk drive apparatus provided with the ejection arm of FIG. 26.

Such a lift arm 251 is supported by the lift support section 241 of the second push-out arm 240 by the arm body 253 being housed in the housing concave section 242 of the second push-out arm 240, and by the latch protrusion section 257 being inserted into the latch hole 243c of the support plate 243, which is attached from the back surface side of the second push-out arm 240. At this time, in the lift arm 251, the spring latch section 256 biased by the coil spring 252 is abutted against the main surface of the support plate 243, whereby the main surface 254a of the support section 254 is made upright and retained in the direction substantially orthogonal to the main surface of the optical disk 2. As shown in FIG. 30, the support section 254 waits for insertion of the optical disk 2 with the main surface 254a tilted toward the side of the bottom case 4.

Figure 31:
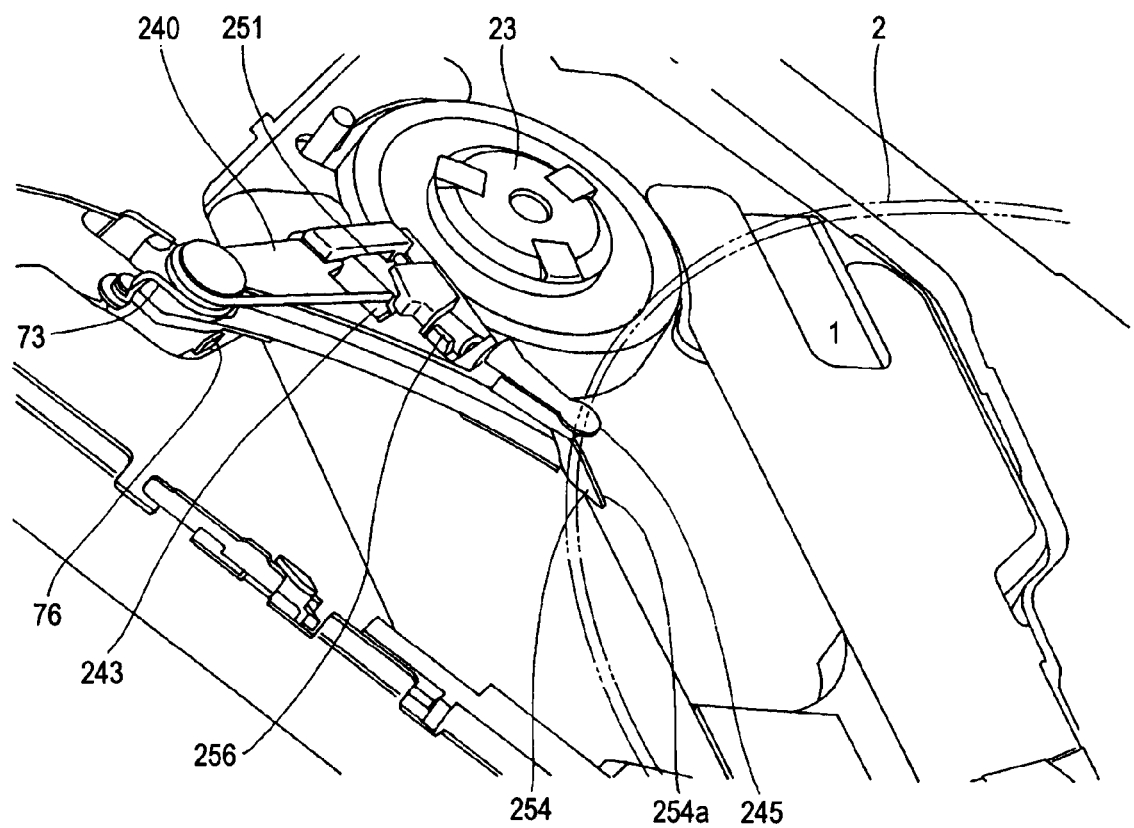
FIG. 31 is a perspective view of a second push-out arm for use to support the optical disk in the second lift section.

When the optical disk 2 is inserted into the cabinet 3, the upright wall provided with the grip piece 245 is abutted against the optical disk 2 at the side surface on the insertion end so that the second push-out arm 240 is rotated in the direction of the arrow $b_1$. At this time, as shown in FIG. 31, when the optical disk 2 is inserted with a tilt at the tip end toward the side of the bottom case 4, the support section 254 supports the tip end of the optical disk 2. As such, even if the optical disk 2 is inserted with a tilt toward the side of the bottom case 4, the optical disk 2 can be protected from collision, at outer regions, with the components in the base unit 22 in the bottom case 4, e.g., the turntable 23a and the optical pickup 25. As the optical disk 2 is guided by the main surface 254a of the support section 254, the outer regions thereof on the insertion end are moved to the normal transfer area.

Figure 32:
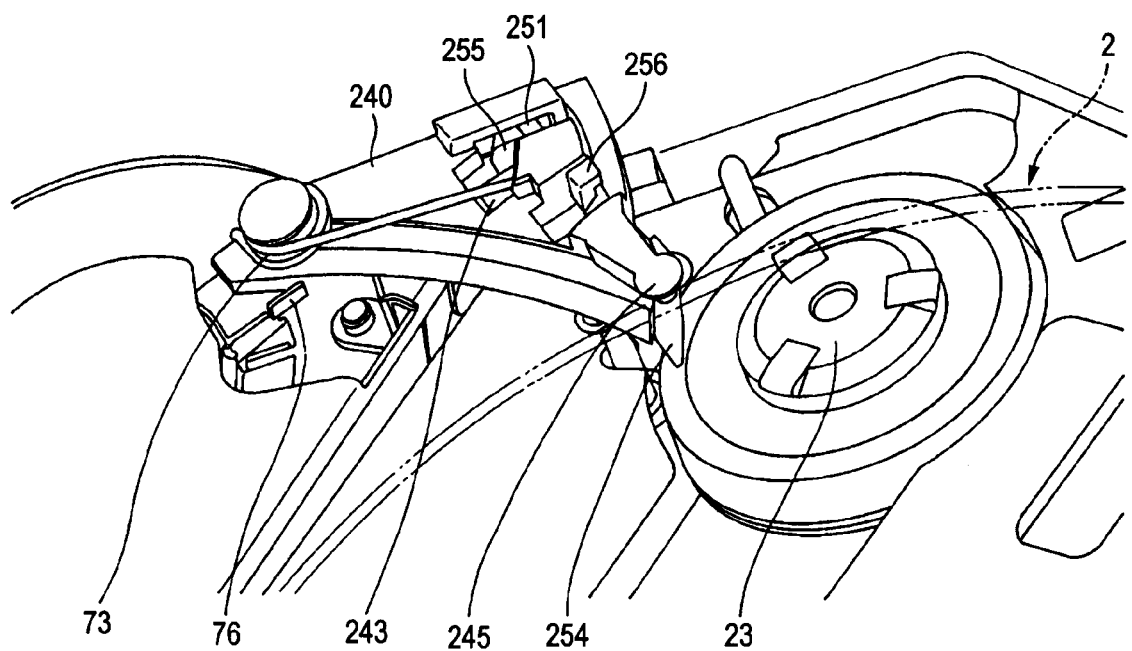
FIG. 32 is a perspective view of the second push-out arm for use to guide the optical disk in the second lift section.

When the ejection arm 52 is rotated in the direction of the arrow $b_1$ with the optical disk 2 supported by the support section 254, the arm body 253 of the lift arm 251 is rotated against the biasing force of the coil spring 252 by the curved surface 255a of the slide section 255 abutting against the edge section 17 of the main chassis 6. As shown in FIG. 32, the support section 254 is rotated until a state change is observed, i.e., from the state in which the main surface is upright and substantially orthogonal to the main surface of the optical disk 2 to the state in which the main surface is substantially parallel to the main surface of the optical disk 2. The support section 254 then guides the optical disk 2 inserted with a tilt to the normal transfer area, and grips the optical disk 2 with the grip section 245 provided upright on the second push-out arm 240.

In the process of retracting the optical disk 2, when the ejection arm 52 is rotated more in the direction of the arrow $b_1$, the lift arm 251 moves the slide section 255 to slide over the upper surface 6*a* of the main chassis 6. As a result, the support section 254 is moved while remained substantially parallel to the main surface of the optical disk 2. As such, for insertion and retraction of the optical disk 2 with a grip of the optical disk 2 with the grip piece 245, the lift arm 251 is rotated to the rear surface side of the cabinet 3, and for ejection of the optical disk 2, the lift arm 251 pushes the optical disk 2 toward the front surface side of the cabinet 3.

The distance from the grip piece 245 to the support section 254 rotated onto the normal transfer area is so set as to be slightly larger than the thickness of the optical disk 2, and the optical disk 2 is not firmly gripped thereby. As such, the ejection arm 52 prevents the optical disk 2 from tilting using the grip piece 245 and the support section 254 with the rotation in the direction of the arrows $b_1$ and $b_2$. The ejection arm 52 also can smoothly release the optical disk 2, and grip when the disk is ejected.

Described next is the first link arm 54 that is rotatably engaged with the rotation support member 71 of the ejection arm 52. The first link arm 54 serves, by being operated by the operation arm 58 that will be described later, to rotate the ejection arm 52 in the direction of the arrow $b_1$ or $b_2$ of FIG. 11, i.e., the direction of inserting or ejecting the optical disk 2. The first link arm 54 is made of a metal sheet shaped substantially like a rectangle, and one end 54*a* in the longitudinal direction is rotatably engaged with the engagement hole 80 of the rotation support member 71, and the other end 54*b* in the longitudinal direction is rotatably engaged with the second link arm 55. At this end portion 54*b*, a latch section 96 is formed for latching of an end of the extension spring 56 placed across the main chassis 6, and at the substantially middle portion in the longitudinal direction, an end 58*b* of the operation arm 58 is attached.

Alternatively, the first link arm 54 may latch a bias coil spring 97 all the way to the loop cam 57. The bias coil spring 97 is provided to be ready for a case if, in the process of ejecting the optical disk 2, the power of the slider 122 is not sufficiently transmitted as a rotation force to the rotation support member 71 of the ejection arm 52 via the first link arm 54. The bias coil spring 97 serves to rotate the ejection arm 52 to the position where the optical disk 2 is ejected.

The bias coil spring 97 is latched, at one end, by a loop cam plate 111 of the loop cam 57, and the other end is attached to the substantially middle portion of the first link arm 54. With such a configuration, in the process of ejecting the optical disk 2, the bias coil spring 97 biases, via the first link arm 54, the rotation support member 71 to rotate in the direction of the arrow $b_2$ of FIG. 19. As such, the ejection arm 52 can transfer the optical disk 2 to any predetermined position where the optical disk 2 is ejected. Note that, in this disk transfer mechanism 50, the bias coil spring 97 is not a must, and is used for supplemental use. In the disk transfer mechanism 50, generally, the ejection arm 52 is rotated in the arrow $b_2$ not responding to the biasing force of the bias coil spring 97 but to the sliding movement of the slider 122, thereby transferring the optical disk to the position where the optical disk 2 is ejected.

The extension spring 56 to be latched by the latch section 96 formed at the tip end of the first link arm 54 biases, via the first link arm 54, the ejection arm 52 to rotate in the direction of the arrow $b_2$ of FIG. 11, i.e., the direction of ejecting the optical disk 2. As such, for insertion of the optical disk 2, the extension spring 56 provides the ejection arm 52 with the biasing force in the ejection direction. That is, when the ejection arm 52 is rotated in the direction of the arrow $b_1$ responding to the insertion of the optical disk 2, the first link arm 54 coupled to the rotation support member 71 is also rotated, at the end 54*a*, in the direction of the arrow $b_1$. At this time, as to the extension spring 56 being latched by the latch section 96 of the first link arm 54, the end latched by the latch section 98 of the main chassis 6 and the end latched by the latch section 96 of the first link arm 54 are moved away from each other, and the extension spring 56 is extended. As such, by the biasing force of the extension spring 56, the end 54*a* of the first link arm 54 and the rotation support member 71 engaged with the first link arm 54 are pulled back in the direction opposite to the rotation direction, i.e., the direction of the arrow $b_1$. The ejection arm 52 is thus provided with the biasing force of a predetermined level in the direction of the arrow $b_2$, i.e., the direction of ejecting the optical disk 2.

As such, when a user inserts the optical disk 2, the disk drive apparatus 1 allows insertion of the optical disk 2 while providing, using the ejection arm 52, the biasing force in the direction of the arrow $b_2$, i.e., the direction opposite to the insertion direction. This accordingly enables to push back, even if a user stops insertion of the optical disk 2 in the middle of the operation, the optical disk 2 to the ejection position, and prevents the optical disk 2 from being inserted halfway through and left in the cabinet 3.

Note here that when the optical disk 2 is inserted into the cabinet 3 to some degree, the drive mechanism 120 (will be described later) is driven, and the operation of retracting the optical disk 2 is started by the loading arm 51. At the same time, the operation arm 58 receiving the driving force of the drive motor 121 moves the first link arm 54 so that the biasing force of the extension spring 56 in the direction of the arrow $b_2$ does not act on the ejection arm 52. For ejection of the optical disk 2, the first link arm 54 is so guided as not to move away the latch section 96 and the latch section 98 of the main chassis 6. The extension spring 56 is not thus extended, and the biasing force in the ejection direction never acts on the ejection arm 52 and the optical disk 2.

Figure 33:
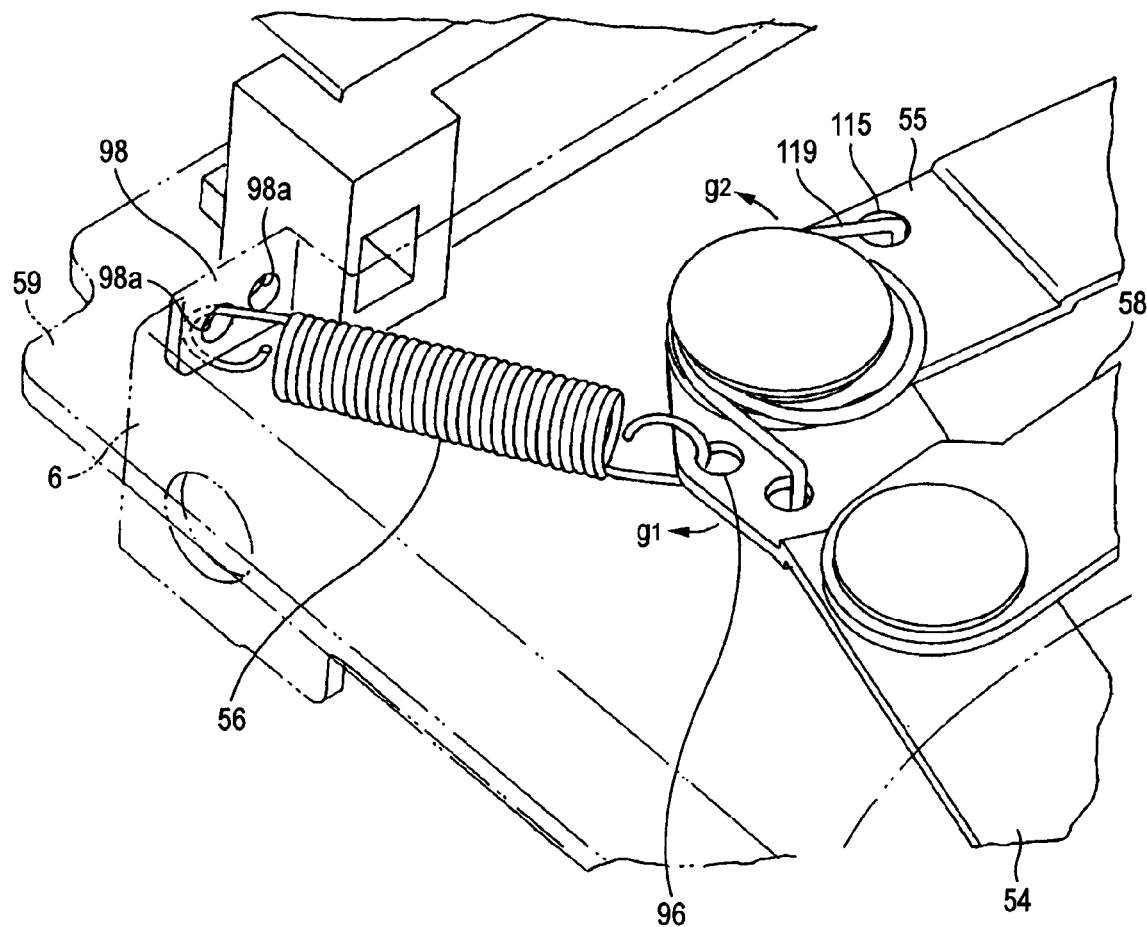
FIG. 33 is a perspective view of a latch section in the main chassis at which an end portion of an extension spring is latched.

As shown in FIG. 33, the latch section 98 of the main chassis 6 latching the extension spring 56 with the latch section 96 of the first link arm 54 is formed with a plurality of latch holes 98*a*. Depending on which latch hole 98*a* is to be used, the extension spring 56 varies in length of extension at the time of insertion of the optical disk 2 so that the biasing force in the ejection direction can be varied. Alternatively, the latch section 96 provided to the first link arm 54 may be formed with a plurality of latch holes. Still alternatively, such a plurality of latch holes may be formed to both the latch sections 96 and 98.

As such, with a plurality of latch holes provided to the latch section 96 of the first link arm 54 and/or the latch section 98 of the main chassis 6, the extension spring 56 can be adjusted by length of extension. There thus is no more need to prepare various types of extension springs 56 varying in force level, and only by changing the latch position based on the latch holes, any desired ejection force can be selected for application. The biasing force of the extension spring 56 acting on the ejection arm 52 in the ejection direction may surely be changed using various types of extension springs varying in force level. With this being the case, however, preparing various types of extension springs increases the number of the components, and complicates the control over the components by a service department. In this sense, forming a plurality of latch holes to the latch section 96 of the first link arm 54 and/or the latch section 98 of the main chassis 6 favorably eliminates such time and efforts to use various types of extension springs.

The second link arm 55 rotatably engaged with the end 54*b* of the first link arm 54 is made of a sheet metal long in length, and from one end 55*a*, a guide convex section 113 is protruded to be guided by a guide groove 114 of the loop cam 57. The other end 55*b* is formed with an engagement hole for rotatable engagement with the end 54*b* of the first link arm 54. With the guide convex section 113 guided by the loop cam 57, the second link arm 55 exercises control over the distance between the latch section 96 of the first link arm 54 and the latch section 98 of the main chassis 6.

The second link arm 55 is formed with an engagement protrusion section 116 for engagement with a cam groove 108 formed to the operation arm 58 that will be described later. In the disk transfer mechanism 50, the engagement protrusion section 116 of the second link arm 55 is engaged with the cam groove 108 so that the ejection arm 52 can be rotated in response to the movement of the slider 122. As such, the optical disk 2 can be directed to the predetermined ejection position in a stable manner.

That is, during the ejection of the optical disk 2, if with any load caused by a panel curtain provided to the disk insertion/removal port 19 of the front panel 18 sliding in contact with the optical disk 2, the rotation support member 71 of the ejection arm 52 and the first link arm 54 are biased in the direction of the arrow $b_1$. At this time, if no engagement is established by the engagement protrusion section 116 between the second link arm 55 and the operation arm 58, even if the operation arm 58 is moved in the direction of an arrow $d_2$ in response to the sliding movement of the slider 122 in the direction of an arrow $f_2$, the first link arm 54 simply rotates in the direction of the arrow $d_2$ based on the engagement hole 80 with respect to the rotation support member 71, but does not rotate the ejection arm 52 in the direction of the arrow $b_2$. The second link arm 55 also simply rotate against the first link arm 54.

On the other hand, when an engagement is established by the engagement protrusion section 116 between the second link arm 55 and the operation arm 58, with the movement of the operation arm 58 in the direction of the arrow $d_2$, the engagement protrusion section 116 is abutted against the side wall of the cam groove 108, and thus the second link arm 55 is not allowed to freely rotate against the first link arm 54. That is, with the engagement protrusion section 116 of the second link arm 55 abutted against the side wall of the cam groove 108, the rotation of the first link arm 54 is restricted in the direction of the arrow $d_2$. As such, during the ejection of the optical disk 2, even if the ejection arm 52 is biased in the direction of the arrow $b_1$, in response to the movement of the operation arm 58 in the direction of the arrow $d_2$, the first link arm 54 is moved in the direction of the arrow $d_2$ while opposing the biasing force in the direction of the arrow $b_1$, thereby rotating the ejection arm 52 in the direction of the arrow $b_2$. This implements the rotation of the ejection arm 52 in the direction of the arrow $b_2$ in accordance with the sliding amount of the slider 122 in the direction of the arrow $f_2$ so that the optical disk 2 can be ejected to the predetermined ejection position without fail.

Note here that the second link arm 55 is formed with a latch hole 115 at an end portion engaged with the first link arm 54, and a torsion coil spring 119 is latched thereat. The torsion coil spring 119 is latched by, at one end, the first link arm 54, and the other end thereof is latched by the latch hole 115 of the second link arm 55. Through such latching, the second link arm 55 is biased to rotate in the direction of increasing the angle with the first link arm 54, i.e., the direction of arrows $g_1$ and $g_2$ of FIG. 33 along which the first and second link arms 54 and 55 move away from each other. This enables the guide section 113 to move beyond a protrusion portion 112*e* provided to the loop cam 57 that will be described later so that the second link arm 55 can be guided from a retraction guide wall 112*b* to an ejection guide wall 112*c*.

Figure 34A:
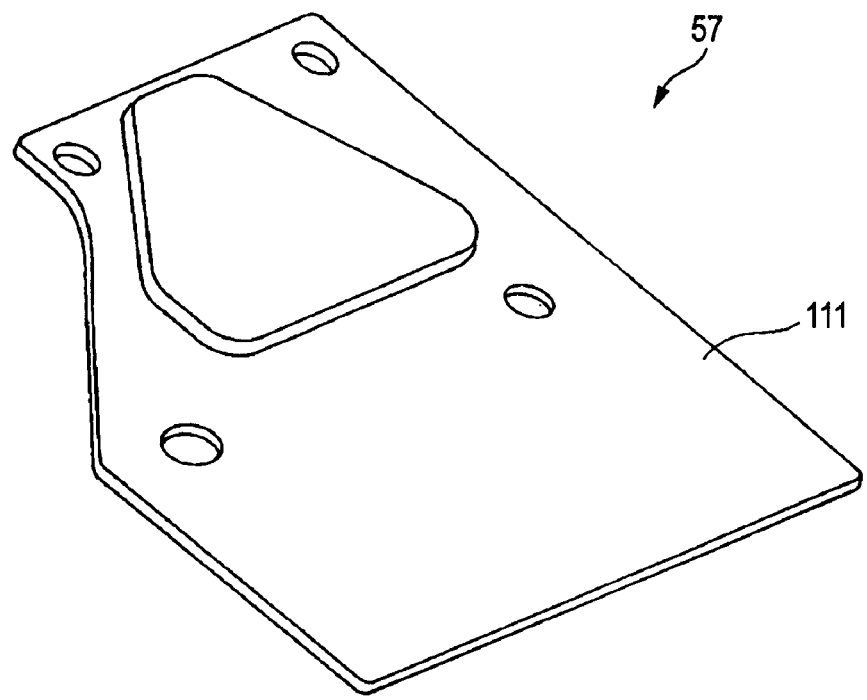
FIG. 34A is a perspective view of a loop cam plate viewed from the surface side for attachment to the main chassis.
Figure 34B:
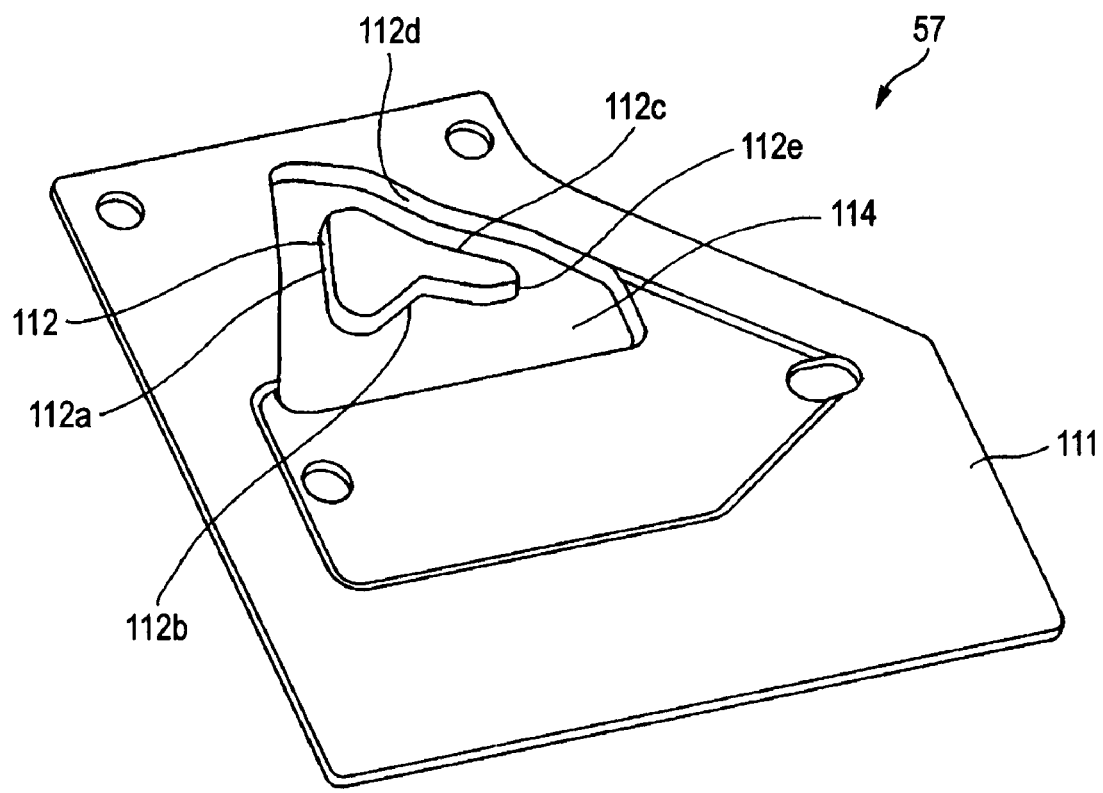
FIG. 34B is a perspective view of the loop cam plate viewed from the surface side on which a guide groove is formed.

The loop cam 57 serves to guide the movement of the guide convex section 113 of the second link arm 55, and includes an insertion guide section, a retraction guide section, and an ejection guide section, which are formed sequentially in a loop. The insertion guide section serves, at the time of insertion of the optical disk 2, to guide the first and second link arms 54 and 55 to make the ejection arm 52 generate a biasing force in the ejection direction. The retraction and ejection guide sections both serve, at the time of retraction and ejection of the optical disk 2, to guide the first and second link arms 54 and 55 to make the ejection arm 52 not to generate the biasing force in the ejection direction. As shown in FIGS. 34A and 34B, the loop cam 57 is formed to the loop cam plate 111 shaped substantially like a plate, and this loop cam plate 111 is attached to the upper surface 6*a* of the main chassis 6 on the side of the bottom case 4. On the loop cam plate 111, a substantially-ring-shaped cam wall 112 is provided upright toward the side of the bottom case 4. Around the cam wall 112, the guide convex section 113 of the second link arm 55 goes during the operation of insertion, retraction, and ejection of the optical disk 2. The cam wall 112 is formed with, sequentially in a loop, an insertion guide wall 112*a*, the retraction guide wall 112*b*, and the ejection guide wall 112*c*, which are enclosed by an outer rim section 112*d* so that a ring-shaped guide groove 114 is formed for movement of the guide convex section 113. Along the insertion guide wall 112*a*, the guide convex section 113 slides when the optical disk 2 is inserted, and along the retraction guide wall 112*b*, the guide convex section 113 slides when the optical disk 2 is retracted. Along the ejection guide wall 112*c*, the guide convex section 113 slides when the optical disk 2 is ejected. The loop cam 57 is formed with the protrusion portion 112*e* between the retraction guide wall 112*b* and the ejection guide wall 112*c* for preventing the guide convex section 113 from moving in the opposite direction.

As shown in FIG. 11, the insertion guide wall 112*a* is formed toward the side of the right guide wall 118 in the direction of the front surface of the cabinet 3, and the retraction guide wall 112*b* is formed from the side of the right guide wall 118 to the side of the left guide wall 117. The ejection guide wall 112*c* is formed from the side of the left guide wall 117 to the side of the right guide wall 118 in the direction of the rear surface of the cabinet 3.

The operation arm 58 coupled to the first link arm 54 and the drive mechanism 120 for operation of the ejection arm 52 is made of a metal sheet long in length. The operation arm 58 is engaged, at one end 58*a* in the longitudinal direction, with a third link arm 100 rotatably coupled with the slider 122 of the drive mechanism 120 and the other end 58*b* thereof is rotatably engaged with the first link arm 54. The operation arm 58 is formed with, at the center in the longitudinal direction, the cam groove 108 for insertion of the engagement protrusion section 116 formed to the second link arm 55.

As described above, the cam groove 108 serves to rotate the ejection arm 52 in accordance with the sliding movement of the slider 122 through engagement with the engagement protrusion section 116 of the second link arm 55. The cam groove 108 is shaped long in length to allow the movement of the engagement protrusion section 116 when the second link arm 55 moves around the loop cam 57. The cam groove 108 is formed to lay in the direction substantially orthogonal to the directions of the arrows $d_1$ and $d_2$ of FIG. 11, i.e., the movement direction of the operation arm 58. This allows the operation arm 58 to restrict the rotation of the second link arm 55 by the engagement protrusion section 116 abutted against the side wall of the cam groove 108, thereby restricting the rotation of the first link arm 54 in the direction of the arrow $d_2$.

When the slider 122 is moved to slide, the operation arm 58 is moved in the directions of the arrows $d_1$ and $d_2$ of FIG. 11, i.e., the substantially lateral direction with the third link arm 100 therebetween, and operates the first link arm 54 and the ejection arm 52 to rotate. To be specific, when moved in the direction of the arrow $d_1$ of FIG. 11 by the third link arm 100, the operation arm 58 presses the first link arm 54 in the same direction, thereby rotating the ejection arm 52 in the direction of the arrow $b_1$ of FIG. 11, i.e., the insertion direction of the optical disk 2. When moved in the direction of the arrow $d_2$ of FIG. 11 by the third link arm 100, the operation arm 58 moves the first link arm 54 in the same direction, thereby rotating the ejection arm 52 in the direction of the arrow $b_2$ of FIG. 11, i.e., the ejection direction of the optical disk 2.

The third link arm 100 rotatably engaged with the end 58a of the operation arm 58 is made of a metal sheet shaped substantially like a skewed letter L, and is supported rotatably in the directions of arrows $c_1$ and $c_2$ of FIG. 11 by a bending portion 100a being rotatably attached to the main chassis 6. An end 100b being an extension from this bending portion 100a is formed with an engagement convex section 109, which is engaged with the slider 122, and with the other end 100c, the operation arm 58 is rotatably engaged. Through such engagement, when the slider 122 is transferred in the direction of the arrow $f_1$ of FIG. 11 in response to the driving force of the drive motor 121 of the drive mechanism 120, the third link arm 100 is guided by a first guide groove 125 formed to the slider 122, and is then rotated in the direction of an arrow $c_1$ of FIG. 11 so that the operation arm 58 is moved in the direction of the arrow $d_1$ of the drawing. When the slider 122 is transferred in the direction of the arrow $f_2$ of FIG. 11, the third link arm 100 is guided by the first guide groove 125, and is then rotated in the direction of an arrow $c_2$ of the drawing so that the operation arm 58 is moved in the direction of the arrow $d_2$ of the drawing.

Note here that the left and right walls 117 and 118 disposed on the right and left sides of the disk transfer area serve to guide the optical disk 2 to be inserted or ejected by the side surface portion of the optical disk 2 slides therealong. The left and right walls 117 and 118 are each made of a synthetic resin or others being softer than the optical disk 2. The right guide wall 118 is disposed above the deck portion 4a, and the left guide wall 117 is disposed above the main chassis 6. The left and right walls 117 and 118 are both fixed by screws, adhesive tapes, and others.

On these left and right guide walls 117 and 118, side walls 117a and 118a are provided upright, respectively. The side walls 117a and 118a are each disposed at a position with a predetermined clearance from the side surface of the optical disk 2 reached at the centering position, and do not come in contact with the side surface portions of the optical disk 2 being driven to rotate.

Described next is the operation of the disk transfer mechanism 50 configured as above, i.e., from insertion to ejection of the optical disk 2. The transfer state of the optical disk 2 is monitored through depression state detection of first to fourth switches SW1 to SW4 equipped to the circuit board 59. As shown in FIG. 11, the first switch SW1 is disposed in the rotation area of the rotation support member 71 of the ejection arm 52, and in response to the rotation of the ejection arm 52, depressed by the bending piece 81 formed to the rotation support member 71 so that an H/L switching is made. As shown in FIG. 11, the second to fourth switches SW2 to SW4 are aligned on the movement area for the slider 122, and when the slider 122 is moved to slide in the direction of the arrow $f_1$ or $f_2$, a H/L switching is sequentially made.

Through monitoring of the depression states and time of such first to fourth switches SW1 to SW4 using a microcomputer, the disk drive apparatus 1 detects the transfer state of the optical disk 2, and drives the drive motor 121, the spindle motor 24a, a displacement drive mechanism 36 for moving the optical pickup 25 or others, for example.

As shown in FIG. 11, before the insertion of the optical disk 2, the slider 122 is located at the side of the disk insertion/removal port 19 after moved to slide in the direction of the arrow $f_2$ of the drawing. In the loading arm 51, the engagement convex section 64 is thus latched by the side surface opposing the first guide section 66a formed to the first cam groove 66 of the loading cam plate 53, and the abutting section 61 is rotated, for retention, to the position away from the transfer area of the optical disk 2. The third link arm 100 engaged with the slider 122 is being rotated in the direction of the arrow $c_2$ of FIG. 11, and this rotates, in the direction of the arrow $b_2$ of FIG. 11, the ejection arm 52 being operated to rotate by the operation arm 58 and the first link arm 54. Moreover, with the slider 122 moved to slide in the direction of the arrow $f_2$, the sub slider 151 is moved to slide in the direction of an arrow $h_2$ in the drawing. This sliding movement of the sub slider 151 moves down the sub chassis 29 configuring the base unit 22 to the side of the bottom case 4 to be away from the transfer area of the optical disk 2.

Figure 12:
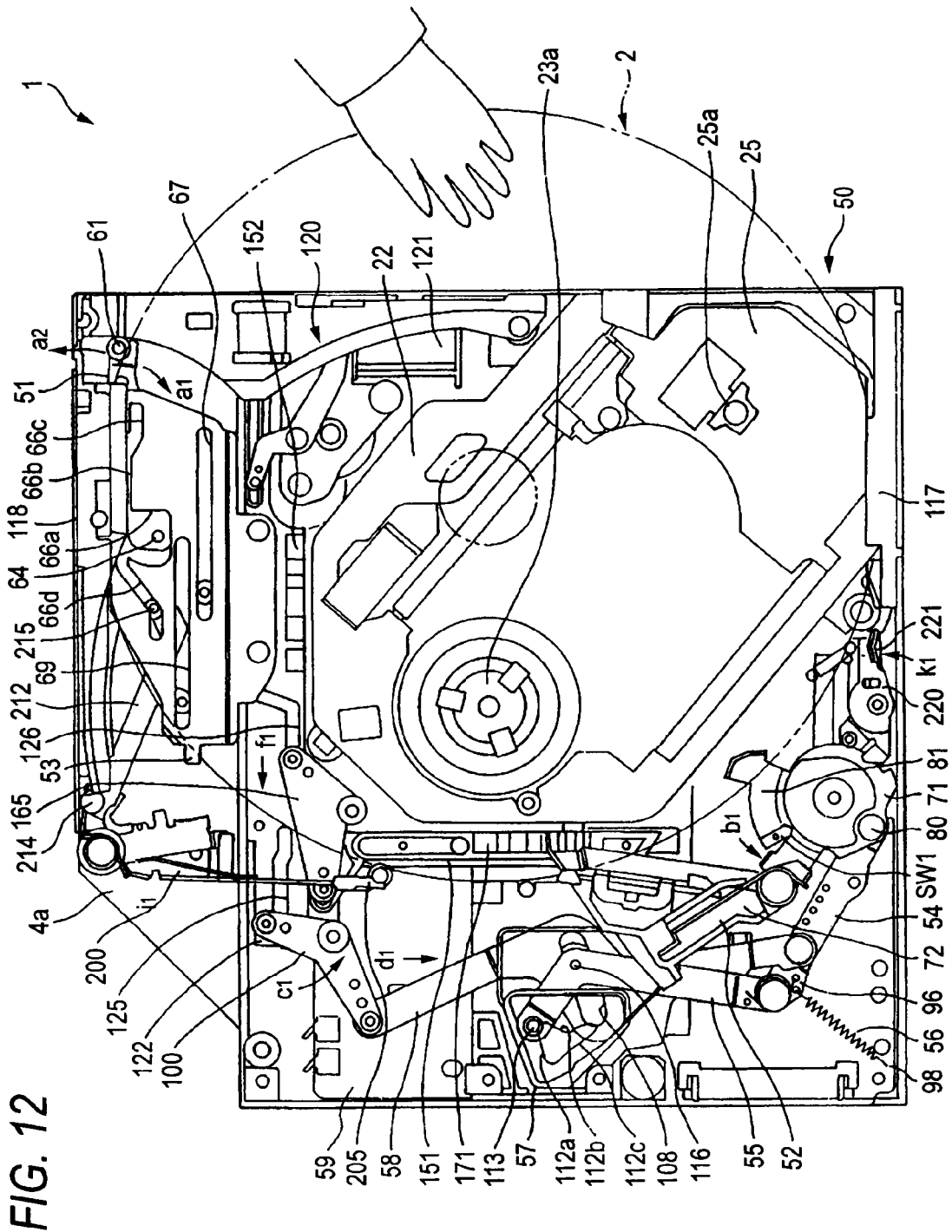
FIG. 12 is a plan view of the disk drive apparatus with operation transition from insertion to retraction.

When a user inserts the optical disk 2 from the disk insertion/removal port 19, the support section 88 of the ejection arm 52 is pressed against the optical disk 2 at the insertion end surface, and as shown in FIG. 12, the ejection arm 52 is rotated in the direction of the arrow $b_1$ of FIG. 12. At this time, as to the ejection arm 52, because the rotation support member 71 is rotated in the direction of the arrow $b_1$ about an attachment port 71b, the end 54a of the first link arm 54 engaged with the rotation support member 71 is also moved in the same direction. On the other hand, as to the second link arm 55 engaged with the first link arm 54, because the first link arm 54 is moved in the direction of the arrow $b_1$, the guide convex section 113 engaged with the guide groove 114 of the loop cam 57 is moved toward the front surface side of the cabinet 3 along the insertion guide wall 112a. The insertion guide wall 112a of the loop cam 57 is extended to the side of the right guide wall 118 toward the front surface side of the cabinet 3. As such, when the second link arm 55 is guided by the insertion guide wall 112a, the end 54b of the first link arm 54 engaged with the second link arm is moved to the side of the right guide wall 118, and then is moved in the direction opposite to the other end 54a of the first link arm 54, which is rotated in the direction of the arrow $b_1$ with the rotation support member 71.

That is, as to the first link arm 54, the latch section 96 in the vicinity of the end 54b engaged with the second link arm 55 is moved in the direction to be away from the latch section 98 of the main chassis 6. Accordingly, after the insertion of the optical disk 2, as the ejection arm 52 is rotated in the direction of the arrow $b_1$ of FIG. 12, the extension spring 56 placed across the first link arm 54 and the main chassis 6 is extended, and with bias application, brings the latch section 96 of the first link arm 54 closer to the latch section 98 of the main chassis 6. Herein, because the engagement hole 80 of the rotation support member 71 is rotated to the front surface side of the cabinet 3, as is biased by the extension spring 56, the first link arm 54 applies biases toward the rear surface side of the cabinet 3, i.e., in the direction opposite to the rotation direction of the rotation support member 71. The ejection arm 52 is thus biased in the direction of the arrow $b_2$ of FIG. 12, i.e., the direction of ejecting the optical disk 2.

As such, the optical disk 2 is inserted while opposing against the biasing force acting on the ejection arm 52 in the ejection direction. Therefore, even if a user stops insertion of the optical disk 2 in the middle of the operation, the optical disk 2 never fails to be ejected to the outside of the cabinet 3, and thus is not left with half insertion in the cabinet 3.

After the optical disk 2 is inserted by a user while opposing against such a biasing force, and after the ejection arm 52 is rotated to a predetermined angle, the bending piece 81 of the rotation support member 71 depresses the first switch SW1 provided to the circuit board 59 so that the drive mechanism 120 is activated. In response to the driving force of the drive motor 121, the drive mechanism 120 moves the slider 122 in the direction of the arrow $f_1$ of FIG. 14. This moves, to slide, not only the slider 122 but also the loading cam plate 53 in the same direction so that, in the loading arm 51, the engagement convex section 64 is abutted against the first guide portion 66a of the first cam groove 66. When the engagement convex section 64 is pressed by the first guide portion 66a in the direction of the arrow $f_1$, the loading arm 51 retracts the optical disk 2 with the rotation of the abutting section 61 about the insertion hole 60 in the direction of the arrow $a_1$ of FIG. 14.

After the slider 122 is moved to slide in the direction of the arrow $f_1$, and after the optical disk 2 is transferred by the loading arm 51 onto the disk loading section 23, as shown in FIG. 15, the engagement convex section 64 moves the first cam groove 66 of the loading cam plate 53 from the first guide portion 66a to the second guide portion 66b. Because the second guide portion 66b is formed parallel to the sliding direction of the slider 122, the loading arm 51 retains the optical disk 2 at its centering position with no operation of guiding the engagement convex section 64 after the movement of the slider 122. During the operation of retracting the optical disk 2, detecting the depression states of the first to fourth switches SW1 to SW4 tells that the base unit 22 is moved down to the chucking release position, it means that the optical disk 2 is now ready for transfer with safety.

The optical disk 2 is loaded by the loading arm 51, guided by the left and right guide walls 117 and 118, and abutted against the deck arm 200 and the centering guide 220 (will be described late), whereby the optical disk 2 is centered on the disk loading section 23.

When the slider 122 is moved to slide in the direction of the arrow $f_1$, the third link arm 100 is guided by the first guide groove 125 of the slider 122, and is rotated in the direction of the arrow $c_1$ of FIG. 14. The operation arm 58 being engaged with such a third link arm 100 is then moved in the direction of the arrow $d_1$ of the drawing. Accordingly, the first link arm 54 being engaged with the end 58b of the operation arm 58 is pressed by the operation arm 58, and is moved in the direction of the arrow $d_1$.

As shown in FIG. 12, when the ejection arm 52 is rotated to the position of activating the drive mechanism 120, the guide convex section 113 of the second link arm 55 is allowed to move from the insertion guide wall 112a of the loop cam 57 to the retraction guide wall 112b. Therefore, when the first link arm 54 is moved by the operation arm 58 in the direction of the arrow $d_1$, the second link arm 55 is also moved in the same direction. With the first and second link arms 54 and 55 moved in the direction of the arrow $d_1$ as such, as to the first link arm 54, the latch section formed 96 at the end 54b is brought closer to the latch section 98 formed to the main chassis 6 so that the extension spring 56 is accordingly compressed. It means that, in the operation of retracting the optical disk 2, the biasing force having been acted on the ejection arm 52 in the direction of the arrow $b_2$ vanishes by degrees. In the disk transfer mechanism 50, because the ejection arm 52 is rotated in the direction of the arrow $b_1$ by the operation arm 58 receiving the driving force of the drive mechanism 120, the operation of retracting the optical disk 2 by the loading arm 51 can be executed smoothly with no disturbance by the biasing force acting on the ejection arm 52 in the ejection direction, and with no load imposed on the optical disk 2.

Note here that the second link arm 55 is being biased to rotate in the direction of an arrow $g_2$ by the torsion coil spring 119 latched with the first link arm 54. Therefore, when moved to the border portion between the retraction guide wall 112b and the ejection guide wall 112c, the guide convex section 113 can move beyond, with ease, the protrusion portion 112e provided at the border portion. Moreover, the guide convex section 113 does not move again to the side of the retraction guide wall 112b when the optical disk 2 is to be ejected.

As to the ejection arm 52, the biasing force of the extension spring 56 vanishes by the first link arm 54 being moved by the operation arm 58 in the direction of the arrow $d_1$, and by the guide convex section 113 of the second link arm 55 being moved in the direction of the arrow $d_1$ while being guided by the retraction guide wall 112b. Also by the optical disk 2 being retracted by the loading arm 51 to the rear surface side of the cabinet 3, the push-out arm 72 and the rotation support member 71 are rotated in the direction of the arrow $b_1$ of FIG. 12.

When the slider 122 is moved to slide in the direction of the arrow $f_1$, a coupling arm 165 engaged with the slider 122 is rotated so that the sub slider 151 is also moved to slide in the direction of an arrow $h_1$ of FIG. 15. After the optical disk 2 is centered, the base unit 22 is moved upward from the chucking release position to the chucking position by the slider 122 and the sub slider 151. Accordingly, the area around the center hole 2a of the optical disk 2 transferred to the centering position is pinched by the turntable 23a and the abutting protrusion section 8 provided around the aperture section 7 of the top portion 5a.

At this time, detecting the depression states of the first to fourth switches SW1 to SW4 tells that the base unit 22 is moved up to the chucking position, it means that the optical disk 2 is now ready for chucking by the turntable 23a.

When the slider 122 is moved in the direction of the arrow $f_1$, and when the sub slider 151 is moved more to slide in the direction of the arrow $h_1$, the base unit 22 is moved down from the chucking position to the recording/reproduction position. At this time, detecting the depression states of the first to fourth switches SW1 to SW4 tells that the base unit 22 is moved down to the recording/reproduction position.

When the optical disk 2 is chucked by the turntable 23a, the slider 122 moved to slide in the direction of the arrow $f_1$ rotates more the third link arm 100 in the direction of the arrow $c_1$, and the operation arm 58 is moved more in the direction of the arrow $d_1$. In response thereto, the ejection arm 52 is rotated in the direction of the arrow $b_1$ via the first link arm 54. An abutting convex section 168 at the tip end of the sub slider 151 is also responsively abutted against the bending piece 81 of the rotation support member 71, and the rotation support member 71 is rotated in the direction of the arrow $b_1$.

The ejection arm 52 thus moves away the support section 88 of the push-out arm 72 and the optical disk 2 from each other. In response to the ejection arm 52 being rotated in the direction of the arrow $b_1$, the rotation piece 82 formed to the rotation support member 71 presses the centering guide 220 that has been biased to rotate on the disk transfer area, and moves the centering guide 220 from the side surface of the optical disk 2. Moreover, in response to the slider 122 moving to slide in the direction of the arrow $f_1$, the loading arm 51 is rotated in the direction of the arrow $a_2$ of FIG. 16 because the engagement convex section 64 is moved from the second guide portion 66b of the loading cam plate 53 to the third guide portion 66c thereof. As such, the abutting section 61 is moved away from the side surface of the optical disk 2. Furthermore, by being pressed against the loading cam plate 53, the deck arm 200 currently working on centering of the optical disk 2 is moved away from the side surface of the optical disk 2.

As a result, the optical disk 2 becomes free from the various types of arms and the centering guide 220, is allowed to freely rotate, and is then put on standby for the user operation for recording or reproduction.

As shown in FIG. 16, the sub slider 151 is moved in the direction of the arrow $h_1$ so that the tip end portion is abutted against the bending piece 81 of the rotation support member 71, and the rotation of the rotation support member 71 is restricted thereby from moving in the direction of the arrow $b_2$. This favorably protects the rotating optical disk 2 from collision with the push-out arm 72 and the centering guide 220, which is often caused by the rotation of the rotation support member 71 in the direction of the arrow $b_2$.

In the process of loading the optical disk 2 in the disk drive apparatus 1, after the optical disk 2 is chucked by the turntable 23a, so-called double chucking is performed, i.e., the optical disk 2 is rotated a half turn by driving the spindle motor 24a, and the drive motor 121 is driven in the reverse direction so that the base unit 22 is moved up again to the chucking position. This favorably prevents the optical disk 2 being subjected to recording and/or reproduction with halfway engagement with the turntable 23a.

After the recoding/reproduction operation, and after a user goes through the operation of ejecting the optical disk 2, first of all, the drive motor 121 of the drive mechanism 120 is driven in the reverse direction, and the slider 122 is moved to slide in the direction of the arrow $f_2$ of FIG. 17. In response thereto, the engagement convex section 64 is moved from the third guide portion 66c of the loading cam plate 53 to the second guide portion 66b thereof, and thus the loading arm 51 is rotated in the direction of the arrow $a_1$ of FIG. 17 so that the abutting section 61 is abutted against the side surface of the optical disk 2.

After the sub slider 151 is moved to slide in the direction of the arrow $h_2$ of FIG. 17, and after the rotation support member 71 is freed from depression, the third link arm 100 is operated by the slider 122 to rotate in the direction of the arrow $c_2$, and the operation arm 58 is moved in the direction of the arrow $d_2$. In response thereto, the end 54b of the first link arm 54 is also moved in the direction of the arrow $d_2$, and thus as to the ejection arm 52, the rotation support member 71 engaged with the end 54a of the first link arm 54 is rotated in the direction of the arrow $b_2$, and the abutting section 61 of the push-out arm 72 is abutted against the side surface of the optical disk 2. At this time, because the guide convex section 113 of the second link arm 55 is being moved to the side of the ejection guide wall 112c of the loop cam 57, the ejection arm 52 is rotated without the latch section 96 of the first link arm 54 and the latch section 98 of the main chassis 6 moving away from each other, and no biasing force is generated by the extension spring 56 in the ejection direction.

In response to such movement of the slider 122 in the direction of the arrow $f_2$, when the loading cam plate 53 is moved in the same direction, the deck arm 200 that has been pressed by the loading cam plate 53 is also abutted against the side surface of the optical disk 2.

After the slider 122 is moved to slide in the direction of the arrow $f_2$, and after the sub slider 151 is moved to slide in the direction of the arrow $h_2$ of FIG. 17, the base unit 22 is moved down from the recording/reproduction position to the chucking release position. The optical disk 2 is then lifted above by a guide pin 180 provided upright on the bottom case 4 so that the chucking is released with the turntable 23a. The guide pin 180 for releasing the chucking of the optical disk 2 as such will be described later.

At this time, detecting the depression states of the first to fourth switches SW1 to SW4 tells that the base unit 22 is moved down to the chucking release position, and it means that the optical disk 2 is now ready for ejection with safety.

Thereafter, the third link arm 100 engaged with the slider 122 slides along the first guide groove 125 of the slider 122, thereby rotating more in the direction of the arrow $c_2$. This thus moves more the operation arm 58 in the direction of the arrow $d_2$. As shown in FIG. 18, in response to such movement of the operation arm 58 in the direction of the arrow $d_2$, when the first link arm 54 is moved in the same direction, the ejection arm 52 is rotated in the direction of the arrow $b_2$ of FIG. 18 in accordance with the movement amount of the operation arm 58 so that the optical disk 2 is directed to the ejection position.

At this time, as a result of the engagement between the engagement convex section 64 and the first cam groove 66 of the loading cam plate 53, the loading arm 51 is allowed to rotate only responding to the sliding movement of the loading cam plate 53, and is restricted not to rotate freely. In the loading arm 51, as a result of the sliding movement of the loading cam plate 53 with the slider 122 in the direction of the arrow $f_2$ of FIG. 18, the engagement convex section 64 is guided from the second guide portion 66b to the first guide portion 66a. Although restricted by the first guide portion 66a from rotating in the direction of the arrow $a_2$, the loading arm 51 is allowed to rotate in the direction of the arrow $a_2$ as the optical disk 2 is directed toward the front surface side of the cabinet 3 for ejection by the ejection arm 52, and as the first guide portion 66a is moved to the front surface side of the cabinet 3 with the sliding movement of the slider 122. There thus is no disturbance by the ejection arm 52 for ejection of the optical disk 2.

As such, the abutting between the engagement convex section 64 and the first guide portion 66a restricts the rotation of the loading arm 51 in the direction of the arrow $a_2$, i.e., the direction of ejecting the optical disk 2, and the loading arm 51 is allowed to move in the direction of the arrow $a_2$ in response to the sliding movement of the slider 122 and the rotation of the ejection arm 52. Accordingly, the optical disk 2 is prevented from being abruptly ejected from the disk insertion/removal port 19 due to the biasing force of the deck arm 200 in the ejection direction.

The loading arm 51 is always biased by the leaf spring 62 fixed to the deck portion 4a in the direction of the arrow $a_1$, i.e., the direction of biasing the optical disk 2 in the cabinet 3. Therefore, when the engagement convex section 64 is rotated to the position of abutting against the first guide portion 66a, the loading arm 51 is biased by the leaf spring 62 in the direction of the arrow $a_1$. In consideration thereof, when the optical disk 2 is moved in the ejection direction by the ejection arm 52 and the deck arm 200, the biasing force of the leaf spring 62 in the insertion direction is applied for the aim of preventing the optical disk 2 not to be abruptly ejected. Note here that the biasing force of this leaf spring 62 is weak compared with the rotation force of the ejection arm 52 in the ejection direction, and thus no disturbance is caused thereby for the ejection arm 52 to eject the optical disk 2, and no excessive load is imposed thereby on the optical disk 2.

As a result of the first link arm 54 being moved by the operation arm 58 in the direction of the arrow $d_2$, the guide convex section 113 of the second link arm 55 is moved to slide the area enclosed by the ejection guide wall 112c and the outer rim section 112d of the loop cam 57. At this time, by the rotation support member 71 of the ejection arm 52 being also rotated in the direction of the arrow $b_2$ by the operation arm 58 via the first link arm 54, the engagement hole 80 engaged with the first link arm 54 is moved toward the rear surface side of the cabinet 3 in the direction of the arrow $b_2$. This allows the first link arm 54 being engaged with the engagement hole 80 to move toward the rear surface side of the cabinet 3 in the direction of the arrow $d_2$ with almost no angle change, i.e., with almost the same posture. The latch section 98 of the main chassis 6 is formed in the vicinity of the left-side corner portion on the rear surface side at which the loop cam 57 is latched. This configuration allows the latch section 96 of the first link arm 54 to move with a substantially equidistant space from the latch section 98 of the main chassis 6, and the extension spring 56 is thus not extended. It means that, without being biased by the extension spring 56, the ejection arm 52 is rotated by the driving force of the drive mechanism 120 in the direction of the arrow $b_2$, i.e., the ejection direction, by the amount corresponding to the sliding movement of the slider 122. This thus avoids the abrupt ejection of the optical disk 2 by the biasing force of the extension spring 56, and enables to eject the optical disk 2 stably to the predetermined ejection position.

At this time, considered here is a case where the biasing force in the direction of the arrow $b_1$ is exerted, relatively, on the ejection arm 52 and the first link arm 54 because the optical disk 2 slides in contact with the panel curtain provided to the disk insertion/removal port 19 of the front panel 18. In such a case, as described above, considered is the fact that the first link arm 54 is restricted from rotating in the direction of the arrow $d_2$ because the engagement protrusion section 116 of the second link arm is abutted against the side wall in the cam groove 108 of the operation arm 58. Therefore, the first link arm 54 and the ejection arm 52 are rotated in response to the operation arm 58, which is moved in the direction of the arrow $d_2$ by the amount corresponding to the sliding amount of the slider 122 in the direction of the arrow $f_2$. In this manner, the disk transfer mechanism 50 becomes able to rotate, opposing against the biasing force in the direction of the arrow $b_1$, the ejection arm 52 by the amount corresponding to the sliding amount of the slider 122.

Figure 19:
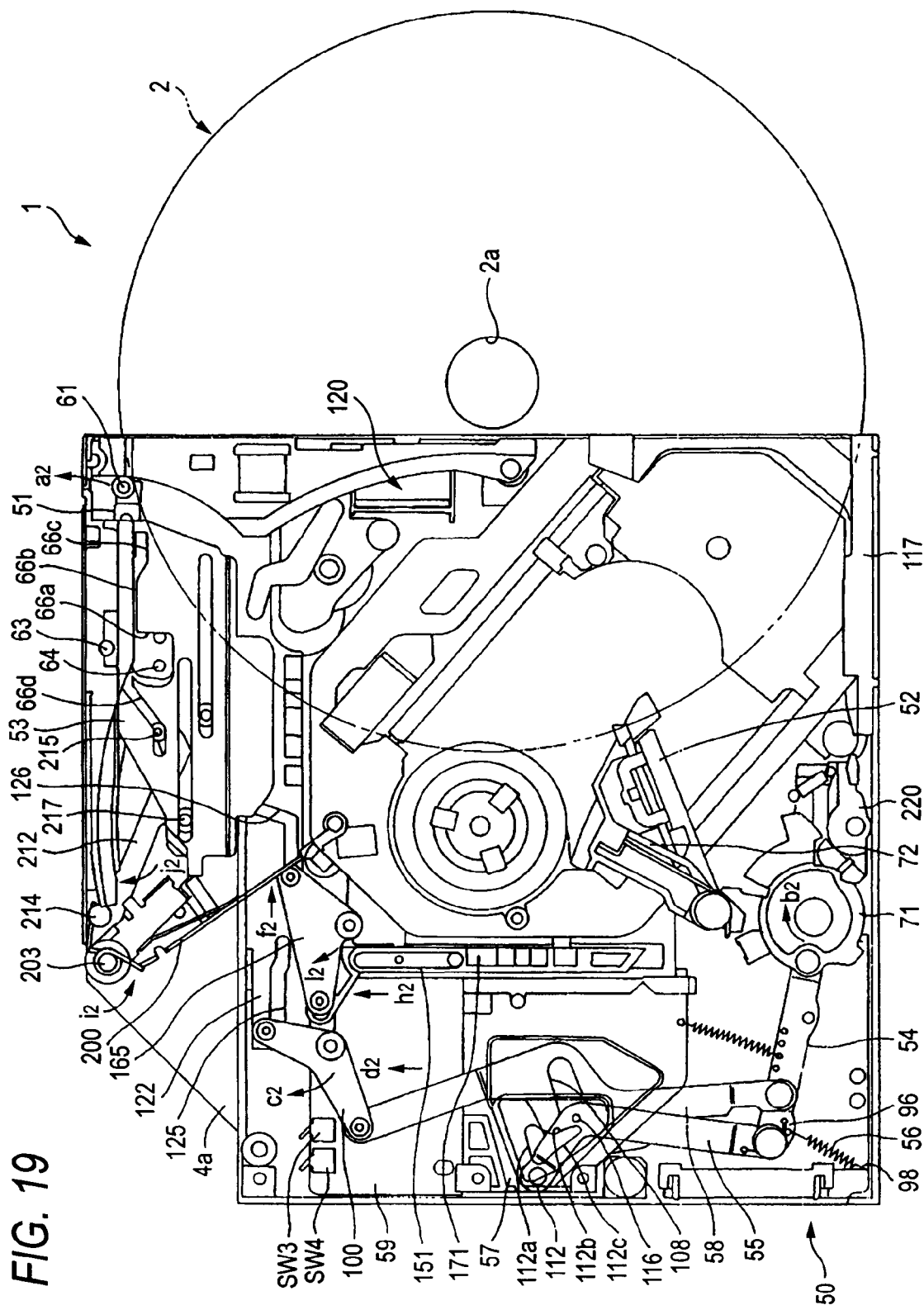
FIG. 19 is a plan view of the disk drive apparatus through with the transfer of the optical disk to an ejection position.

As shown in FIG. 19, after the slider 122 is moved to its initial position, a detection switch is depressed so that the sliding operation is stopped. In response, the ejection arm 52 is also rotated to its initial position by the operation arm 58 and the first link arm 54, and the optical disk 2 is stopped at the position where the center hole 2a is ejected from the disk insertion/removal port 19. At this time, detecting the depression states of the first to fourth switches SW1 to SW4 tells that the optical disk 2 is transferred by the ejection arm 52 to the predetermined ejection position so that the drive motor 121 is stopped driving.

At this time, the timing for the loading arm 51 of retracting the optical disk 2 inserted by a user and the timing of ejection restriction for the loading arm 51 at the time of ejection of the optical disk 2 are determined based on the position of the first guide portion 66a in the sliding direction of the loading cam plate 53, and the length of the second guide portion 66b.

That is, as described above, the loading arm 51 is restricted from rotating with the engagement convex section 64 guided by the first cam groove 66 of the loading cam plate 53, i.e., when the ejection arm 52 is rotated in the direction of the arrow $b_2$, and when the optical disk 2 is started to be ejected, the engagement convex section 64 is abutted against the first and second guide portions 66a and 66b so that the rotation of the loading arm 51 is restricted in the direction of the arrow $a_2$, i.e., the direction of ejecting the optical disk 2. As such, the rotation amount in the direction of the arrow $a_2$ is determined in accordance with the movement amount of the first guide portion 66a in the direction of the arrow $f_2$. It thus means that if the second guide portion 66b is shortened in length, and if the first guide portion 66a is moved in position by the reduced length toward the front surface side of the loading cam plate 53 in the sliding direction, i.e., the direction of the arrow $f_2$, the timing comes quick for the engagement convex section 64 to be restricted first by the second guide portion 66b and then by the first guide portion 66a, and at a relatively fast timing with respect to the rotation of the ejection arm 52 in the direction of the arrow $b_2$, the loading arm 51 is allowed to rotate in the direction of the arrow $a_2$. As such, for the operation of ejecting the optical disk 2 by the ejection arm 52, with a timing delay of rotating the loading arm 51 by the loading cam plate 53, no disturbance is caused by the loading arm 51 for the operation of ejecting the optical disk 2.

On the other hand, the timing of retracting the optical disk 2 is determined also based on the position of the first guide portion 66a of the loading cam plate 53, and the length of the second guide portion 66b thereof. That is, when the drive mechanism 120 is activated in response to the user insertion of the optical disk 2, the slider 122 and the loading cam plate 53 are moved in the direction of the arrow $f_1$. With this movement, the engagement convex section 64 is abutted against the first guide portion 66a on the way to move in the direction of the arrow $f_1$ so that the loading arm 51 is rotated in the direction of the arrow $a_1$, and retracts the user-inserted optical disk 2 toward the rear surface side of the cabinet 3. As such, if the second guide portion 66b is increased in length, and if the position for the first guide portion 66a in the sliding direction of the loading cam plate 53 is formed on the rear surface side in the sliding direction, i.e., the direction of the arrow $f_1$, it means that the loading arm 51 can start retracting the optical disk 2 before the user inserts the disk that much from the disk insertion/removal port 19, i.e., the user is not required to insert the optical disk 2 that much.

Figure 13:
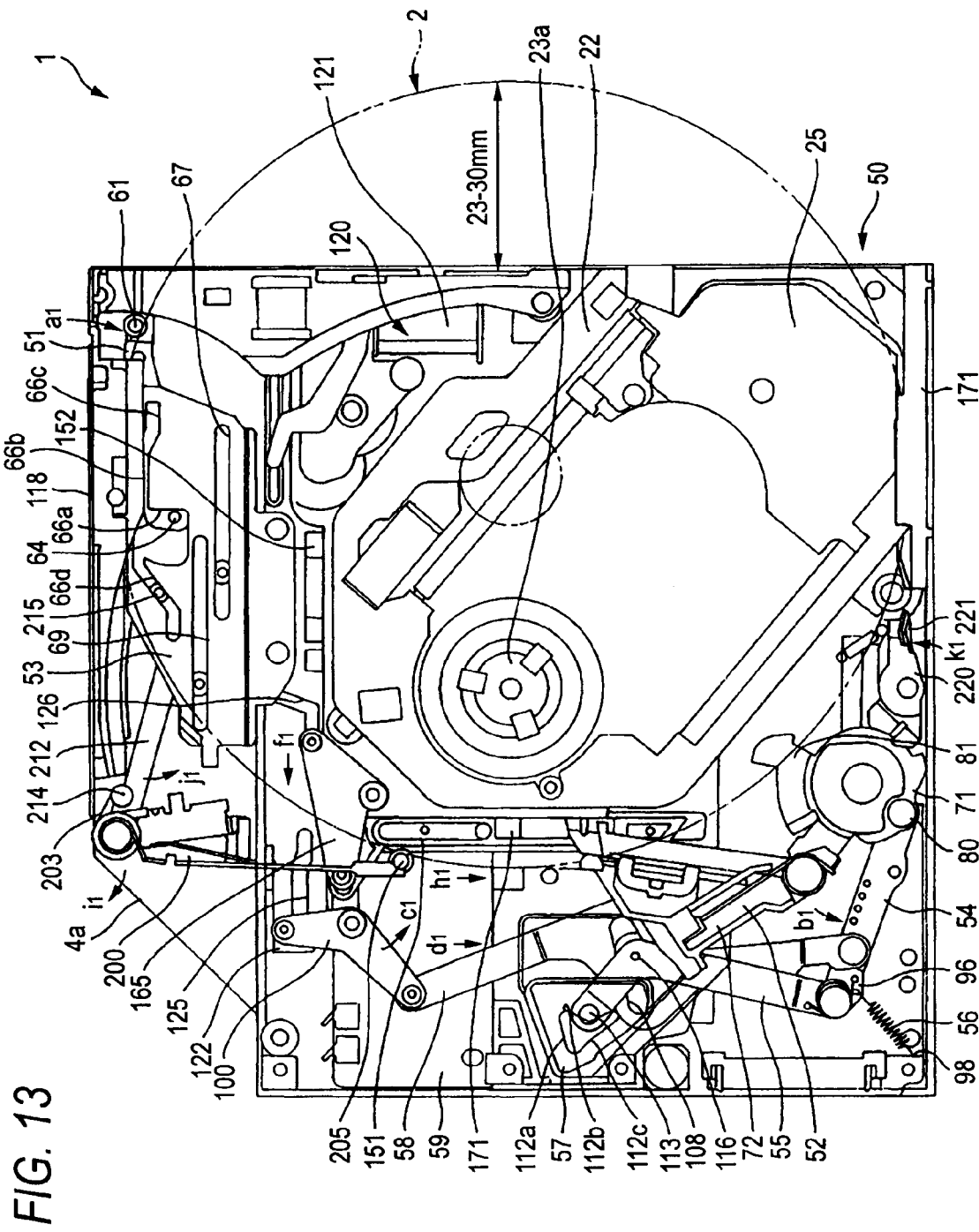
FIG. 13 is a plan view of the disk drive apparatus getting started with retraction of an optical disk using a loading arm.

In consideration thereof, in the disk transfer mechanism 50, to prevent any possible disturbance by the loading arm 51 for the operation of ejecting the optical disk 2, and to enable early retraction of the optical disk 2, the first guide portion 66a of the loading cam plate 53 is defined by position for formation, and the second guide portion 66b thereof is defined by length. As a design possibility for the disk drive apparatus 1, as shown in FIG. 13, if with an optical disk with the diameter of 12 cm, the loading arm 51 may be allowed to retract the optical disk when the disk is inserted to the position with 23 mm to 30 mm from the disk insertion/removal port 19 to the rear side surface of the optical disk in the insertion direction. As such, in the disk drive apparatus 1, the position of retracting the optical disk 2 may be placed away from the disk insertion/removal port 19 so that the user insertion distance can be reduced. The user thus finds that the sense of use is better because he or she has no need to insert the optical disk 2 as far as it goes in the cabinet 3.

The first cam groove 66 formed to the loading cam plate 53 may be a determination factor for the timing for the loading arm 51 of retracting the optical disk 2 in the insertion direction, i.e., the direction of the arrow $a_1$, and the timing for the loading arm 51 to rotate in the ejection direction, i.e., the direction of the arrow $a_2$, during the operation of ejecting the optical disk 2 by the ejection arm 52. This loading cam plate 53 is operated by the reciprocating movement in the insertion and removal direction, i.e., the directions of the arrows $f_1$ and $f_2$, of the slider 122 during retraction and ejection of the optical disk 2. Also during retraction and ejection of the optical disk 2, the slider 122 is moved to slide along the same route at the same speed for the same amount. Therefore, for retraction and ejection of the optical disk 2, the rotation amount of the loading arm 51 in the directions of the arrows $a_1$ and $a_2$ is set equal to the sliding amount of the slider 122 and that of the loading cam plate 53. The rotation of the loading arm 51 in the direction of the arrow $a_1$ and the rotation thereof in the direction of the arrow $a_2$ are defined, uniquely, by the slide position of the slider 122 and that of the loading cam plate 53.

On the other hand, the ejection arm 52 for rotating the optical disk 2 in the ejection direction, i.e., the direction of the arrow $b_2$, varies in the rotation amount, i.e., the rotation amount during the insertion of the optical disk 2 in the insertion direction, i.e., the direction of the arrow $b_1$, with respect to the sliding amount of the slider 122 is set different from the rotation amount during the ejection of the optical disk 2 in the ejection direction, i.e., the direction of the arrow $b_2$, with respect to the sliding amount of the slider 122. This is because, for retraction of the optical disk 2, the ejection arm 52 is already rotated in the insertion direction, i.e., the direction of the arrow $b_1$, to some degree by the user insertion before the slider 122 is driven. For the ejection of the optical disk 2, however, the optical disk 2 is to be ejected after covering the distance including the length inserted by the user. That is, this is because, irrespective of the fact that the sliding amount of the slider 122 is the same for retraction and ejection of the optical disk 2, the ejection arm 52 to be rotated in accordance with the sliding movement of the slider 122 varies in rotation amount.

For insertion and ejection of the optical disk 2, such a difference of the timing of rotating the ejection arm 52 in response to the movement of the slider 122 results from the restriction applied to the second link arm 55 by the loop cam 57 in terms of movement path from insertion to ejection of the optical disk 2. The second link arm 55 is being coupled to the rotation support member 71 of the ejection arm 52 via the first link arm 54. That is, in the state that the slider 122 is not driven, when the ejection arm 52 is rotated in the direction of the arrow $b_1$ in response to the insertion of the optical disk 2 from the disk insertion/removal port 19, the second link arm 55 is guided by the insertion guide wall 112a. In response to the slider 122 being driven from the front surface to the rear surface of the cabinet 3, when the optical disk 2 is retracted to the disk loading section 23 because the ejection arm 52 is rotated more in the direction of the arrow $b_1$, the second link arm 55 is guided by the retraction guide wall 112b. In response to the slider 122 being driven from the rear surface to the front surface of the cabinet 3, when the optical disk 2 is directed from the disk loading section 23 to the disk insertion/removal port 19 for ejection because the ejection arm 52 is rotated in the direction of the arrow $b_2$, the second link arm 55 is guided by the ejection guide wall 112c, and then is moved to the insertion guide wall 122a. As such, the movement amount of the second link arm 55 to be guided by the loop cam 57 with respect to the movement amount of the slider 122 for insertion and retraction of the optical disk 2 is so set as to be different from the movement amount of the second link arm 55 to be guided by the loop cam 57 with respect to the movement amount of the slider 122 for ejection of the optical disk 2.

As such, although the loading arm 51 and the ejection arm 52 are both rotated in accordance with the sliding operation of the slider 122, there is a difference therebetween. That is, the loading arm 51 is operated by the loading cam plate 53, which linearly reciprocates together with the slider 122. On the other hand, the ejection arm 52 is under the control, in terms of movement path, of the second link arm 55 with the circular path unlike the slider 122 with the reciprocating path. Also in such a disk transfer mechanism 50, it is possible to uniquely define, with respect to the reciprocating path of the slider 122, the path of the guide convex section 113 of the second link arm 55 moving around the guide groove 114 of the loop cam 57. The rotation timing can be synchronized for the loading arm 51 and the ejection arm 52 with respect to the reciprocating movement of the slider 122.

Exemplified here is a case of forming narrow and small the guide groove 114 of the loop cam 57 along which the guide convex section 113 of the second link arm 55 slides, i.e., with no margin for the path of the guide convex section 113 that moves in accordance with the movements of the ejection arm 52 and the slider 122 during insertion and ejection of the optical disk 2. In this case, the guide convex section 113 is not moved smoothly due to the precision error, mounting error, aging, and others of the loop cam 57 and various types of arms. There is also a possibility that the guide convex section 113 cannot be moved around the guide groove 114. As such, in the loop cam 57, the guide groove 114 is required to be formed with a width enough for the rotation of the guide convex section 113 to move therearound.

If the guide groove 114 is formed with such a width, however, there is a possibility of losing the precision for the second link arm 55 and the ejection arm 52 to follow the movement of the slider 122. For ejection of the optical disk 2, for example, there will be no timing synchronization between sliding movement of the second link arm 55 with respect to the ejection guide wall 112c, and the sliding movement of the loading cam plate 53 in response to the sliding movement of the slider 122. The second link arm 55 is moved to slide via the operation arm 58 and the first link arm 54 as the slider 122 is moved in the direction of the arrow $f_2$. There will be no timing synchronization also between the rotation movement of the ejection arm 52 in the direction of the arrow $b_2$, and the rotation movement of the loading arm 51 to be rotated in the direction of the arrow $a_2$ in response to the sliding movement of the slider 122. Due to such no timing synchronization, the loading arm 51 may not open when the optical disk 2 is about to be ejected by the ejection arm 52, and this may prevent the ejection of the optical disk 2.

For the aim of absorbing any such difference between the ejection timing of the ejection arm 52 and the opening timing of the loading arm 51, and for the aim of enabling smooth ejection of the optical disk 2 by the ejection arm 52, the insertion hole 60 drilled to the loading arm 51 is shaped long in length for insertion of the rotation support member 63. With the insertion hole 60 shaped long in length as such, the rotation pivot of the loading arm 51 is to be moved along the longitudinal direction of the insertion hole 60. Therefore, when biased in the direction of the arrow $a_2$ by the optical disk 2 pressed by the ejection arm 52, the loading arm 51 is allowed to rotate in the same direction because the rotation pivot thereof moves. As such, even if there is no timing synchronization between the rotation of the ejection arm 52 and the rotation of the loading arm 51 after the stroke of the slider 122, no disturbance is caused for the ejection of the optical disk 2.

In a case with an early timing of retracting the optical disk 2 by increasing the length of the second guide portion 66*b* with a configuration that the first guide portion 66*a* of the first cam groove 66 formed to the loading cam plate 53 is provided to the rear surface side of the cabinet 3, with the insertion hole 60 of the loading arm 51 formed long in length, it becomes possible to prevent the timing delay for the loading arm 51 to open in the direction of the arrow $a_2$ at the time of ejection of the optical disk 2.

That is, the loading arm 51 is rotated in the direction of the arrow $a_1$, i.e., the direction of retracting the optical disk 2 into the cabinet 3, by the engagement convex section 64 being pressed by the first guide portion 66*a* of the first cam groove 66. In this sense, if the loading arm 51 is made to come in contact with the first guide portion 66*a* at the earliest possible timing after the slider 122 starts moving to slide, the insertion distance by a user can be shortened for the optical disk 2. On the other hand, the loading arm 51 is allowed to move in the direction of the arrow $a_2$, i.e., the direction of ejecting the optical disk 2 to the outside of the cabinet 3, by the engagement convex section 64 being moved along the first guide portion 66*a* after being guided by the second guide portion 66*b* of the first cam groove 66. In this sense, with the second guide portion 66*b* formed long in length, the loading arm 51 is not allowed to rotate in the direction of the arrow $a_7$ unless the engagement convex section 64 is not moved to the side of the first guide portion 66*a* in the state that the ejection arm 52 is being rotated in the direction of the arrow $b_2$, i.e., the direction of ejecting the optical disk 2. If this is the case, the optical disk 2 is prevented from being ejected.

As a solution therefor, if the insertion hole 60 is formed long in length, the rotation pivot is displaced in position so that the loading arm 51 becomes able to rotate in the direction of the arrow $a_2$, thereby preventing any timing delay for the loading arm 51 of opening in the direction of the arrow $a_2$ at the time of ejection of the optical disk 2.

Note here that such configuration, i.e., the loading arm 51 is provided with the insertion hole 60 shaped long in length, and the rotation support member 63 is provided on the deck portion 4*a*, is not restrictive, and alternatively, the loading arm 51 may be rotatably supported by being provided with the cylindrically-shaped rotation support member 63 as a protrusion, and by forming the long-in-length insertion hole 60 to the deck portion 4*a*.

In the disk transfer mechanism 50, realizing a mistake or others, if a user abruptly grasps the optical disk 2 being inserted by a predetermined level with the drive motor 121 in motion, the drive motor 121 is stopped and is reversely driven so that the optical disk 2 is ejected.

More in detail, when the drive motor 121 is driven in response to the insertion of the optical disk 2 from the disk insertion/removal port 19 by a predetermined level, the slider 122 and the loading cam plate 53 start moving in the direction of the arrow $f_1$ so that the loading arm 51 is rotated in the direction of the arrow $a_1$. At this point in time, if a user grasps the optical disk 2, the rotation of the loading arm 51 is restricted, and the loading cam plate 53 is moved to slide in the direction of the arrow $f_1$ with the slider 122. As a result, the engagement convex section 64 protruded from the loading arm 51 is latched by the first guide portion 66*a* of the loading cam plate 53. This latching accordingly restricts the sliding movement of the slider 122 and that of the loading cam plate 53 in the direction of the arrow $f_1$. If a predetermined length of time passes the way it is, the drive motor 121 is driven in the reverse direction, and the optical disk 2 is ejected in the process reverse in order of inserting the optical disk 2 described above.

At this time, with the optical disk 2 inserted by a predetermined level, the guide convex section 113 of the second link arm 55 is moved to slide along the insertion guide wall 112*a* of the loop cam 57. The latch section 96 of the first link arm 54 and the latch section 98 of the main chassis 6 are thus moved in the direction to be away from each other, and the extension spring 56 placed thereacross is extended. As such, after the slider 122 is completely moved to slide in the direction of the arrow $f_2$ with the drive motor 121 driven in the reverse direction, the first link arm 54 receiving the biasing force of the extension spring 56 is rotated so that the ejection arm 52 is rotated in the direction of the arrow $b_2$. Therefore, in the disk drive apparatus 1, the ejection arm 52 is biased by the extension spring 56 to rotate in the direction of the arrow $b_2$, i.e., the direction of ejecting the optical disk 2 to the outside of the disk insertion/ejection port 19, and with the biasing force of the extension spring 56, the optical disk 2 is ejected.

As such, the guide convex section 113 of the second link arm 55 passes by the insertion guide wall 112*a* in the opposite direction without passing by the side of the ejection guide wall 112*c*. The sliding movement of the slider 122 in the direction of the arrow $f_2$ is not thus enough to rotate the ejection arm 52 to the ejection position but the biasing force of the extension spring 56 stored at the time of insertion of the optical disk 2 will rotate the ejection arm 52 to the ejection position. This accordingly prevents, when the optical disk 2 is grasped when it is loaded, the optical disk 2 being left halfway visible from the disk insertion/removal port 19 by the drive motor 121 stopped in operation.

Note here that such abnormal transfer of the optical disk 2 can be detected by a microcomputer monitoring the depression states of the first to fourth switches SW1 to SW4 equipped to the circuit board 59. That is, the optical disk 2 is determined as being abnormally transferred when the time for the slider 122 to move is longer than a predetermined time, e.g., 3 seconds or more, before the base unit 22 is detected as being moved down to the chucking release position after the first switch SW1 is depressed by the ejection arm 52, or when the time takes a predetermined time or longer for the base unit 22 to be moved to the recording/reproduction position from the chucking release position via the chucking position. In response to such a detection, the drive motor 121 is stopped in operation or is reversely driven so that the optical disk 2 is ejected.

When the optical disk 2 is to be ejected, when there is any obstacle, e.g., book, disposed before the disk insertion/removal port 19, the optical disk 2 abuts against the obstacle and thus is not ejected. With this being the case, any excess load is imposed on the drive motor 121 of the drive mechanism 120. Moreover, this also imposes any excess load on the optical disk 2 because the ejection arm 52 to be rotated in response to the driving force of the drive motor 121 grips the optical disk 2 with the obstacle.

As shown in FIG. 23, in the disk drive apparatus 1, the rotation support member 71 of the ejection arm 52 and the push-out arm 72 are engaged by the crimp shaft 89 rotatably in the directions of the arrows $b_1$ and $b_2$ around the aperture section 77 and the engagement convex section 85. The rotation support member 71 of the ejection arm 52 and the push-out arm 72 are also biased by the coil spring 73 in the direction of the arrow $b_2$ by a predetermined force. As such, at the time of ejection of the optical disk 2, even if any obstacle is disposed at a position disturbing the ejection of the optical disk 2, and if the ejection arm 52 is put under the force of the direction opposite to the ejection direction of the optical disk 2, i.e., the direction of the arrow $b_2$, the push-arm 72 receiving the force of the opposite direction is rotated in the direction of the arrow $b_1$ so that the drive motor 121 and the optical disk 2 can be free from any excess load.

When the push-out arm 72 of the ejection arm 52 is rotated in the direction of the arrow $b_1$ as such, the disk drive apparatus stops the operation of the drive motor 121. When a predetermined length of time passes the way it is, i.e., an obstacle is disposed in front of the disk insertion/removal port 19 and blocks the ejection of the optical disk 2, the optical disk 2 is retracted again to the side of the disk loading section 23. That is, when the optical disk 2 is ejected from the disk insertion/ejection port 19 to the outside, and when the ejection of the optical disk 2 is stopped for a predetermined length of time by the optical disk 2 abutting against, at one side surface, the obstacle, the drive motor 121 starts driving in the reverse direction. As a result, the above-described components, i.e., the first and second link arms 54 and 55 and the operation arm 58, are moved in the direction opposite to the direction above so that the loading operation is executed for the optical disk 2. Note that, also in this case, the guide convex section 113 of the second link arm 55 passes by the ejection guide wall 112c in the opposite direction. The first link arm 54 and the latch section 98 of the main chassis 6 are thus moved without being away from each other, and thus the extension spring 56 is not extended so that no biasing force is exerted on the ejection arm 52 in the ejection direction.

As such, in the disk drive apparatus 1, the optical disk 2 is not left with a grip between the obstacle and the ejection arm 52 rotating in the ejection direction. This favorably prevents the drive motor 121 and the optical disk 2 from being put under any excess load.

Note here that such abnormal transfer of the optical disk 2 can be detected by a microcomputer monitoring the depression states of the first to fourth switches SW1 to SW4 equipped to the circuit board 59. That is, the optical disk 2 is determined as being abnormally transferred when the time takes a predetermined time or longer, e.g., 3 seconds or more, for the slider 122 to move before, after the drive motor 121 is driven in the reverse direction, the base unit 22 is moved down to the chucking release position from the recording/reproduction position via the chucking position, or when the time takes a predetermined time or longer for the base unit 22 to be moved before, after moved down to the chucking release position, the first to fourth switches SW1 to SW4 are entirely depressed. In response to such detection, the drive motor 121 is stopped in operation or is driven in the forward direction so that the optical disk 2 is loaded.

Note that the loop cam 57 includes a large movable area 114a for the guide convex section 113 each in the extension directions of the insertion guide wall 112a and the retraction guide wall 112b of the guide groove 114. The movable area 114a is provided for protecting the disk drive mechanism 50 from damage by a possible collision between the guide convex section 113 and the outer rim section 112d of the loop cam 57 if the optical disk 2 is inserted into the far depth of the cabinet 3 when the disk drive apparatus 1 is not turned on. The movable area 114a covers the maximum possible area for the guide convex section 113 to move in response to the insertion of the optical disk 2.

Figure 35:
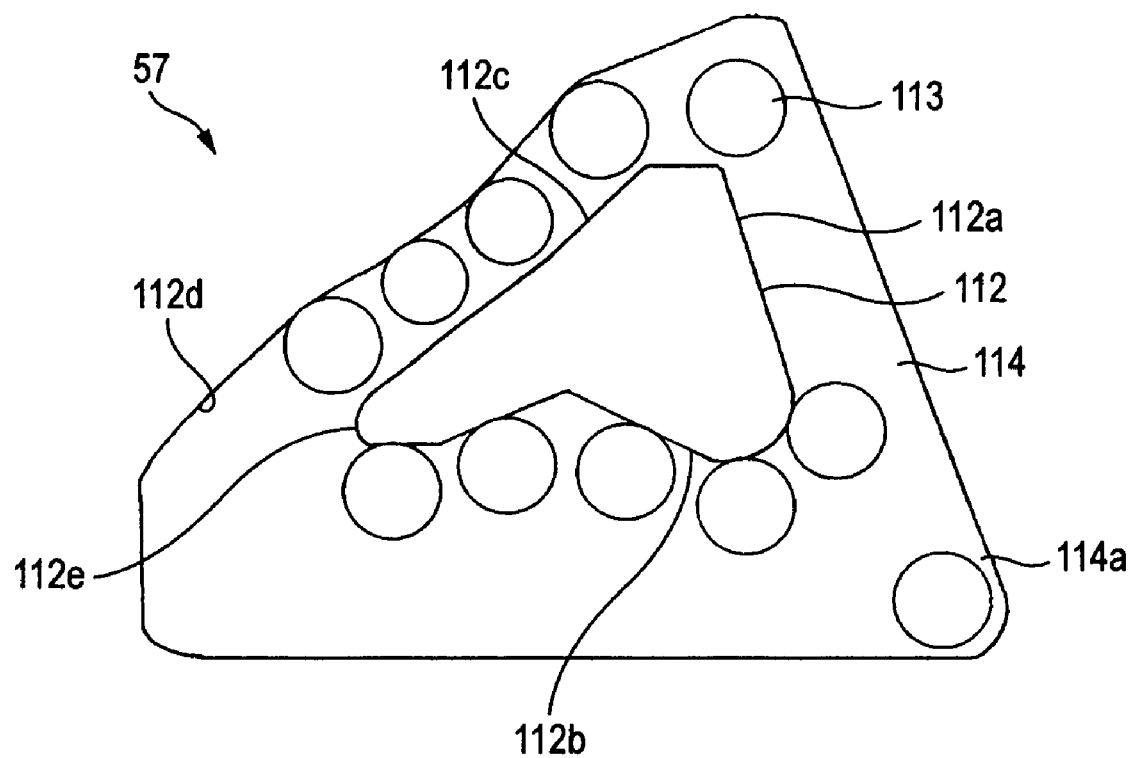
FIG. 35 is a plan view of a guide convex section, showing the movement path thereof in a loop cam.

That is, as shown in FIG. 35, when the optical disk 2 is inserted with the disk drive apparatus 1 being turned on, the drive motor 121 is driven, and the guide convex section 113 moves the retraction guide wall 112b to the side of the ejection guide wall 112c. Such movement of the guide convex section is responded to the sliding movement of the slider 122 in the direction of the arrow $f_1$ and the movement of the operation arm 58 in the direction of the arrow $d_1$. On the other hand, when the disk drive apparatus 1 is not turned on, the drive motor 121 is not driven even if the optical disk 2 is inserted to the far depth of the cabinet 3. The guide convex section 113 is not thus moved to the side of the ejection guide wall 112c by the operation arm 58 and the second link arm 55. As a result, if a user pushes the optical disk 2 deeper than the position at which the disk is supposed to be retracted, the ejection arm 52 is rotated more in the direction of the arrow $b_1$. This causes a collision with the outer rim section 112d due to a route off of the guide convex section 113 of the second link arm 55 from the guide groove 114. This collision thus puts, under the excess load, the loop cam 57, the first and second link arms 54 and 55, or the ejection arm 52.

In consideration thereof, the loop cam 57 keeps, as the movable area 114a, the maximum possible area for the guide convex section 113 to move when the optical disk 2 is inserted to the farthest depth of the cabinet 3 when the disk drive apparatus is not turned on. As such, the disk drive apparatus 1 can protect the disk transfer mechanism 50 from damage that is often caused by a collision between the guide convex section 113 and the loop cam 57, i.e., even if a user pushes the optical disk 2 to the farthest depth of the cabinet 3 when the disk drive apparatus is not turned on, and even if the user pushes the optical disk 2 to the farthest depth of the cabinet 3 without waiting for the loading arm 51 to retract the optical disk 2 even if the disk drive apparatus is turned on.

As described in the foregoing, according to the disk transfer mechanism 50 of the disk drive apparatus 1 to which the invention is applied, for insertion of the optical disk 2, in the user process of inserting the optical disk 2 to a predetermined position, the first link arm 54 and the latch section 98 of the main chassis 6 are guided in the direction of moving away from each other by the guide convex section 113 of the second link arm 55 sliding along the insertion guide wall 112a of the loop cam 57. This accordingly exerts, on the ejection arm 52, the ejection-direction biasing force of the extension spring 56 placed between the first link arm 54 and the latch section 98. This thus enables to prevent the optical disk 2 from being left in the cabinet 3 with a half insertion by a user stopping insertion of the optical disk 2 in the middle of the operation.

Further, for retraction of the optical disk 2, the guide convex section 113 is moved to slide along the retraction guide wall 112b of the loop cam 57 so that the first link arm 54 and the latch section 98 are moved to closer to each other. The operation arm 58 then rotates the ejection arm 52 in the retraction direction so that the ejection arm 52 is free from the ejection-direction biasing force of the extension spring 56. As such, the ejection arm 52 can be rotated in response to the operation of the slider 122 and the operation arm 58 received the driving force of the drive mechanism 120.

Still further, for ejection of the optical disk 2, the guide convex section 113 is moved to slide along the ejection guide wall 112c of the loop cam 57 so that, without causing the first link arm 54 and the latch section 98 to move away from each other, the ejection arm 52 can be rotated in the ejection direction by the amount depending on how much the slider 122 and the operation arm 58 are operated.

This enables the disk transfer mechanism 50 to eject the optical disk 2 in a stable manner to any predetermined stop position without relying on the elastic force but by the driving force of the drive mechanism 120. At the stop position, the center hole 2a of the optical disk 2 is ejected to the outside of the cabinet 3.

What is more, the disk transfer mechanism 50 has no system for, for ejection of the optical disk 2, rotating the ejection arm 52 utilizing the biasing force of the extension spring 56. An ejection lever receiving such a biasing force thus makes no noise when it abuts against the optical disk 2. The user thus finds that the sense of use is better because the disk drive apparatus 1 makes no noise when the optical disk 2 is ejected.

Described next is the deck arm 200 that prevents the small-diameter optical disk 101 from being erroneously inserted, and helps the large-diameter optical disk 2 to be centered. The deck arm 200 is provided to be ready for a case if a user erroneously inserts the small-diameter, e.g., diameter of 8 cm, optical disk 101 because the disk drive apparatus 1 is designed specifically for the large-diameter, e.g., diameter of 12 cm, optical disk 2.

Figure 36:
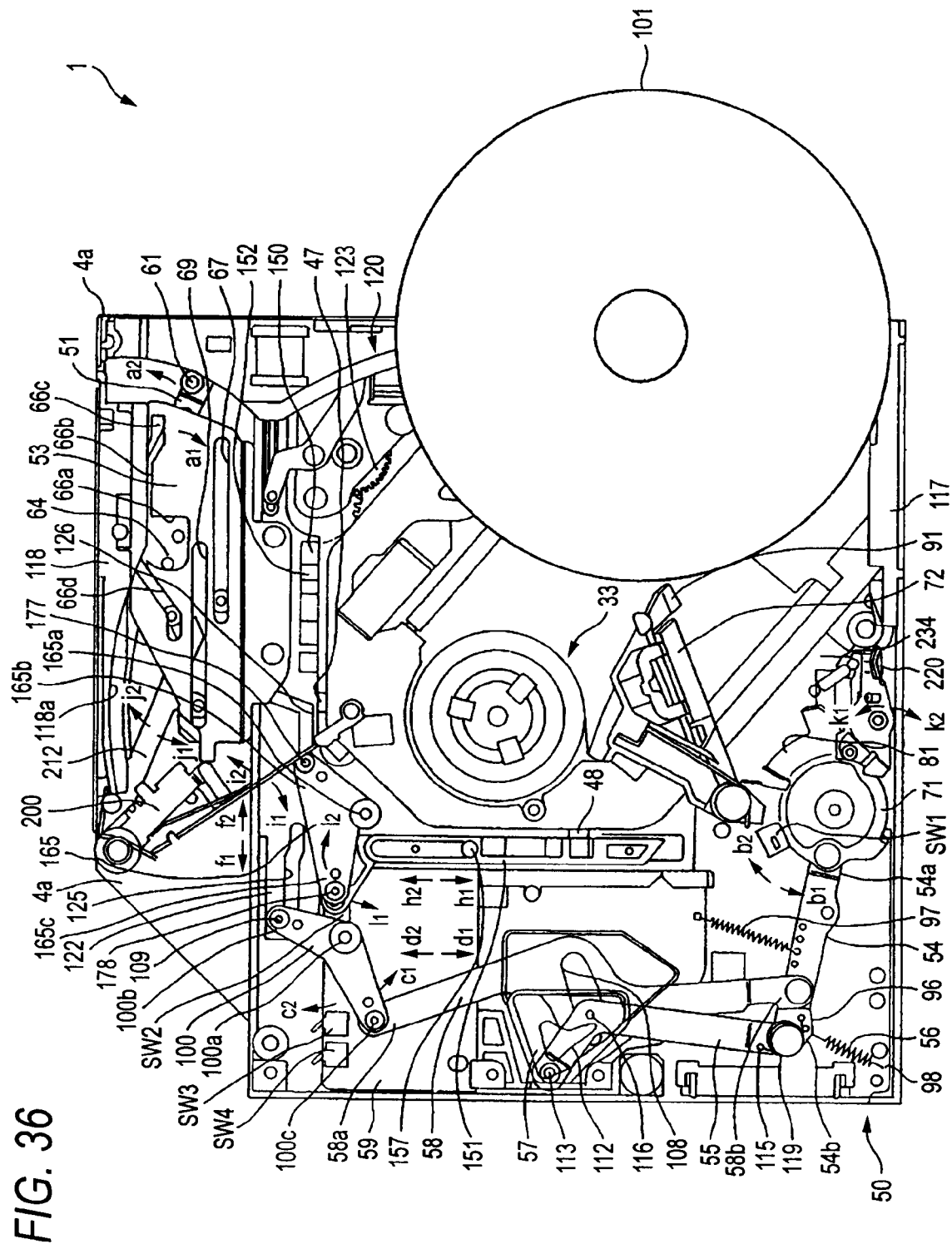
FIG. 36 is a plan view of the disk drive apparatus of preventing any erroneous insertion of a small-diameter disk using the ejection arm.

That is, when the small-sized disk 101 is abutted against the push-out arm 72 of the ejection arm 52, as shown in FIG. 36, the optical disk 101 is pushed back to the outside of the disk insertion/removal port 19 by the biasing force in the direction of the arrow $b_2$. The biasing force is of the extension spring 56 latched at the first link arm 54, or of the coil spring 73 engaged with the push-out arm 72. At this time, the ejection arm 52 is not rotated to the position at which the drive mechanism 120 is driven. However, when the small-sized disk 101 is inserted with a tilt toward the side of the loading arm 51, the disk 101 may be inserted to the far depth of the cabinet 3 with no abutting against the push-out arm 72 of the ejection arm 52, and may be left at the position outside of the rotation area of the ejection arm 52.

The deck arm 200 is thus provided to the deck portion 4a located on the side opposite to the ejection arm 52 to prevent the small-diameter disk 101 from being inserted to the far depth of the cabinet 3 even if it is inserted with a tilt toward the side of the loading arm 51.

Figure 37:
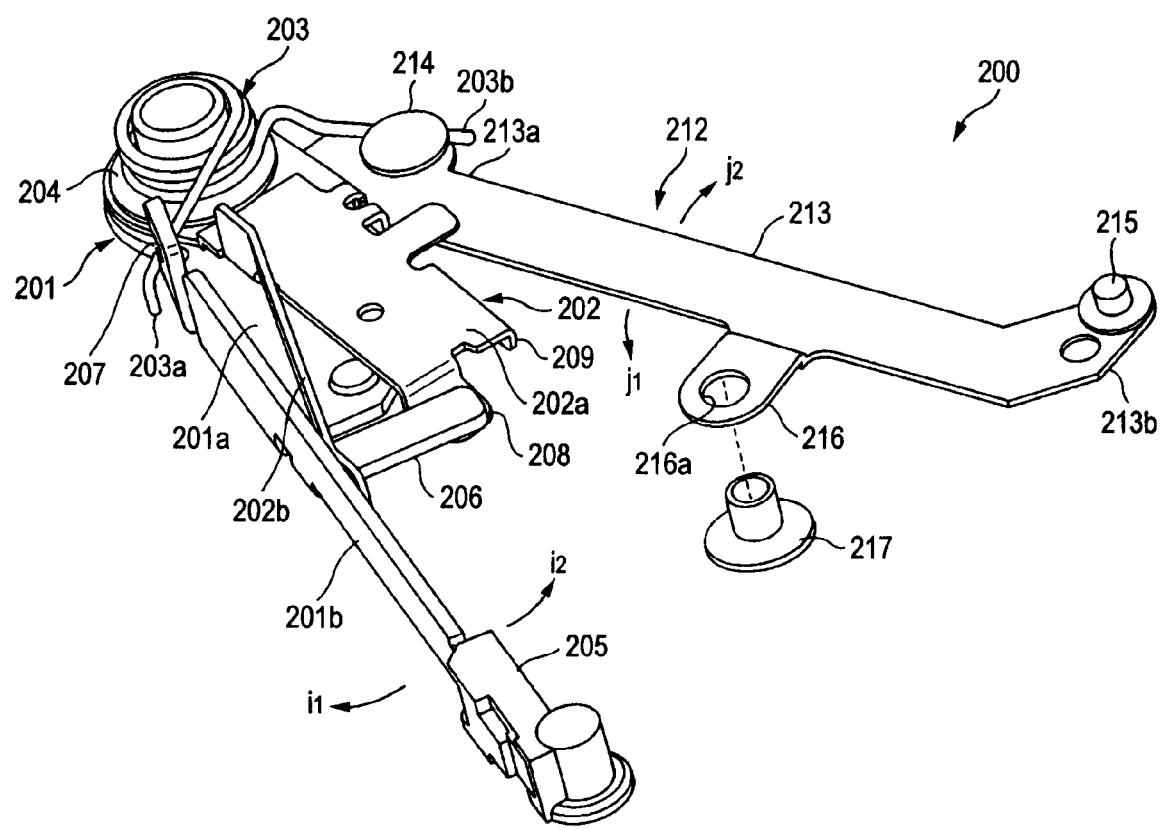
FIG. 37 is a perspective view of a deck arm and a restriction arm.

As shown in FIG. 11, such a deck arm 200 is rotatably provided above the deck portion 4a of the bottom case 4, and on the rear surface side of the cabinet 3. When on standby for insertion of the optical disk 2, the deck arm 20 is biased to rotate toward the side of the disk insertion/removal port 19, and when the small-diameter 101 is inserted, this biasing force is enough to eject the disk 101 to the outside of the disk insertion/removal port 19. To be specific, as shown in FIG. 37, the deck arm 200 is provided with an arm member 201, a press plate 202, and the coil spring 203, and the arm member 201 and the press plate 202 are rotatably attached by a crimp shaft 204 to the deck portion 4a. The arm member 201 is abutted against the optical disk 2 and the small-diameter disk 101 by being rotatably supported by the deck portion 4a. The press plate 202 presses the arm member 201 by being supported coaxially thereto. The coil spring 203 serves to bias the arm member 201 to rotate.

The arm member 201 is provided with a rotation plate 201a shaped substantially like a rectangular plate, and an arm portion 201b. The arm portion 201b is provided upright on the rotation plate 201a from one side edge in the longitudinal direction, and is extended in the longitudinal direction. At the tip end of the arm section 201b, an abutment member 205 is provided for abutting against the optical disk 2 or the small-diameter disk 101. The rotation plate 201a is provide with a rotation support section at one end in the longitudinal direction to be supported by the deck portion 4a, and at the other end, a guide piece 206 is provided for guiding the press plate 202 to rotate. The arm portion 201b is formed with a slit 207 at an end portion on the side of the rotation support section in the longitudinal direction for latching of an end 203a of the coil spring 203.

The press plate 202 to be supported coaxially to the arm member 201 is provided for the aim of, when the optical disk 2 is loaded to the turntable 23a, moving the arm member 201 away from the outer regions of the disk without fail. The press plate 202 includes a main surface portion 202a and a press arm 202b. The main surface portion 202a is disposed over the rotation plate 201a of the arm member 201. The press arm 202b is formed upright on the main surface portion 202a from one side edge on the side of the arm portion 201b, and presses the arm portion 201b. The main surface portion 202a is shaped substantially like a rectangle, and is provided with, at one end in the longitudinal direction, a rotation support section to be supported by the deck portion 4a with the arm member 201. At the other end of the main surface portion 202a, a guide convex section 208 is protruded to be guided by the guide piece 206 formed to the rotation plate 201a of the arm member 201. The press plate 202 is prevented from being isolated, upward, from the rotation plate 201a by the guide convex section 208 being guided by the guide piece 206. The press plate 202 is formed with an abutting section 209 at a side edge portion opposite to the side edge provided with the press arm 202b for abutting at the tip end portion of the loading cam plate 53, which is moved to slide in the direction of the arrow $f_1$. The deck arm 200 is rotated in the direction of an arrow $i_1$ by an abutting piece 209 being pressed by the loading cam plate 53, and the abutting member 205 disposed at the tip end of the arm portion 201b is moved away from the outer surface of the optical disk 2.

The press arm 202b provided upright on the main surface portion 202a is extended to the side of the arm member 201, and the tip end thereof is abutted against the arm portion 201b of the arm member 201. Such a press arm 202b is provided for pressing the arm portion 201b in the direction of the arrow $i_1$ when the main surface portion 202a of the press plate 202 is pressed against the loading cam plate 53.

The arm member 201 and the press plate 202 are rotatably supported on the deck portion 4a by the crimp shaft 204. This crimp shaft 204 is wound with the coil spring 203, which serves to always bias the arm member 201 and the press plate 202 to rotate in the direction of an arrow $i_2$, i.e., the ejection direction of the optical disk 2. Such a coil spring 203 is latched, at the end 203a, by a slot 207 of the arm portion 201b, and the other end 203b is latched by the restriction arm 212, which serves to restrict the biasing force of the coil spring 203.

The restriction arm 212 is provided for the aim of, when the deck arm 200 is rotated in the direction of the arrow i.e., on the rear surface side of the cabinet 3, preventing the increase of the biasing force in the direction of the arrow $i_1$ by moving the end 203b of the coil spring 203. This restriction arm 212 is provided with an arm body 213, a spring latch section 214, and a rotation guide section 215. The arm body 213 is rotatably attached onto the deck portion 4a as is the deck arm 200. The spring latch section 214 is provided on the side of one end 213a of the arm body 213 for latching of the end 203b of the coil spring 203. The rotation guide section 215 is provided on the side of the other end 213b of the arm body 213 for engagement with the fourth guide portion 66d of the first cam groove 66 formed to the loading cam plate 53.

The arm body 213 is shaped long in length, and is formed with, at substantially the middle in the longitudinal direction, an insertion piece 216 for insertion of the rotation support pin 217. The rotation support pin 217 is the one latching the arm body 213 at the deck portion 4a to be able to freely rotate. The insertion piece 216 is drilled with an insertion hole 216a for insertion of the rotation support pin 217. With the rotation support pin 217 inserted into the insertion piece 216, the arm body 213 is latched at the deck portion 4a rotatably about the insertion piece 216. The rotation support pin 217 is protruded onto the deck portion 4a via the insertion hole 216a, thereby being inserted into the third cam groove 69 for guiding the sliding movement of the loading cam plate 53. The third cam groove 69 is the one formed parallel to the sliding movement of the loading cam plate 53.

At the spring latch section 214 formed at the end 213a of the arm body 213, the end 203b of the coil spring 203 is latched. This latching allows the coil spring 203 to keep a predetermined space between the arm member 201 and the restriction arm 212. The arm member 201 is being latched, at the end 203a, by the slit 207 of the arm portion 201b. When the rotation of the restriction arm 212 is restricted because the arm member 201 is rotated in the direction of the arrow $i_1$ due to the insertion of the optical disk 2, the end 203a of the coil spring 203 is moved in the direction to be away from the other end 203b around a winding portion 203c inserted through the crimp shaft 204. The end 203a is being latched by the slit 207 of the arm portion 201b. As a result, because the end 203a of the coil spring 203 is biased toward the side of the other end 203b, the arm portion 201b of the arm member 201 receiving the biasing force is thus biased in the direction of an arrow $i_2$, i.e., the front side of the cabinet 3, as the optical disk 2 is inserted into the cabinet 3. As such, because the deck arm 200 receiving the biasing force of the coil spring 203 is provided with the biasing force in the ejection direction, the deck arm 200 can remove the erroneously-inserted small-diameter disk 101 from the cabinet 3.

As shown in FIG. 21, when inserted into the fourth guide portion 66d of the loading cam plate 53, the rotation guide section 215 provided to the end 203b of the arm body 213 rotates the restriction arm 212 in accordance with the sliding movement of the loading cam plate 53 in the directions of the arrows $f_1$ and $f_2$, and exercises control over the biasing force of the coil spring 203. That is, in the rotation guide section 215, as shown in FIGS. 13, 14, and 15, when the loading cam plate 53 is moved to slide in the direction of the arrow $f_1$ with the slider 122 responding to the insertion of the optical disk 2, the arm body 213 is rotated about the insertion piece 216 with the guide by the fourth guide portion 66d. In response thereto, the spring latch section 214 is rotated in the direction of an arrow $j_1$ following the deck arm 200 rotating in the direction of the arrow $i_1$. By the spring latch section 214 following the movement of the deck arm 200 as such, in the coil spring 203, the end 203a being latched by the arm portion 201b is not moved away from the other end 203b latched by the spring latch section 214. The biasing force is not thus increased even if the deck arm 200 is rotated in the direction of the arrow $i_1$. As such, by the restriction arm 212 following the rotation of the deck arm 200, the biasing force of the coil spring 203 can be remained the same in level for biasing the arm member 201 in the ejection direction, and the operation of the loading arm 51 of retracting the optical disk 2 is not disturbed that much.

As shown in FIG. 18, when the loading cam plate 53 is moved to slide in the direction of the arrow $f_2$, the rotation guide section 215 is rotated with the guide by the fourth guide portion 66d, and the spring latch section 214 is rotated in the direction of an arrow $j_2$. At this time, the deck arm 200 is also biased by the biasing force of the coil spring 203 in the direction by which the end 203a is moved closer to the other end 203b so that the arm member 201 is rotated in the direction of the arrow $i_2$. When the optical disk 2 is ejected, and when the spring latch section 214 is stopped rotating in the direction of the arrow $j_2$, the deck arm 200 is rotated to the initial position to be on standby for insertion of the optical disk 2.

The abutting member 205 provided at the tip end of the arm portion 201b is made of a resin softer than the optical disk 2. The center portion of the abutting member 205 is curved inward for abutting against the outer regions of the optical disk 2 inserted from the disk insertion/removal port 19, and the lower end portion is increased in diameter to serve as a flange portion to restrict the movement of the optical disk 2 in the height direction.

Described next is the operation of such a deck arm 200 and a restriction arm 212 for insertion, retraction, and ejection of the optical disk 2. As shown in FIG. 11, when on standby for insertion of the optical disk 2, the rotation guide section 215 is guided by the fourth guide portion 66d of the loading cam plate 53 so that, in the restriction arm 212, the spring latch section 214 is rotated in the direction of the arrow $j_2$. In the deck arm 200, by the spring latch section 214 being rotated in the direction of the arrow $j_2$, the arm member 201 being biased by the end 203a of the coil spring 203 is rotated in the direction of the arrow $i_2$. At this time, the deck arm 200 is restricted not to rotate in the direction of the arrow $i_2$ because the guide piece 206 is abutted, at the tip end portion, against the tip end of the loading cam plate 53.

Figure 38:
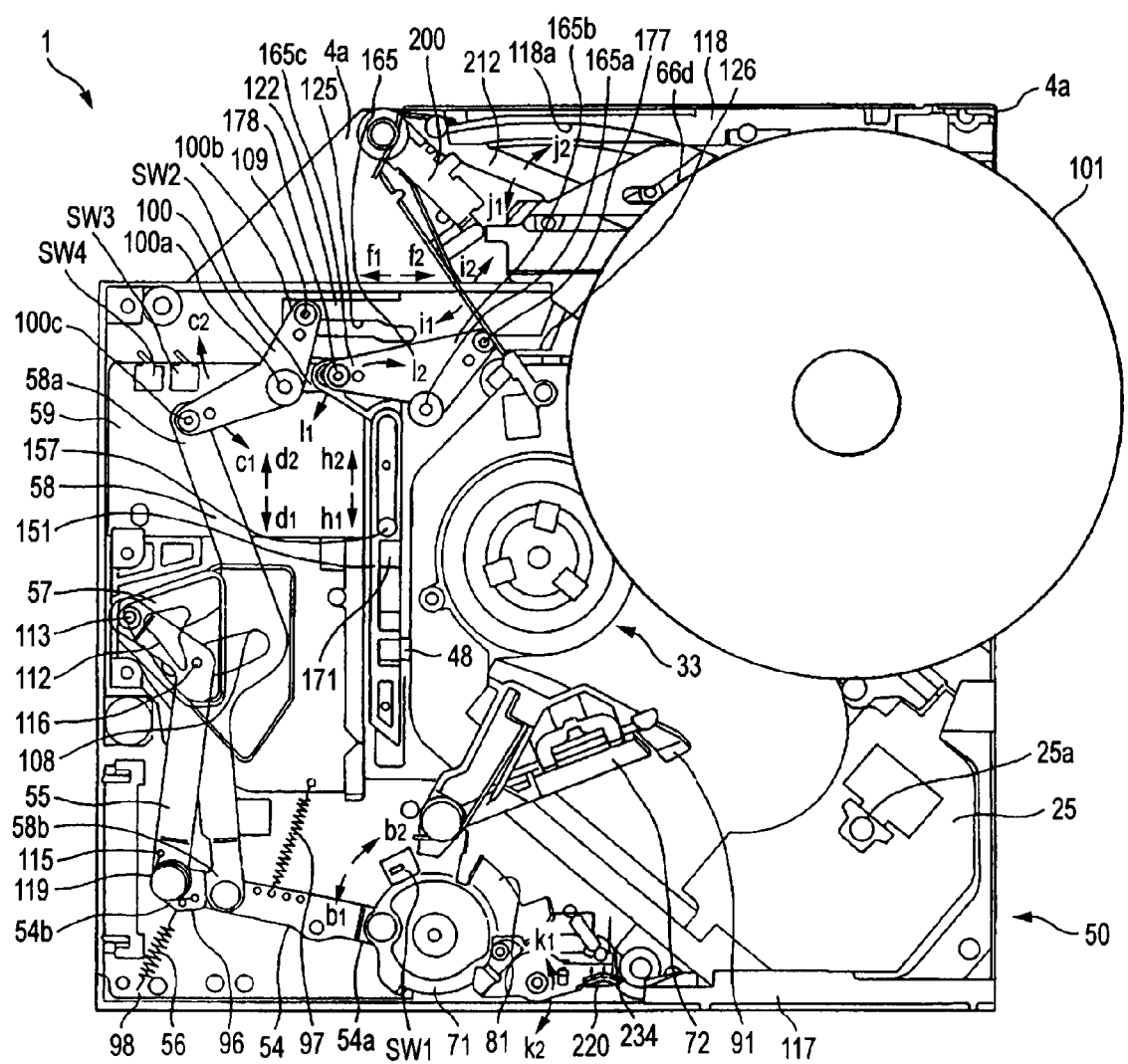
FIG. 38 is a plan view of the disk drive apparatus of preventing any erroneous insertion of the small-diameter disk using the deck arm.

When on standby for insertion of the optical disk 2, as to the ejection arm 52 and the deck arm 200, at least either the push-out arm 72 or the abutting member 205 is allowed to abut against the small-diameter disk 101 inserted from the disk insertion/removal port 19. As shown in FIG. 38, when the small-diameter disk 101 is inserted into the cabinet 3 with a tilt toward the side of the deck portion 4a, in the deck arm 200, the abutting member 205 is pressed by the small-diameter disk 101 so that the arm portion 201b is rotated in the direction of the arrow $i_1$. As a result, the end 203a of the coil spring 203 being latched by the arm portion 201b is moved away from the other end 203b being latched by the spring latch section 214, whereby the biasing force of the coil spring 203 is generated in the direction of the arrow $i_2$, i.e., the ejection direction, for the deck arm 200. The drive mechanism 120 is not driven even if the small-diameter disk 101 is entirely inserted from the disk insertion/removal port 19, and thus the disk 101 is ejected by the deck arm 200 to the outside of the cabinet 3. As such, even if the small-diameter disk 101 is erroneously inserted, the small-diameter disk 101 is not left in the cabinet 3 but can be ejected without fail.

When the large-diameter optical disk 2 is inserted, the deck arm 200 is pressed by the optical disk 2 so that the arm member 201 is rotated in the direction of the arrow $i_1$. As shown in FIG. 12, in the process of inserting the optical disk 2, the drive mechanism 120 is not driven, and the slider 122 and the loading cam plate 53 are not thus moved to slide, and thus the spring latch section 214 of the restriction arm 212 is not rotated. Therefore, when the arm member 201 is rotated in the direction of the arrow $i_1$, in the coil spring 203, the end 203a latched by the arm member 201 is moved away from the other end 203b latched by the spring latch section 214 so that the deck arm 200 is provided with the biasing force in the direction of the arrow $i_2$.

Then in the process of retracting of the optical disk 2, as the slider 122 moves to slide in the direction of the arrow $f_1$, the loading cam plate 53 is moved to slide in the same direction. As shown in FIGS. 13, 14, and 15, when the loading cam plate 53 is moved to slide, the loading arm 51 accordingly retracts the optical disk 2. This rotates the deck arm 200 more in the direction of the arrow $i_1$, and the restriction arm 212 is guided by the fourth guide portion 66d of the first cam groove 66, thereby rotating about the insertion hole 216. With such rotation, the spring latch section 214 is rotated in the direction of the arrow $j_1$, and follows the deck arm 200. As such, as to the coil spring 203 attached to the deck arm 200, there is no space change between the end 203a latched by the arm member 201 and the other end 203b latched by the spring latch section 214, and no increase is observed in the biasing force exerting on the deck arm 200. There thus is no increase of the biasing force of the coil spring 203 exerting on the deck arm 200 in the direction of the arrow $i_2$ as the optical disk 2 is further retracted, and no disturbance is thus caused for the retraction operation by the loading arm 51. Note here that also in the process of retracting the optical disk 2, because the deck arm 200 is under the biasing force of the coil spring 203 in the direction of the arrow $i_2$, the abutting member 205 is biasing the outer regions of the optical disk 2 by any predetermined force in the same direction.

As shown in FIG. 16, when the optical disk 2 is retracted almost on the disk loading section 23, the abutting piece 209 of the press plate 202 is abutted against the tip end portion of the loading cam plate 53, and the deck arm 200 is rotated more in the direction of the arrow $i_1$. When the press plate 202 is pressed by the loading cam plate 53, the press arm 202b extending from the main surface portion 202a biases the arm portion 201b of the arm member 201 in the direction of the arrow $i_1$. This enables the deck arm 200 to move, without fail, the abutting member 205 attached to the arm portion 201b away from the outer regions of the optical disk 2 loaded on the turntable 23a.

In the process of ejecting the optical disk 2, the loading cam plate 53 is moved by the slider 122 in the direction of the arrow $f_2$. When the loading cam plate 53 is moved to slide, the loading arm 51 is rotated in the direction of the arrow $a_2$, i.e., the front surface side of the cabinet 3. When the ejection arm 52 is rotated in the direction of the arrow $b_2$, the optical disk 2 is directed to be ejected. As shown in FIG. 18, when the loading cam plate 53 is moved to slide, in the restriction arm 212, the rotation guide section 215 is guided by the fourth guide portion 66d, and is rotated about the insertion piece 216 so that the spring latch section 214 is rotated in the direction of the arrow $j_2$. This rotation accordingly rotates, with the spring latch section 214, the end 203b of the coil spring 203 in the direction of the arrow $j_2$, and the end 203a of the coil spring 203 and the arm member 201 latched at the end 203a are rotated in the same direction by the biasing force of the coil spring 203. Herein, as to the deck arm 200, because the coil spring 203 is rotated in accordance with the rotation of the restriction arm 212, the biasing force of the coil spring 203 is not increased, and thus the optical disk 2 is not abruptly ejected by the biasing force of the coil spring 203.

When the sliding movement of the loading cam plate 53 is stopped, the restriction arm 212 is stopped rotating. The rotation of the deck arm 200 by the biasing force by the coil spring 203 is thus also stopped as is, and the deck arm 200 is returned to the initial position to be on standby for insertion of the optical disk 2.

In the deck arm 200, when the abutting member 205 is abutted against the outer regions of the optical disk 2 and is rotated to the rear surface side of the cabinet 3, the optical disk 2 is retracted, almost, to the area in the vicinity of the disk loading section 23. In response thereto, the coil spring 203 biases, with a fixed level of force, the optical disk 2 in the direction of the arrow $i_2$. At this time, in the biasing direction of the abutting member 205, the centering guide 220 latched by the main chassis 6 is located for use to center the optical disk 2 directly above the turntable 23a of the disk loading section 23 with the loading arm 51 retracting the optical disk 2 into the cabinet 3, the deck arm 200, and the centering guide 220.

Through rotatable support on the deck portion 4a at the position closer to the rear surface side of the cabinet 3 than the disk loading section 23 as such, the deck arm 200 serves to stop erroneous insertion of the small-diameter disk 101, and as a centering guide for the optical disk 2. The area of the deck portion 4a on the rear surface side of the cabinet 3 is remained available even when the optical disk 2 is loaded to the disk loading section 23. If the rotation pivot of the deck arm 200 is disposed in this area, the size-reduced space in the cabinet 3 can be utilized with efficiency, thereby causing no size increase of the cabinet 3.

Figure 39:
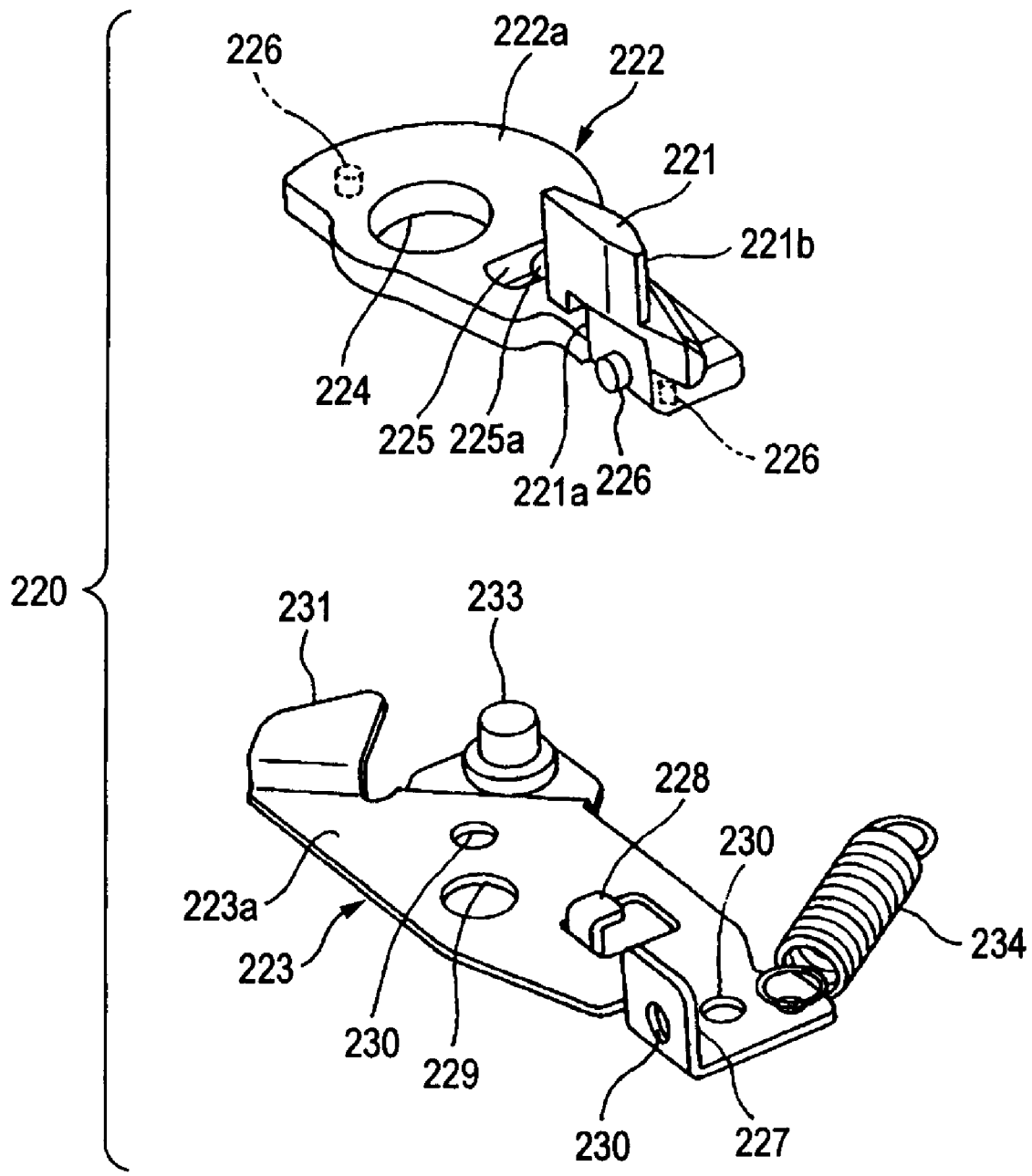
FIG. 39 is an exploded perspective view of a centering guide.
Figure 40:
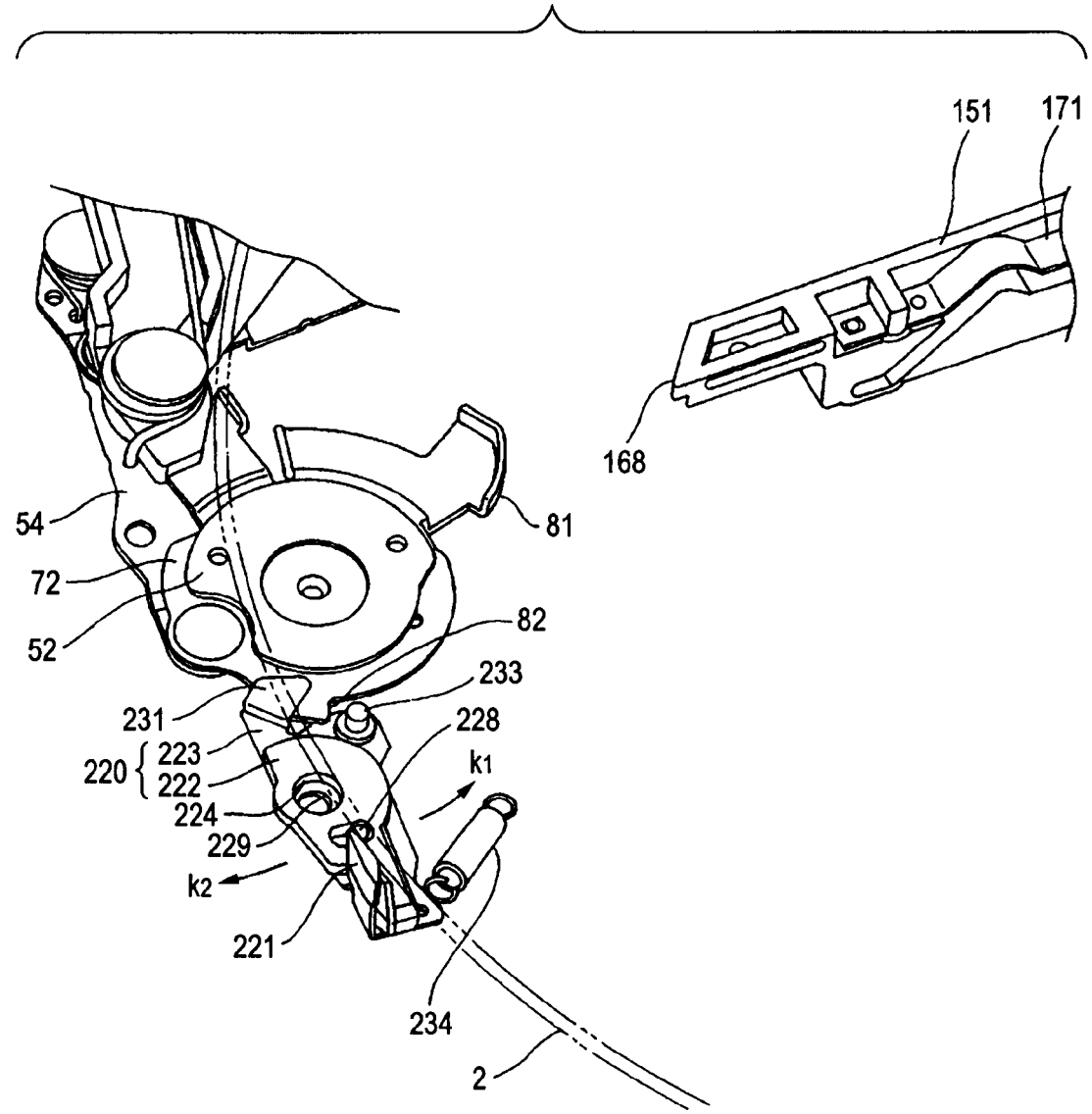
FIG. 40 is a perspective view of the centering guide.

Described next is the centering guide 220 that serves to center the optical disk 2 with such a deck arm 200. As shown in FIG. 3, the centering guide 220 is protruded, to the side of the upper surface 6a, from the centering guide aperture portion 6h of the main chassis 6 for supporting the side surface of the optical disk 2, thereby guiding the centering thereof. As shown in FIGS. 39 and 40, the centering guide 220 is provided with a guide plate 222 formed with a guide piece 221 that supports the side surface of the optical disk 2, and a rotation plate 223 for rotating the guide plate 222. These guide plate 222 and rotation plate 223 are rotatably attached as a piece to the upper surface 6a of the main chassis 6 from the back surface side.

The guide plate 222 is made of resin, and from an end of the main surface portion 222a, the guide piece 221 is provided upright for supporting the optical disk 2 at the outer surface. The main surface portion 222a is formed with an insertion hole 224 sequentially to an aperture section 229 formed to the rotation plate 223. The insertion hole 224 is inserted with a crimp pin. The main surface portion 222a is also formed with a latch hole 225, which includes a latch portion 225a for latching at a latch piece 228 provided upright on the rotation plate 223. The main surface portion 222a is also formed with a coupling convex section 226 protruded from the back surface and the side surfaces for insertion of a coupling hole 230 of the rotation plate 223. The guide plate 222 becomes able to rotate as a piece with the rotation plate 223 by the latch portion 225a being latched by the latch piece 228, and the coupling convex section 226 being inserted into the coupling hole 230.

The guide piece 221 is provided with an abutting wall 221a and a guide portion 221b. The abutting wall 221a is provided upright on the main surface of the guide plate 222, and is abutted against the side edge of the centering guide aperture portion 6h. The guide portion 221b is protruded onto the main chassis 6, and is abutted against the outer regions of the optical disk 2, thereby guiding the centering thereof. The guide plate 222 of the guide piece 221 is biased, with the rotation plate 223, to rotate toward the outer regions of the optical disk 2 retracted to inside of the cabinet 3. In response thereto, the abutting wall 221a is abutted against the side edge of the centering guide aperture portion 6h so that the guide portion 221b is positioned, and this guide portion 221b positioned as such supports the optical disk 2 at the outer surface.

The rotation plate 223 is made of a metal sheet member, and the main surface portion 223a is formed with a support wall 227, a latch piece 228, an aperture section 229, and a coupling hole 230. The support wall 227 supports the guide piece 221 provided upright on the guide plate 222, and the latch piece 228 is inserted through the latch hole 225. The aperture section 229 is formed coaxially sequentially to the insertion hole 224, and the coupling hole 230 is inserted into the coupling convex section 226.

The support wall 227 is formed with the coupling hole 230 for insertion of the coupling convex section 226 protruded sideward from the abutting wall 221a of the guide piece 221.

The support wall 227 biases the guide piece 221 toward the outer surface of the optical disk 2 by the abutting wall 221a being supported, and by the rotation plate 223 being biased and rotated by an extension spring 234 that will be described later. The latch piece 228 is provided upright on the main surface portion 223a of the rotation plate 223, and the tip end thereof is bent in the substantially orthogonal direction, thereby being latched by the latch portion 225a of the latch hole 225 of the guide plate 222. Through such latching, the latch piece 228 biases, with the support wall 227, the guide plate 222 to the outer surface side of the optical disk 2.

The aperture section 229 is formed sequentially to the insertion hole 224 of the guide plate 222, and is inserted with a crimp pin that is not shown. The centering guide 220 is thus rotatably supported by the upper surface 6a of the main chassis 6, and the guide piece 221 is allowed to rotate in the direction of an arrow $k_1$ of FIG. 40, i.e., the direction in which the guide piece 221 rotates to the side of the outer surface of the optical disk 2, and in the direction of an arrow $k_2$, i.e., the direction in which the guide piece 221 moves away from the outer surface of the optical disk 2.

The rotation plate 223 is formed with, on the main surface portion 223a, a cam shaft 233 to be rotated by the rotation piece 82 formed to the rotation support member 71 of the ejection arm 52. The cam shaft 233 is formed by attaching a crimp pin to the main surface portion 223a of the rotation plate 223. As to the centering guide 220, when the ejection arm 52 is rotated in the direction of the arrow $b_1$, i.e., the direction of retracting the optical disk 2, the rotation piece 82 of the rotation support member 71 is abutted against and presses the crimp shaft 233. In response thereto, the guide piece 221 is rotated in the direction of the arrow $k_2$, i.e., the direction of moving away from the outer surface of the optical disk 2, about the crimp pin being inserted through the insertion hole 224 and the aperture section 229.

In the rotation plate 223, the main surface portion 223a is formed with a latch piece 231 for latching by the rotation support member 71 of the ejection arm 52. As shown in FIG. 40, the engagement piece 231 is first bent upward than the main surface portion 223a, and then bent to the side of the rotation support member 71. The engagement piece 231 is thus located at the position higher than the main surface portion 223a, and is extended onto the rotation support member 71. This allows engagement of the rotation plate 223 to the main surface of the rotation support member 71, and the cam shaft 233 can be abutted against the rotation piece 82.

Also in the rotation plate 223, the main surface portion 223a is latched to the extension spring 234, which biases the centering guide 220 to rotate in the direction of the arrow $k_1$, i.e., the direction in which the guide piece 221 is abutted against the outer surface of the optical disk 2. As to this extension spring 234, one end is latched by the rotation plate 223, and the other end is latched by the main chassis 6 so that the guide piece 221 of the centering guide 220 is always biased to rotate in the direction of the arrow $k_1$. By the guide piece 221 being biased to rotate in the direction of the arrow $k_1$ as such, the abutting wall 221a is pressed against the side edge of the centering guide aperture portion 6h provided to the main chassis 6 so that the guide portion 221b is positioned. By the abutting wall 221a being biased and positioned by the biasing force of the extension spring 234 toward the centering guide aperture portion 6h as such, the centering guide 220 prevents the guide portion 221b from moving to swing in the direction of the arrow $k_2$, i.e., the direction of moving away from the outer surface of the optical disk 2.

Described next is the process of centering the optical disk 2 using this centering guide 220. As described above, in the process of inserting and retracting the optical disk 2, until the rotation piece 82 formed to the rotation support member 71 of the ejection arm 52 presses the cam shaft 233 of the rotation plate 223, by the biasing force of the extension spring 234, the guide piece 221 is biased to rotate in the direction of the arrow $k_1$, i.e., the direction of the outer surface of the optical disk 2, so that the outer surface of the optical disk 2 can be guided by the guide portion 221b.

Moreover, with the engagement convex section 64 being guided by the first cam groove 66 of the loading cam plate 53, the loading arm 51 retracts the optical disk 2 in such a manner that the center hole 2a comes to the centering position located directly above the turntable 23a. To be specific, with the engagement convex section 64 guided by the first guide portion 66a of the first cam groove 66, the loading arm 51 is rotated in the direction of the arrow $a_1$, i.e., the direction of retracting the optical disk 2, thereby transferring the optical disk 2 to almost the centering position. With the engagement convex section 64 guided by the second guide portion 66b, the loading arm 51 is restricted from rotating in the directions of the arrows $a_1$ and $a_2$.

After the optical disk 2 reaches almost the centering position, the deck arm 200 is also pressed against the outer surface of the optical disk 2, and thus is rotated in the direction of the arrow $i_1$. At this time, the deck arm 200 is providing, with respect to the optical disk 2, the biasing force of the coil spring 203 in the direction of the arrow $i_2$ to the arm member 201. This biasing force exerts, in the direction of the turntable 23a, on the optical disk 2 by the abutting member 205 attached to the arm member 201. As described in the foregoing, this biasing force is remained the same in level, i.e., not increased, with the movement of the spring latch section 214 in accordance with the rotation of the restriction arm 212.

That is, as shown in FIG. 15, in the disk drive apparatus 1, when the optical disk 2 is retracted to inside of the cabinet 3, the swinging movement of the loading arm 51 and the centering guide 220 is restricted, and the biasing force of a fixed level is exerted on the optical disk 2 by the deck arm 200. In the disk drive apparatus 1, with the turntable 23a centered, the outer surface of the optical disk 2 is supported, around the disk loading section 23, at three points, i.e., at the abutting section 61 of the loading arm 51, the guide piece 221 of the centering guide 220, and the abutting member 205 of the deck arm 200. Among these three points, the optical disk 2 is supported in the rigid state, i.e., in the state that the two points of the abutting section 61 and the guide piece 221 are restricting the swinging movement, and from the remaining one point, the biasing force is provided by the abutting member 205 toward the turntable 23a.

As such, in the disk drive apparatus 1, the loading arm 51 retracting the optical disk 2 to be above the disk loading section 23 is positioned rigid depending on the centering position of the optical disk 2, thereby achieving the centering of the optical disk 2 with reliability.

Also in the disk drive apparatus 1, The centering guide 220 is also positioned rigid depending on the centering position of the optical disk 2 as is the loading arm 51, thereby achieving the centering of the optical disk 2 with more reliability.

Moreover, in this disk drive apparatus 1, to perform centering for the optical disk 2 with still more reliability, any two of the abutting section 61, the abutting member 205, and the guide piece 221 may be positioned rigid depending on the center position of the optical disk 2, and the remaining one may be used to bias the optical disk 2 toward the side of the turntable 23a. Herein, the three components, i.e., the abutting section 61, the abutting member 205, and the guide piece 221, are disposed with a substantially equal space from the turntable 23a. With this being the case, when the base unit 22 is moved up to the chucking position by the slider 122 and the sub slider 151 that will be described later, the chucking can be applied smoothly between the optical disk 2 and the turntable 23a. As such, there is no more chucking noise that is often made due to some displacement between the center hole 2a of the optical disk 2 and the turntable 23a, and the optical disk 2 or the turntable 23a can be free from the load.

The concern here is that, at the time of centering, if all of the three points, i.e., the abutting section 61, the guide piece 221, and the abutting member 205 supporting the outer surface of the optical disk 2, are all restricted rigid, the centering position of the optical disk 2 may be displaced due to any size deviation observed in the outer dimension of the optical disk 2, any precision error of the components, and others. If this is the case, no smooth chucking is possible for every type of optical disk 2. On the other hand, with a configuration that the abutting member 205 is not positioned rigid but is biased to be rotatable, the precision error of the optical disk 2 and the components can be absorbed if any so that the optical disk 2 can be centered with reliability.

Note that, at this time, the loading arm 51 rotatably supported by the deck portion 4a is positioned with respect to the main chassis 6 disposed in the bottom case 4 via the loading cam plate 53 and the slider 122. This positioning is achieved by the loading cam plate 53 guiding the engagement convex section 64 being configured as a piece with the slider 122, and by the slider 122 being supported by the bottom case 4 in the sliding direction as will be described later. The centering guide 220 is positioned with respect to the main chassis 6 by the guide piece 221 being biased and rotated by the centering guide aperture portion 6h of the main chassis 6. As will be described later, the base unit 22 provided with the turntable 23a is also supported to be able to move up and down with respect to the main chassis 6. That is, with respect to the main chassis 6, the loading arm 51 and the centering guide 220 are positioned at one end, and at the other end, the turntable 23a is positioned.

As such, by the loading arm 51 and the centering guide 220 both positioned with respect to the main chassis 6, the optical disk 2 is to be centered on the turntable 23a that is also positioned with respect to the main chassis 6. Therefore, the optical disk 2 is centered with reliability.

At the time of centering, in the process of retracting the optical disk 2, as to the ejection arm 52, the guide convex section 113 of the second link arm 55 is guided by the retraction guide wall 112b of the loop cam 57. This brings closer to each other the latch section 96 of the first link arm 54 and the latch section 98 formed to the main chassis 6, and the extension spring 56 being in the extension state is put back to its original state. Herein, the ejection arm 52 may exert the biasing force, if it is weak, on the optical disk 2 in the direction of the arrow $b_2$, i.e., the side of the disk loading section 23. If this is the case, the disk drive apparatus 1 can center the optical disk 2 by supporting the optical disk 2 at three points around the disk loading section 23, i.e., at the ejection arm 52 for biasing to the side of the disk loading section 23, and the loading arm 51 and the centering guide 220 restricted to be located at the centering position of the optical disk 2.

As shown in FIG. 16, after chucking of the optical disk 2, as to the centering guide 220, when the rotation piece 82 provided to the rotation support member 71 of the ejection arm 52 is pressed against the camshaft 233 formed to the rotation plate 223, the rotation plate 223 and the guide plate 222 are rotated about the insertion hole 224 against the biasing force of the extension spring 234 so that the guide piece 221 is moved in the direction of the arrow $k_2$. As a result, in the guide piece 221, the guide portion 221b is moved away from the outer surface of the optical disk 2.

Moreover, as described above, the loading arm 51 is rotated in the direction of the arrow $a_2$ by the engagement convex section 64 being guided by the third guide portion 66c of the first cam groove 66 of the loading cam plate 53, and the abutting section 61 is moved away from the outer regions of the optical disk 2. In the deck arm 200, the abutting piece 209 of the press plate 202 is pressed against the tip end of the loading cam plate 53 in the direction of the arrow $f_1$, the arm member 201 biased by the press arm 202b is rotated in the direction of the arrow $i_1$, and the abutting member 205 attached to the arm member 201 is moved away from the outer regions of the optical disk 2. Note here that, as the slider 122 moves to slide, the ejection arm 52 is also rotated in the direction of the arrow $b_1$ via the operation arm 58, and the support section 88 and the lift section 90 are both moved away from the outer regions of the optical disk 2.

As a result, the optical disk 2 chucked by the turntable 23a is released from the arms and the centering guide 220 supporting the outer regions thereof, and is allowed to rotate by the disk rotation drive mechanism 24.

As shown in FIG. 11, the drive mechanism 120 that supplies the driving force to the disk transfer mechanism 50 is provided with the drive motor 121, the slider 122 that moves to slide in the bottom case 4 in response to the driving force of the drive motor 121, and a gear string 123 that transfers the driving force of the drive motor 121 to the slider 122. These components, i.e., the drive motor 121, the slider 122, and the gear string 123, are disposed in the main chassis 6 on the side of the bottom case 4. The drive mechanism 120 is for driving the disk transfer mechanism 50 and the base moving mechanism 150 by moving the slider 122 to slide using the drive motor 121.

When the optical disk 2 is inserted to a predetermined position, and when the first switch SW1 is depressed by the rotation support member 71 of the ejection arm 52, the drive motor 121 is driven in the forward direction, i.e., the direction of moving the slider 122 in the direction of the arrow $f_1$. If with the ejection operation, the drive motor 121 is driven in the reverse direction, i.e., the direction of moving the slider 122 in the direction of the arrow $f_2$. The slider 122 is moved in the direction of the arrow $f_1$ or $f_2$ of FIG. 11 in response to the loading and ejection of the optical disk 2, the arms and the base moving mechanism 150 are driven in the disk transfer mechanism 50. The gear string 123 transmits the driving force of the drive motor 121 to the slider 122 via a rack section 131.

Figure 41:
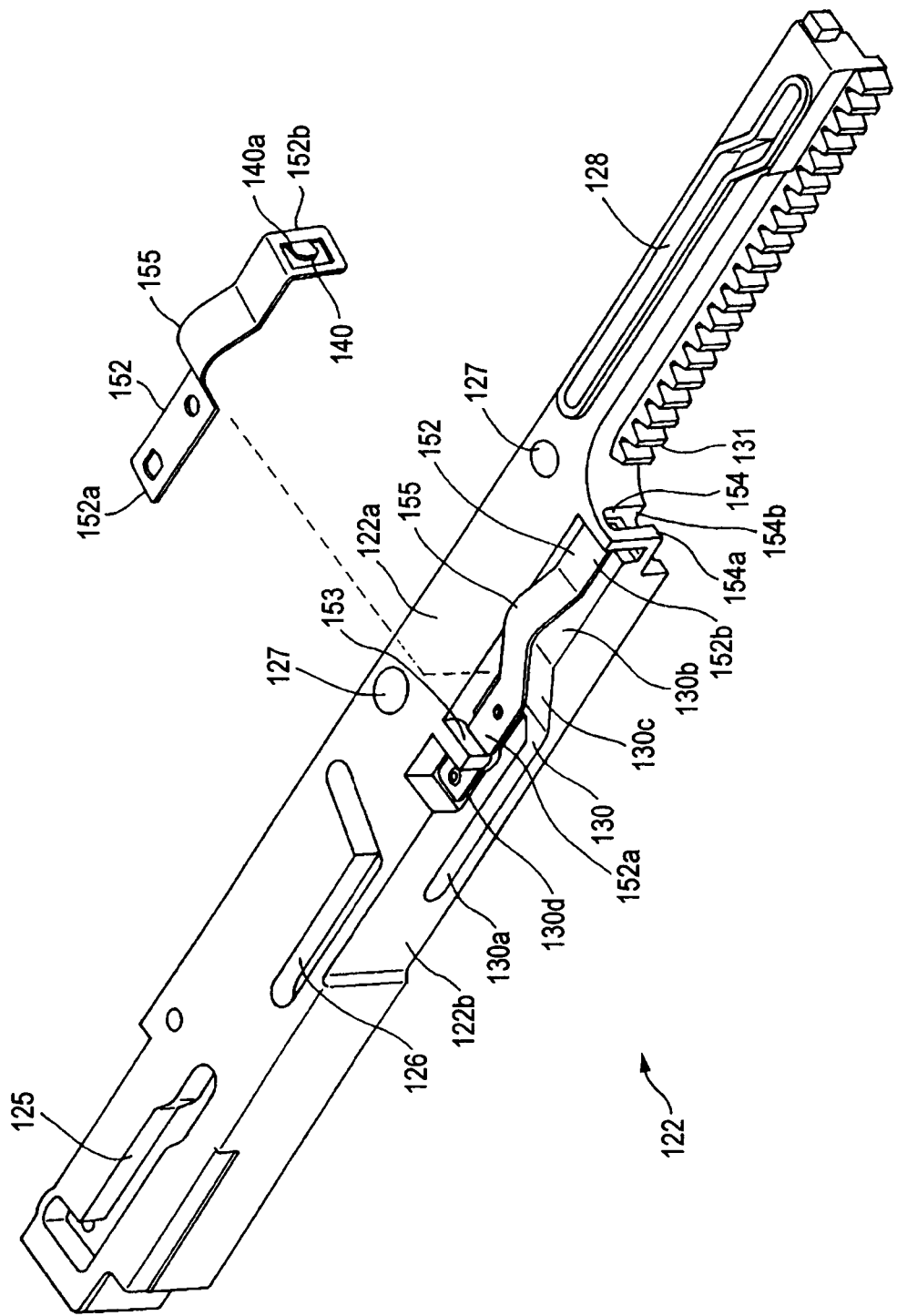
FIG. 41 is a perspective view of a first guide plate and a slider.

As shown in FIG. 41, the slider 122 is made of a resin member shaped like a rectangular parallelepiped in its entirety, and is formed with first to third guide grooves 125, 126, and 128, and a pair of engagement concave sections 127 and 127. The first guide groove 125 is engaged with, on an upper surface 122a, the engagement convex section 109 formed to the third link arm 100. The second guide groove 126 is engaged with a coupling arm 165 for driving the sub slider 151 of the base moving mechanism 150 that will be described later. The pair of engagement concave sections 127 and 127 are engaged, respectively, with a pair of engagement protrusions 68 and 68 formed to the loading cam plate 53. The third guide groove 128 is engaged with an end of an open/close arm, which serves to restrict double insertion of the optical disk 2 that is not described in detail here.

The slider 122 is formed with, on a side surface 122b on the side of the base unit 22, a first cam slit 130 and the rack section 131. The first cam slit 130 is inserted with the first spindle 47 protruded from the sub chassis 29 of the base unit 22, and the rack section 131 is engaged with the gear string 123. The first cam slit 130 is incorporated with a first guide plate 152 for preventing rattling of the first spindle 47 of the sub chassis 29, and enabling the stable operation of the disk rotation drive mechanism 24. Herein, the slider 122 is formed, on the lower surface 122c, with a slide guide groove 129 in the longitudinal direction to be guided, in the slide direction, by the pair of guide protrusions 124 and 124 protruded from the bottom case 4 (refer to FIG. 9).

Such a slider 122 is disposed, in the bottom surface portion of the bottom case 4, between the base unit 22 and one side surface portion provided with the deck portion 4a of the bottom case 4. This slider 122 is located below the optical disk 2 to be inserted into the cabinet 3 from the disk insertion/removal port 19, and the upper surface portion is located slightly lower than the deck portion 4a. This slider 122 is covered by the main chassis 6, and is driven to slide in the directions of the arrows $f_1$ and $f_2$, i.e., the fore and aft direction, via the drive motor 121 and the gear string 123 provided at the bottom surface portion of the bottom case 4.

In response to such sliding movement of the slider 122, the drive mechanism 120 moves the third link arm 100 and the operation arm 58 engaged with the third link arm 100, thereby restricting the rotation of the ejection arm 52. The drive mechanism 120 also moves the loading cam plate 53 in the fore and aft direction so as to rotate the loading arm 51. As such, the drive mechanism 120 goes through operations in accordance with the sliding movement of the slider 122, i.e., the loading operation of retracting the optical disk 2 into the cabinet 3, and the ejection operation of ejecting the optical disk 2 from the disk loading section 23 to the disk insertion/removal port 19.

Described next is the base moving mechanism 150 that moves up and down the base unit 22 in response to the sliding movement of such a slider 122. The base moving mechanism 150 moves up and down the base unit 22 to place the optical disk 2 among the chucking position, the chucking release position, and the recording/reproduction position. At the chucking position, the optical disk 2 centered at the disk loading position is loaded to the turntable 23a of the disk loading section 23, and at the chucking release position, the optical disk 2 is removed from the turntable 23a. The recording/reproduction position is between the chucking position and the chucking release position, at which signal recording or signal reproduction is performed to/from the optical disk 2.

Specifically, using the slider 122 and the sub slider 151 moved to slide in accordance with the sliding movement of the slider 122, the base moving mechanism 150 moves up and down the first and second spindles 47 and 48 formed to the base unit 22 so that the base unit 22 is moved up and down. On the side surface of the slider 122 opposing the base unit 22 of the slider 122, as shown in FIG. 41, the first cam slit 130 is formed in the longitudinal direction for moving up and down the base unit between the chucking release position and the recording/reproduction position. The first cam slit 130 is formed with a lower-side horizontal surface portion 130a, an upper-side horizontal surface portion 130b, a sloped surface portion 130c, and an attachment portion 130d. The lower-side horizontal surface portion 130a is corresponding to the chucking release position, and the upper-side horizontal surface portion 130b is corresponding to the recording/reproduction position. The sloped portion 130c links together the lower- and upper-side horizontal surface portions 130a and 130b, and the attachment portion 130d is attached with the first guide plate 152 that will be described later. The first cam slit 130 is inserted with, to be able to move to slide, the first spindle 47 protruded from the sub chassis 29 of the base unit 22.

The first cam slit 130 is provided with the first guide plate 152 for guiding the movement of the first spindle 47, and preventing rattling of the first spindle 47 at the recording/reproduction position, thereby enabling the stable operation of the disk rotation drive mechanism 24. The first guide plate 152 is made of a leaf spring member, and at one end 152a, an engagement hole is provided. This engagement hole is engaged with an engagement convex section protruded from the attachment portion 130d of the first cam slit 130, and the end 152a is latched to a protrusion piece 153 formed from the upper surface 122a of the slider 122 toward the side of the attachment portion 130d. The first guide plate 152 is formed with, at the other end 152b, a latch piece 140 to be latched by a latch section 154 provided to the first cam slit 130. The first guide plate 152 is formed with a protrusion section 155 above a contact point between the upper-side horizontal surface portion 130b and the sloped surface portion 130c. The protrusion section 155 is protruded to the side of the upper surface 122a of the slider 120 when the first spindle 47 is moved when the base unit 22 is moved up to the chucking position, and when the first spindle 47 is moved to the upper-side horizontal surface portion 130b.

The lower-side horizontal surface portion 130a of the first cam slit 130 is formed to be able to freely slide at the height slightly larger than the diameter of the first spindle 47. On the other hand, the upper-side horizontal surface portion 130b is so formed that the height from the first guide plate 152 is the same or slightly smaller than the diameter of the first spindle 47. As such, when the first spindle 47 is moved to the upper-side horizontal surface portion 130b, the first guide plate 152 is pressed through insertion of the first spindle 47, and grips the first spindle 47 with the upper-side horizontal surface portion 130b. This thus enables the first guide plate 152 to suppress any vibration of the spindle motor 24a of the disk rotation drive mechanism 24 provided to the base unit 22, and rotates the optical disk 2 in a stable manner.

In the first guide plate 152, when the first spindle 47 is gripped with the upper-side horizontal surface portion 130b, the protrusion section 155 protrudes onto the upper surface 122a of the slider 122, and is pressed against the upper surface 6a of the main chassis 6. As such, during the recording/reproduction of the optical disk 2, the slider 122 is pressed against the side of the bottom case 4 by the first guide plate 152, thereby suppressing any influence of vibration and disturbance caused by the driving of the base unit 22.

Figure 42:
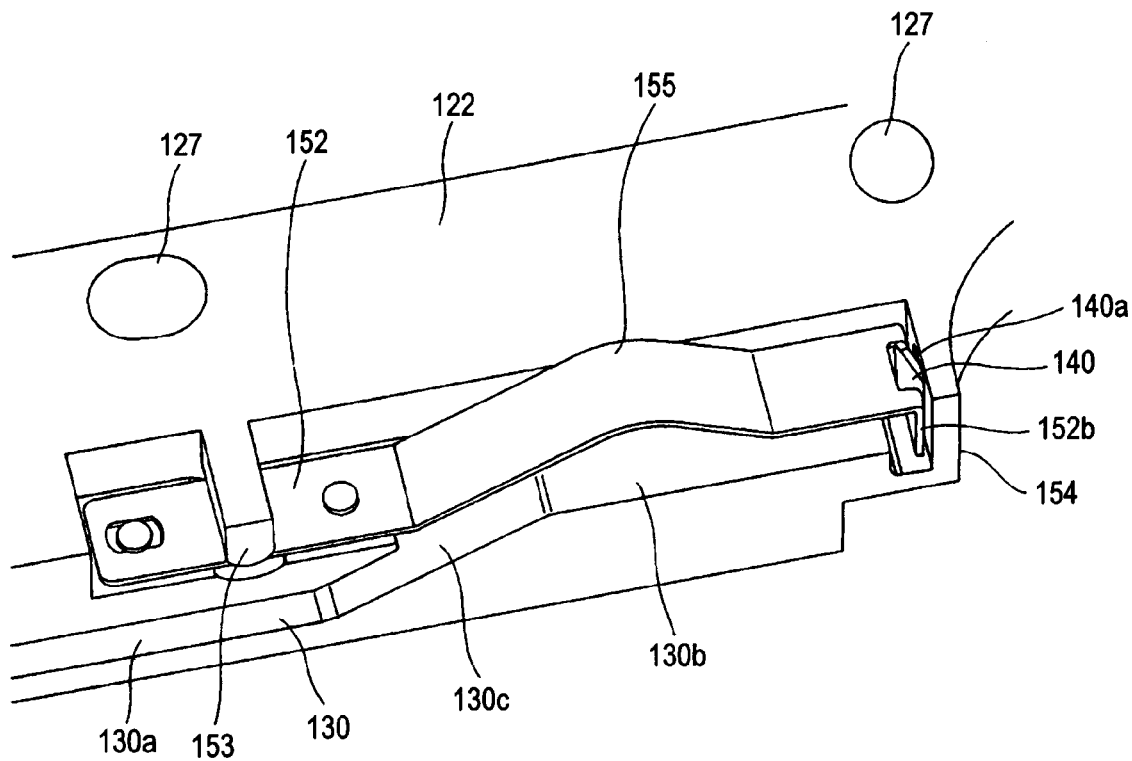
FIG. 42 is a perspective view of the slider at which the first guide plate is latched.

The latch piece 140 formed to the end 152b of the first guide plate 152 is a result of bending the end 152b in the direction orthogonal to the longitudinal direction of the slider 122, and making the main surface portion of the end 152b is partially protruded, substantially like a square, along the bending direction of the end 152b. The latch section 154 to be latched with the latch piece 140 is provided in front of the upper-side horizontal surface portion 130b of the first cam slit 130. At a side wall 154a formed from the upper surface 122a of the slider 122 toward the thickness direction, a slit 154b is formed in the thickness direction. When the first guide plate 152 is latched with the first cam slit 130, as shown in FIG. 42, the end 152b of the first guide plate 152 is opposed to the side wall 154a, and the latch piece 140 is inserted through the slit 154b, whereby an upper surface 140a of the latch piece 140 is allowed to abut against the upper portion of the slit 154b.

When any impact is applied to the first guide plate 152 in the plane direction through insertion of the engagement piece 140 to the slit 154b, the upper surface 140a of the latch piece 140 is abutted against the upper portion of the slit 154b so that the impact can be received by the slider 122 via the upper surface 140a of the latch piece 140. As such, even with any impact in the plane direction due to a fall accident of the disk drive apparatus 1, for example, the first guide plate 152 can be protected from plastic flow.

As is made of an elastic member long in length, the first guide plate 152 is specifically susceptible to plastic flow as a result of any impact in the plane direction. At the time of shipping of the disk drive apparatus 1 or transfer of electronic equipment mounted with the disk drive apparatus 1, if packing is simplified, there needs to be ready for any possible impact due to a fall accident or others. Here, by forming the latch piece 140 to be able to latch by the slider 122, the first guide plate 152 can be protected from any possible shape change.

The sub slider 151 supports the second spindle 48 protruded from the sub chassis 29 of the base unit 22, and is engaged with the slider 122. The sub slider 151 is so disposed as to be able to move to slide, in accordance with the sliding movement of the slider 122, in the direction of the arrow $h_1$ or $h_2$ of FIG. 11, i.e., the direction orthogonal to the loading direction of the optical disk 2.

Figure 43:
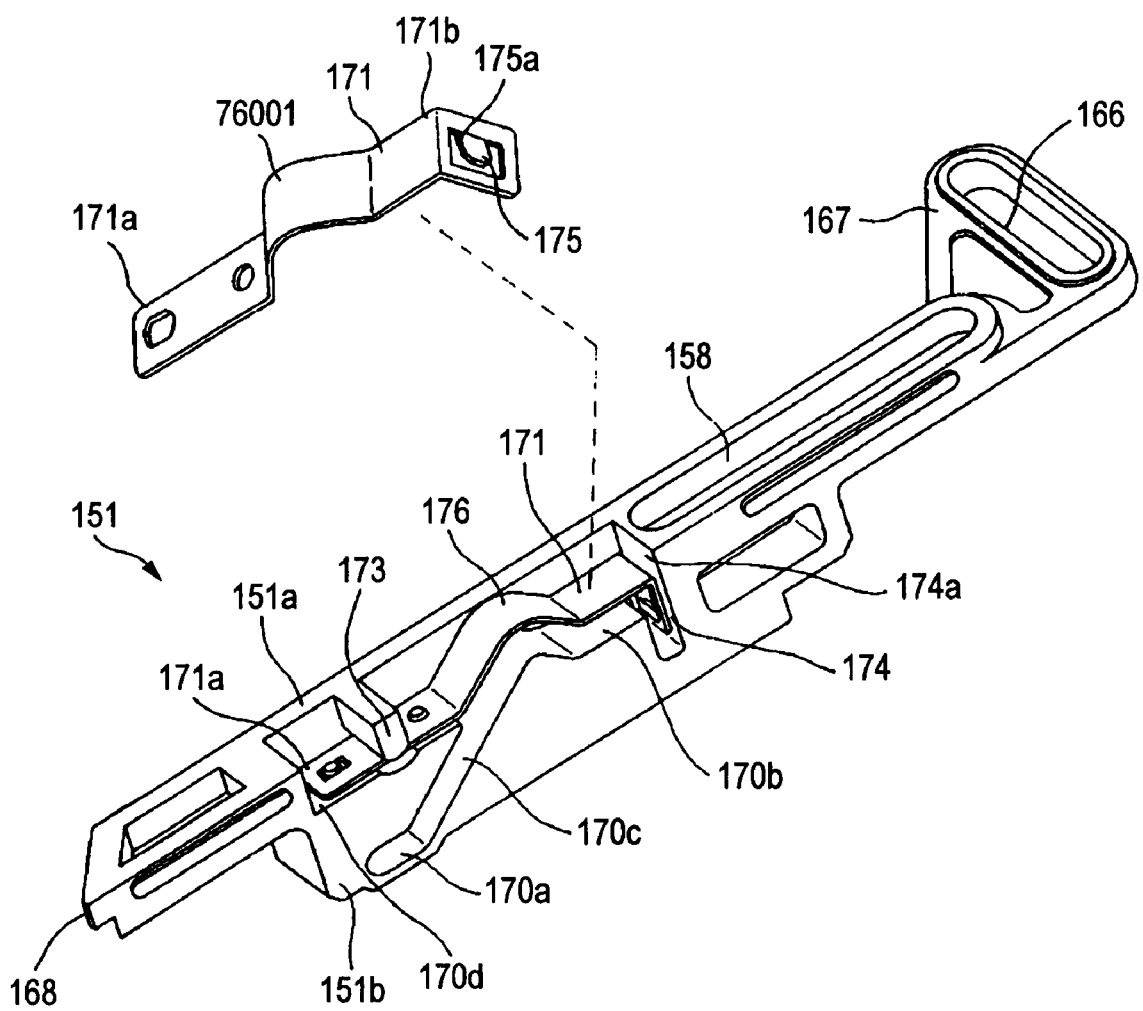
FIG. 43 is a perspective view of a second guide plate and a sub slider.

As shown in FIGS. 11 and 43, the sub slider 151 is a synthetic-resin-made flat plate member long in length, and to an upper surface 151*a*, an upper guide groove 158 is formed in the longitudinal direction for engagement with a guide convex section 157 being a protrusion from the main chassis 6. The sub slider 151 is also formed with, at the position with some displacement from the upper guide groove 158 of a lower surface 151*c*, a lower guide groove 160 in the longitudinal direction for engagement with a guide convex section 159 being a protrusion from the bottom case 4 (refer to FIG. 9). Through engagement between the upper guide groove 158 and the guide convex section 157 being a protrusion from the main chassis 6, this guide convex section 157 is moved to slide through the upper guide groove 158. Also through engagement between the lower guide groove 160 and the guide convex section 159 being a protrusion from the bottom case 4, this guide convex section 159 is moved to slide through the lower guide groove 160. As such, in response to the sliding movement of the slider 122, the sub slider 151 is moved to slide in the direction of the arrow $h_1$ or $h_2$.

The sub slider 151 is also formed with, at one end portion located on the side of the slider 122 in the longitudinal direction, an engagement groove 166 for engagement with the coupling arm 165 to be coupled with the slider 122. The engagement groove 166 is provided to an engagement piece 167, which is extended in the direction orthogonal to the longitudinal direction of the sub slider 151. In the sub slider 151, an end portion opposite to the end portion formed with the engagement piece 167 serves as an abutting convex section 168 for abutting against the rotation support member 71 of the ejection arm 52 at the time of loading of the optical disk 2. As shown in FIG. 16, when the optical disk 2 is loaded, the abutting convex section 168 is abutted against the bending piece 81 of the rotation support member 71, thereby rotating the rotation support member 71 in the direction in which the push-out arm 72 is released from the side surface of the optical disk 2. The abutting convex section 168 also restricts the rotation support member 71 in such a manner that the push-out arm 72 rotated to the position being away from the side surface of the optical disk 2 not to rotate in the direction of the side surface of the optical disk 2. As such, the sub slider 151 keeps the state in which the push-out arm 72 of the ejection arm 52 is released from the side surface of the optical disk 2.

The sub slider 151 is formed with, on a side surface 151*b* of the disk insertion/removal port 19, a second cam slit 170 in the longitudinal direction for moving up and down the base unit 22 with the first cam slit 130 among the chucking position, the chucking release position, and the recording/reproduction position. The second cam slit 170 is formed with a lower-side horizontal surface portion 170*a*, an upper-side horizontal surface portion 170*b*, and a sloped surface portion 170*c*, and an attachment portion 170*d*. The lower-side horizontal surface portion 170*a* is corresponding to the chucking release position, and the upper-side horizontal surface portion 170*b* is corresponding to the recording/reproduction position. The sloped surface portion 170*c* links together the lower- and upper-side horizontal surface portions 170*a* and 170*b*, and is corresponding to the chucking position. The attachment portion 170*d* is attached with a second guide plate 171, which will be described later. The second cam slit 170 is inserted with, to be able to move to slide, the second spindle 48 protruded from the sub chassis 29 of the base unit 22.

The sloped surface portion 170*c* of the second cam slit 170 is disposed at the position higher than the upper-side horizontal surface portion 170*b*, and by being slightly moved down, guides the base unit 22 to the upper-side horizontal surface portion 170*b*. The base unit 22 guided by the second cam slit 170 is thus moved from the chucking release position to the chucking position while the second spindle 48 is moved up the sloped surface portion 170*c* from the lower-side horizontal surface portion 170*a* by the sub slider 151 moving to slide in the direction of the arrow $h_1$. At this time, in the base unit 22, the area in the vicinity of the center hole 2*a* of the optical disk 2 centered on the disk loading section 23 is pinched by the turntable 23*a* and the abutting protrusion section 8 provided to the top portion 5*a* of the top cover 5 so that the optical disk 2 is subjected to chucking. When the sub slider 151 is moved to slide in the direction of the arrow $h_1$, the second spindle 48 is moved from the sloped surface portion 170*c* down to the upper-side horizontal surface portion 170*b* so that the base unit 22 is moved from the chucking position to the recording/reproduction position.

Similarly to the first cam slit 130, the second cam slit 170 guides the movement of the second spindle 48, and is provided with a second guide plate 171 for preventing rattling of the second spindle 48 at the recording/reproduction position, and enabling the stable operation of the disk rotation drive mechanism 24. Herein, the second guide plate 171 is made of a leaf spring member, and at one end 171*a*, an engagement hole is provided. This engagement hole is engaged with an engagement convex section protruded from an attachment portion 170*d* of the second cam slit 170, and an end 171*a* thereof is latched by a protrusion piece 173 formed from the upper surface 151*a* of the slider 151 toward the side of the attachment portion 170*d*. The second guide plate 171 is formed with, at the other end 171*b*, a latch piece 175 to be latched by a latch section 174 provided to the second cam slit 170. The second guide plate 171 is formed with a protrusion section 176 above a contact point between the upper-side horizontal surface portion 170*b* and the sloped surface portion 170*c*. The protrusion section 176 is protruded to the side of the upper surface 151*a* of the sub slider 151 when the second spindle 48 is moved when the base unit 22 is moved up to the chucking position, and when the second spindle 48 is moved to the upper-side horizontal surface portion 170*b*.

The lower-side horizontal surface portion 170*a* of the second cam slit 170 is formed to be able to freely slide at the height slightly larger than the diameter of the second spindle 48. On the other hand, the upper-side horizontal surface portion 170*b* is so formed that the height from the second guide plate 171 is the same or slightly smaller than the diameter of the second spindle 48. As such, when the second spindle 48 is moved to the upper-side horizontal surface portion 170*b*, the second guide plate 171 is pressed through insertion of the second spindle 48, and grips the second spindle 48 with the upper-side horizontal surface portion 170b. This thus enables the second guide plate 171 to suppress, with the first guide plate 152, any vibration of the spindle motor 24a of the disk rotation drive mechanism 24 provided to the base unit 22, and rotates the optical disk 2 in a stable manner.

In the second guide plate 171, when the second spindle 48 is gripped with the upper-side horizontal surface portion 170b, the protrusion section 176 protrudes onto the upper surface 151a of the sub slider 151, and is pressed against the upper surface 6a of the main chassis 6. As such, during the recording/reproduction of the optical disk 2, the sub slider 151 is pressed against the side of the bottom case 4 by the second guide plate 171, thereby suppressing any influence of vibration and disturbance caused by the driving of the base unit 22.

Figure 44:
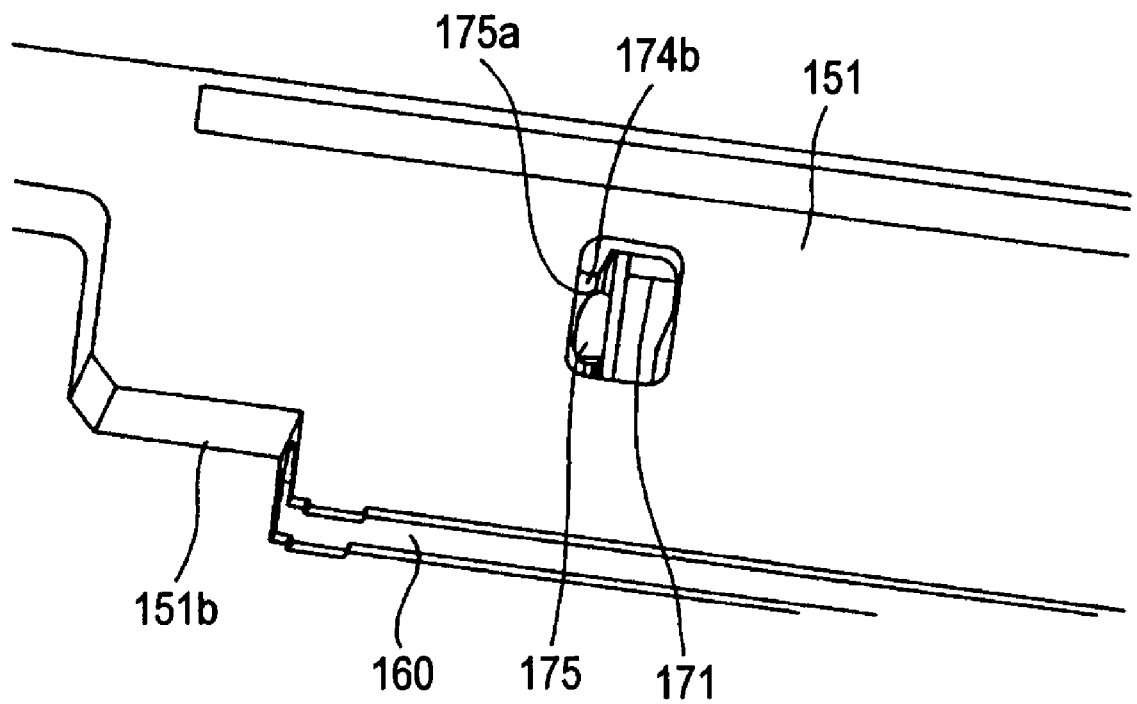
FIG. 44 is a perspective view of the sub slider at which the second guide plate is latched.

The latch piece 175 formed to the end 171b of the second guide plate 171 is a result of bending the end 171b in the direction orthogonal to the longitudinal direction of the sub slider 151, and making the main surface portion of the end 171b partially protrude, substantially like a square, along the bending direction of the end 171b. As shown in FIGS. 43 and 44, the latch section 174 to be latched by the latch piece 175 is provided in front of the upper-side horizontal surface portion 170b of the second cam slit 170. At a side wall 174a formed from the upper surface 151a of the sub slider 151 toward the thickness direction, a slit 174b is formed in the thickness direction. When the second guide plate 171 is latched by the second cam slit 170, the end 171b of the second guide plate 171 is opposed to the side wall 174a, and the latch piece 175 is inserted through the slit 174b, whereby an upper surface 175a of the latch piece 175 is allowed to abut against the upper portion of the slit 174b.

When any impact is applied to the second guide plate 171 in the plane direction through insertion of the engagement piece 175 to the slit 174b, the upper surface 175a of the latch piece 175 is abutted against the upper portion of the slit 174b so that the impact can be received by the sub slider 151 via the upper surface 175a of the latch piece 175. As such, similarly to the above-described first guide plate 152, even with any impact in the plane direction due to a fall accident of the disk drive apparatus 1, for example, the second guide plate 171 can be protected from any possible plastic flow.

The coupling arm 165 is engaged with the engagement groove 166 of such a sub slider 151, and couples together the slider 122 and the sub slider 151. In such a coupling arm 165, a support portion 165a disposed at substantially the middle is rotatably attached to the main chassis 6, and an engagement convex section 177 formed to an end 165b of the support portion 165a is engaged with the second guide groove 126 of the slider 122 to be able to freely move. The engagement convex section 178 formed to an end 165c is engaged with the engagement groove 166 of the sub slider 151 to be able to freely move.

When the slider 122 is moved in the direction of the arrow $f_1$, as shown in FIG. 15, this coupling arm 165 is rotated in the direction of an arrow $l_1$ about the support portion 165a by the engagement convex section 177 moving through the second guide groove 126 of the slider 122. While moving through the engagement groove 166, the engagement convex section 178 moves the sub slider 151 to slide in the direction of the arrow $h_1$. When the slider 122 is moved in the direction of the arrow $f_2$, as shown in FIG. 18, the coupling arm 165 is rotated in the direction of an arrow $l_2$ about the support portion 165a by the engagement convex section 177 moving through the second guide groove 126. While moving through the engagement groove 166, the engagement convex section 178 moves the sub slider 151 to slide in the direction of the arrow $h_2$.

Figure 45:
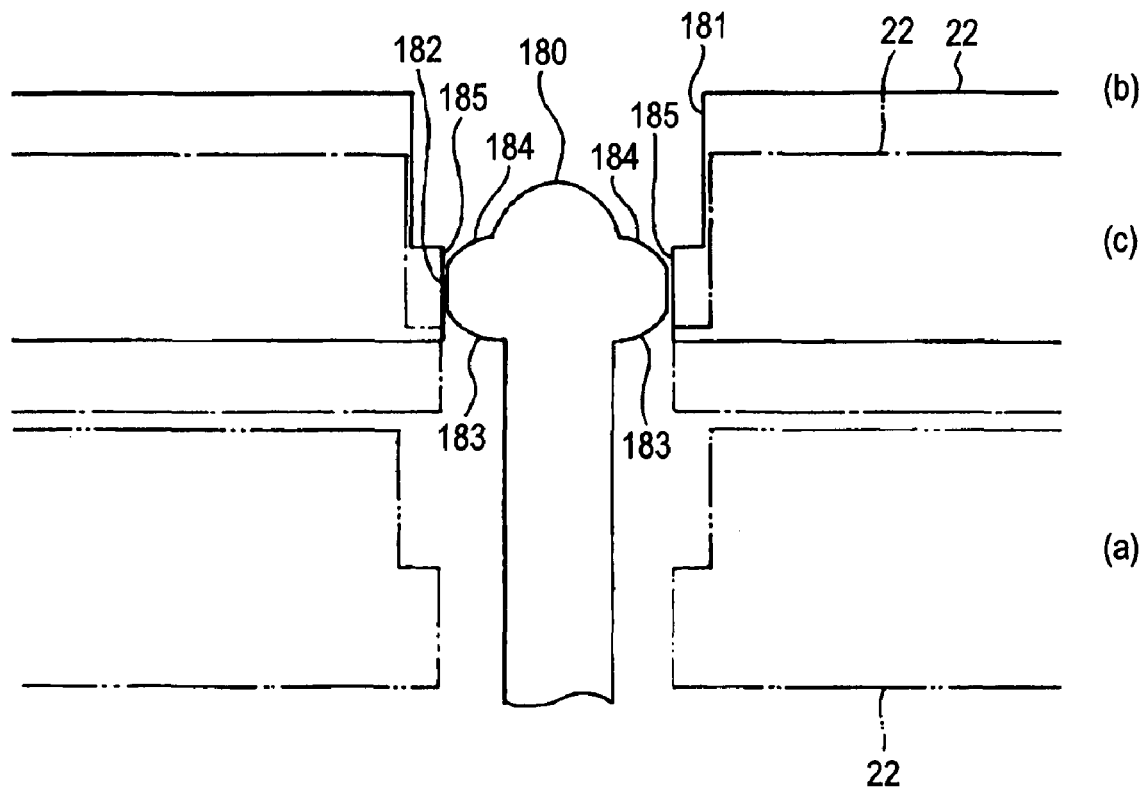
FIG. 45 is a cross sectional diagram showing the positional relationship between a guide pin and a guide hole in which (a) shows a chucking release position, (b) shows a disk loading position, and (c) shows the positional relationship at a recording/reproduction position.

As shown in FIGS. 3 and 45, the disk drive apparatus 1 is provided with a guide pin 180 for guiding, when the base unit 22 is moved up to the chucking position, the base unit 22 for positioning of the center hole 2a of the optical disk 2 transferred by the disk transfer mechanism 50 to the centering position with the turntable 23a of the disk loading section 23 provided to the base chassis 27.

The guide pin 180 is provided upright on the bottom surface portion of the bottom case 4, and as shown in FIG. 45, formed with, at an upper portion, a flange section 182 for insertion of a guide hole 181 formed to the base chassis 27. The diameter of the flange section 182 is slightly larger than that of the guide hole 181 of the base chassis 27, and includes first and second guide sections 183 and 184. The first guide section 183 is a sloped surface with a diameter increase toward the upper end portion, and the second guide section 184 is a sloped surface with a diameter decrease toward the upper end portion. When the base chassis 27 is moved up and down, the flange section 182 guides the base unit 22 at the chucking position or at the chucking release position by the first and second guide sections 183 and 184 being inserted while sliding in contact with a guide wall 185 formed to the guide hole 181.

The guide hole 181 of the base chassis 27 for insertion of the guide pin 180 is drilled in the vicinity of the turntable 23a disposed with a space from the third spindle 49 being a rotation pivot of the base unit 22. As shown in FIG. 45, in the guide hole 181, the guide wall 185 is bulged at the lower portion of the base chassis 27. The guide wall 185 forms a clearance slightly larger than the diameter of the flange section 182 of the guide pin 180. When the flange section 182 is inserted through this clearance, the base unit 22 is so guided that the center hole 2a of the optical disk 2 is positioned with the turntable 23a of the disk loading section 23.

Figure 46:
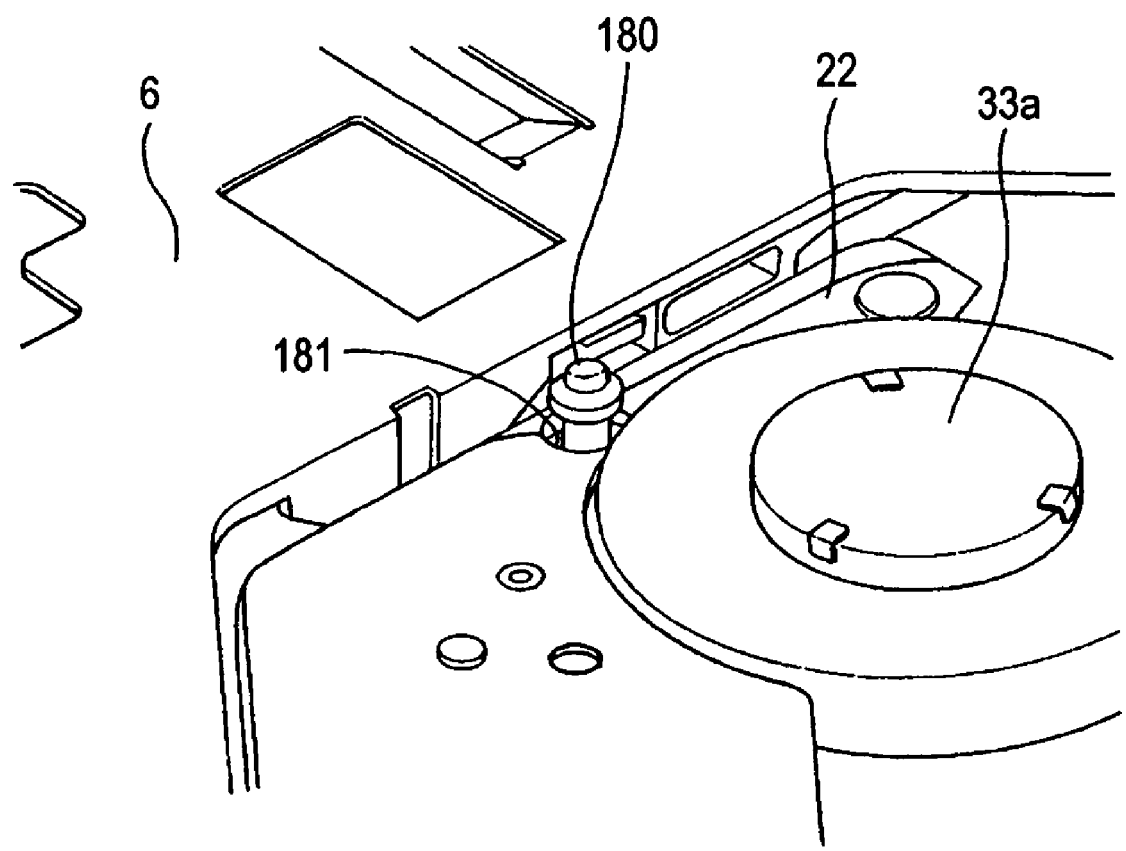
FIG. 46 is a perspective view of the guide pin and the guide hole in the state that the base unit is moved down to the chucking release position.
Figure 47:
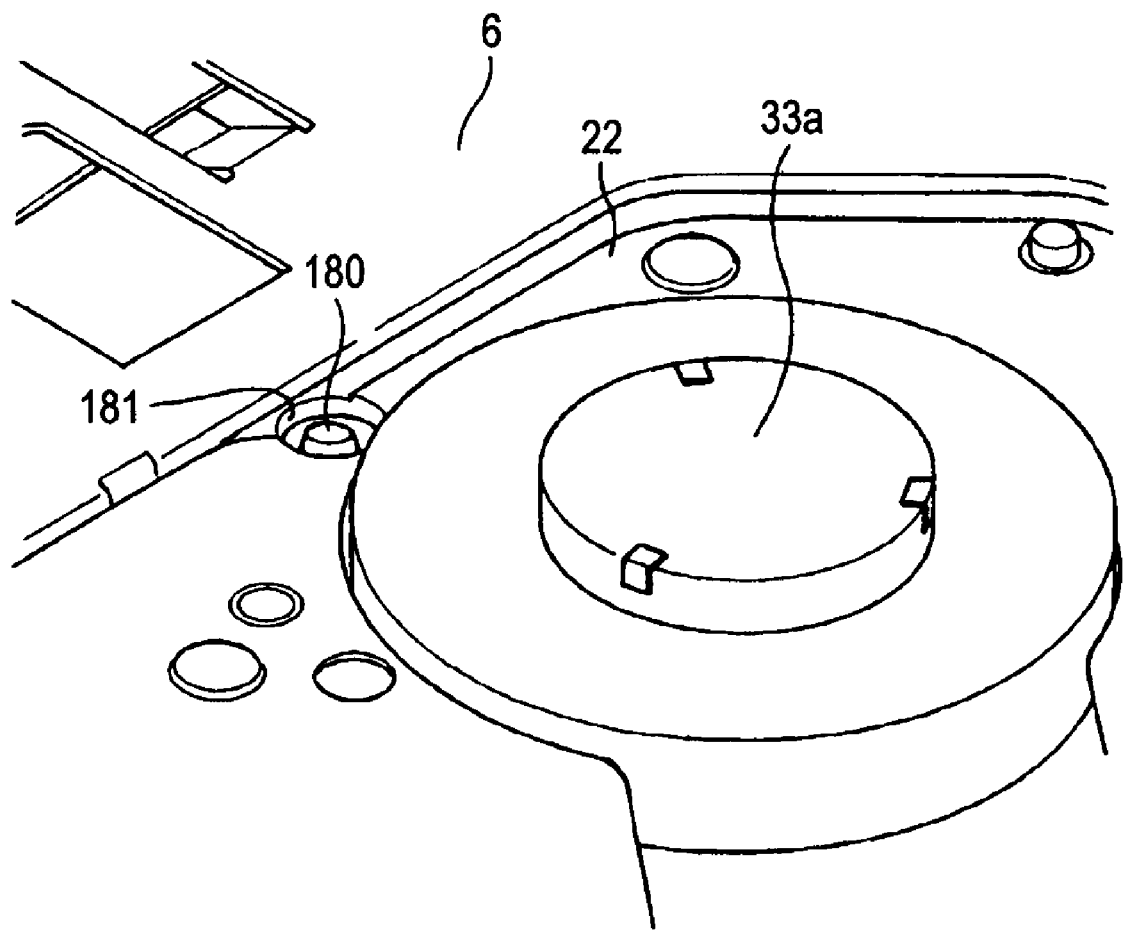
FIG. 47 is a perspective view of the guide pin and the guide hole in the state that the base unit is moved up to a chucking position.

Specifically, as indicated by chain double-dashed lines in FIG. 46 and (a) of FIG. 45, when the base unit 22 is moved down to the chucking release position, in the guide pin 180, the flange section 182 is located above the guide hole 181. When the optical disk 2 is transferred to the centering position, the base chassis 27 is moved up, and the flange section 182 is inserted through the guide hole 181. When the base chassis 27 is moved up to the chucking position of the optical disk 2, as indicated by solid lines of FIG. 47 and (b) of FIG. 45, the guide wall 185 bulged inside of the guide hole 181 is moved to slide along the first guide section 183 of the guide pin 180 so that the flange section 182 is inserted through the clearance with the guide wall 185. As such, because the base chassis 27 is moved up with the guide by the guide pin 180, the turntable 23a of the disk loading section 23 is positioned with the center hole 2a of the optical disk 2 moved to the centering position. Therefore, the optical disk 2 can be smoothly subjected to chucking with no excess load on the optical disk 2 and the turntable 23a.

With the configuration, i.e., the guide pin 180 and the guide hole 181 are formed corresponding to the area in the vicinity of the disk loading section 23 at an end opposite, in the longitudinal direction, to the end provided with the third spindle 49 for supporting the rotation of the base unit 22, any displacement between the optical disk 2 at the centering position and the turntable 23a can be corrected with the most efficiency. As such, it is possible to perform positioning, without fail, between the center hole 2a of the optical disk 2 and the engagement protrusion portion 33a of the turntable 23a.

Figure 48:
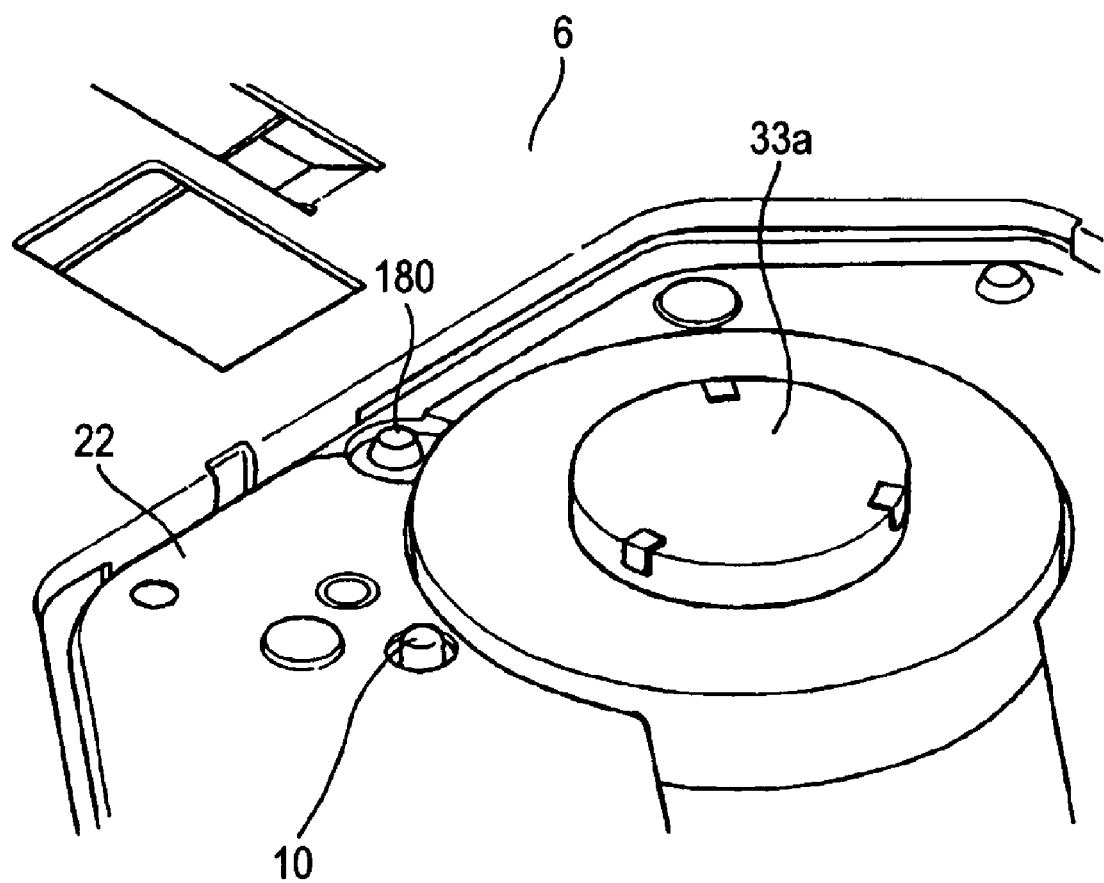
FIG. 48 is a perspective view of the guide pin and the guide hole in the state that the base unit is moved up to the recording/reproduction position.

Next, as shown in alternate long and short dashed lines of FIG. 48 and (c) of FIG. 45, when the base unit 22 is moved down to the recording/reproduction position, the guide wall 185 of the guide hole 181 of the base chassis 27 is moved to slide along the second guide section 184 of the flange section 182, and the flange section 182 is guided by the guide hole 181 for possible insertion. Thereafter, the guide wall 185 is moved down to the position with a space from the flange section 182. As such, in the state that the base unit 22 is moved down to the recording/reproduction position, there is no contact between the guide pin 180 and the guide hole 181, thereby preventing any disturbance such as vibration being transmitted from the bottom case 4 to the side of the base chassis 27 via the guide pin 180. As such, the recording/reproduction characteristics are protected from adverse effect, i.e., no disturbance is transmitted to the disk rotation drive mechanism 24 and the optical pickup 25 through the guide pin 180.

The guide pin 180 is formed at the height not abutting against the lower surface of the optical disk 2, which is driven to rotate by the disk rotation drive mechanism 24, and thus there is no possibility of damaging thereby the information recording surface of the optical disk 2.

After the recording/reproduction operation, and in the process of ejecting the optical disk 2, the base unit 22 is moved down to the chucking release position. When the optical disk 2 is pushed up from the turntable 23a by the guide pin 180, the chucking is released. At this time, the base chassis 27 is so disposed that the guide hole 181 is located at the lower portion of the guide pin 180.

In the disk drive apparatus 1 to which the invention is applied, the guide pin 180 also serves as a chucking release pin that releases the optical disk 2 from chucking. That is, the guide pin 180 is so formed that the upper end portion is shaped like a hemisphere, and the guide pin 180 and the guide hole 181 of the base chassis 27 are formed to correspond to a no-recording area formed in the vicinity of the center hole 2a of the optical disk 2 loaded to the turntable 23a. As such, when the base unit 22 is moved down to the chucking release position for the optical disk 2, the optical disk 2 is pushed up by the upper end portion of the guide pin 180 so that chucking with the turntable 23a is released. With such a configuration, there is no need to use a chucking release pin for use to release the optical disk 2 from chucking except for the guide pin 180, thereby serving well for the reduction of the components and the weight of the disk drive apparatus 1.

It should be understood by those skilled in the art that various modifications, combinations, sub-combinations and alterations may occur depending on design requirements and other factors insofar as they are within the scope of the appended claims or the equivalents thereof.

What is claimed is:

1. A disk transfer mechanism, comprising:
a push-out arm that is rotatably supported by an apparatus body to/from which apparatus body a disk-shaped recording medium is transferable, wherein when the disk-shaped recording medium is transferred into the apparatus body, the push-out arm rotates in an insertion direction by being pressed by the disk-shaped recording medium, and when the disk-shaped recording medium is ejected, the push-out arm rotates in an ejection direction to eject the disk-shaped recording medium; and
a lift section that is provided with a rotation axis supported at a tip end portion of the push-out arm, the rotation axis being rotatable in a direction substantially orthogonal to a main surface of the disk-shaped recording medium, and from the rotation axis, an abutting piece protrudes, and the abutting piece abuts against the disk-shaped recording medium on a front side surface in the insertion direction inserted in the apparatus body, and from the rotation axis, a support piece protrudes, which support piece supports a lower surface portion of the disk-shape recording medium, wherein
in the lift section, the support piece tilts to be positioned beneath a transfer area of the disk-shaped recording medium before insertion thereof, and when the abutting piece is abutted against the disk-shaped recording medium on the front side surface in the insertion direction, the rotation axis is rotated and the support piece supports the lower surface portion of the disk-shaped recording medium.

2. The disk transfer mechanism according to claim 1, wherein
the push-out arm is provided with a biasing member that biases the push-out arm to tilt the support piece to a position beneath the disk-shaped recording medium.

3. The disk transfer mechanism according to claim 2, wherein
the biasing member is a leaf spring, and
the rotation axis includes a flat surface that contacts an end of the leaf spring.

4. The disk transfer mechanism according to claim 1, wherein
the push-out arm includes a support wall that supports the abutting piece abutted against the disk-shaped recording medium.

5. The disk transfer mechanism according to claim 1, wherein
from the push-out arm, a grip piece protrudes, wherein the grip piece grips, with the support piece, the disk-shaped recording medium on the front side surface in the insertion direction.

6. The disk transfer mechanism according to claim 1, wherein
the rotation axis includes a contact piece that faces toward a lower surface side of the push-out arm, and which contact piece rotates the rotation axis in a direction along which the support piece supports the lower surface portion of the disk-shaped recording medium by coming in contact with an edge section of a main chassis disposed on an inner rear surface side of the apparatus body.

7. A disk recording and/or reproduction apparatus, comprising:
a push-out arm that is rotatably supported by an apparatus body to/from which apparatus body disk-shaped recording medium is transferable, wherein when the disk-shaped recording medium is transferred into the apparatus body, the push-out arm rotates in an insertion direction by being pressed by the disk-shaped recording medium, and when the disk-shaped recording medium is ejected, the push-out arm rotates in an ejection direction to eject the disk-shaped recording medium; and
a lift section, including:
a rotation axis supported at a tip end portion of the push-out arm, the pick-up axis being rotatable in a direction substantially orthogonal to a main surface of the disk-shaped recording medium;
an abutting section provided upright on the rotation axis so as to abut against the disk-shaped recording medium on a front side surface in the insertion direction as the disk-shaped recording medium is inserted in the apparatus body; and
a support piece that supports a lower surface portion of the disk-shape recording medium, wherein the lift section includes a disk transfer mechanism in which the support piece is tilted to be positioned beneath a transfer area of the disk-shaped recording medium before insertion thereof, when the abutting section abuts against the disk-shaped recording medium on the front side surface in the insertion direction, the rotation axis rotates, and the support piece supports the lower surface portion of the disk-shaped recording medium.

8. A disk transfer mechanism, comprising:

a push-out arm that is rotatably supported by an apparatus body to/from which a disk-shaped recording medium is transferable, wherein when the disk-shaped recording medium is inserted, the push-out arm rotates in an insertion direction by being pressed by the disk-shaped recording medium, and when the disk-shaped recording medium is ejected, the push-out arm rotates in an ejection direction to eject the disk-shaped recording medium; and a lift section including:
  a rotation axis rotatably attached to the push-out arm, one end of the rotation axis being provided with a support section,
  wherein the support section supports the disk-shaped recording medium at a front side edge in the insertion direction thereof by tilting, beneath the disk-shaped recording medium, a support surface that is substantially orthogonal, at one end of the support surface, to a main surface of the disk-shaped recording medium,
  wherein another end of the rotation axis includes a slide-in-contact section disposed on a rear surface side of the apparatus body for rotating the support section to be substantially parallel to the main surface of the disk-shaped recording medium by sliding in contact with an edge section of a main chassis, an upper surface side of the main chassis being a rotation area of the disk-shaped recording medium and the push-out arm; and
  a biasing member that biases, to rotate, the rotation axis to make a portion of the support surface extending from the rotation axis be substantially orthogonal to the main surface of the disk-shaped recording medium.

9. The disk transfer mechanism according to claim 8, wherein the biasing member is a torsion coil spring being latched by the transfer arm at one end, and being wound around the rotation axis, and the rotation axis is formed with a latch section at which an other end of the torsion coil spring is latched.

10. The disk transfer mechanism according to claim 8, wherein from the push-out arm, a grip piece protrudes for gripping, with the support piece, the disk-shaped recording medium on the front side surface in the insertion direction.

11. A disk recording and/or reproduction apparatus, comprising:

an apparatus body transferable to/from a disk-shaped recording medium;

a recording/reproduction mechanism that performs recording and/or reproduction to/from the disk-shaped recording medium;

a push-out arm that transfers the disk-shaped recording medium; and a main chassis that is disposed inside of the apparatus body on a rear surface side of an insertion direction of the disk-shaped recording medium, and has an upper surface side serving as a movement area for the disk-shaped recording medium and the transfer arm, wherein the push-out arm is provided with a lift section, including:
  a rotation axis rotatably attached to the push-out arm, one end of the rotation axis including a support section that supports the disk-shaped recording medium at a front side edge in the insertion direction thereof by tilting, beneath the disk-shaped recording medium, a support surface that is substantially orthogonal, toward a tip end of the support surface, to a main surface of the disk-shaped recording medium,
  the rotation axis including on another end of the rotation axis, a slide-in-contact section that rotates the support section to be substantially parallel to the main surface of the disk-shaped recording medium by sliding in contact with an edge section of the main chassis; and
  a biasing member that biases, to rotate, the rotation axis to make the support surface be substantially orthogonal to the main surface of the disk-shaped recording medium while the support surface is in an untilted state.

12. A disk transfer mechanism, comprising:

a push-out arm that is rotatably supported by an apparatus body to/from which apparatus body a disk-shaped recording medium is transferable, wherein as the disk-shaped recording medium is transferred into the apparatus body, the push-out arm rotates in an insertion direction by being pressed by the disk-shaped recording medium, and as the disk-shaped recording medium is ejected, the push-out arm rotates in an ejection direction to eject the disk-shaped recording medium; and a support member that is disposed at a tip end portion of the push-out arm, and when on standby for insertion of the disk-shaped recording medium, the support member is positioned beneath a transfer area of the disk-shaped recording medium, and when the transfer arm is rotated by the disk-shaped recording medium in the insertion direction, the support member supports a lower surface portion of the disk-shaped recording medium to the transfer area.

\* \* \* \* \*